United States Patent
Sekiguchi (12)

(10) Patent No.: US 6,388,720 B1
(45) Date of Patent: May 14, 2002

(54) LIQUID CRYSTAL DISPLAY INCLUDING SIGNAL ELECTRODES CONNECTED TO EACH OTHER BY FIRST ANODE OXIDE ELECTRODE AND AUXILIARY ELECTRODE CONNECTED TO SECOND ANODE OXIDE ELECTRODE

(75) Inventor: Kanetaka Sekiguchi, Sayama (JP)

(73) Assignee: Citizen Watch Co., Ltd., Nishitokyo (JP)

( * ) Notice: Subject to any disclaimer, the term of this patent is extended or adjusted under 35 U.S.C. 154(b) by 0 days.

(21) Appl. No.: 09/722,309

(22) Filed: Nov. 28, 2000

Related U.S. Application Data

(62) Division of application No. 09/553,403, filed on Apr. 20, 2000, which is a division of application No. 08/836,481, filed as application No. PCT/JP95/02285 on Nov. 8, 1995, now Pat. No. 6,128,050.

(30) Foreign Application Priority Data

Nov. 8, 1994 (JP) .............................. 6-273941

(51) Int. Cl.[7] ....................... G02F 1/1333; G02F 1/136; G02F 1/1345
(52) U.S. Cl. .............................. 349/40; 349/49; 349/149
(58) Field of Search .............................. 349/40, 51, 52, 349/149, 152, 49; 257/30, 59, 72

(56) References Cited

U.S. PATENT DOCUMENTS

| | | | |
|---|---|---|---|
| 4,404,555 A | 9/1983 | Long et al. ................... 345/90 |
| 4,534,623 A | 8/1985 | Araki ........................... 349/51 |
| 4,730,140 A | 3/1988 | Masubuchi ................... 315/169 |
| 5,119,217 A | 6/1992 | Takahashi .................... 349/147 |
| 5,175,114 A | * 12/1992 | Ono et al. ..................... 437/1 |
| 5,274,482 A | 12/1993 | Morita et al. ................. 349/51 |
| 5,294,560 A | * 3/1994 | Ono et al. ..................... 437/47 |
| 5,596,432 A | 1/1997 | Sekiguchi ..................... 349/51 |
| 5,753,937 A | * 5/1998 | Shimomaki et al. ........... 257/59 |
| 5,861,928 A | * 1/1999 | Sekiguchi ..................... 349/49 |

FOREIGN PATENT DOCUMENTS

| | | |
|---|---|---|
| EP | 63208023 | 8/1988 |
| EP | 0 376 165 | 7/1990 |
| JP | 61-260220 | 11/1986 |
| JP | 63-195687 | 8/1988 |
| JP | 02-210331 A | 8/1990 |
| JP | 3-27026 | 2/1991 |
| JP | 3-125123 | 5/1991 |
| JP | 4-120518 | 4/1992 |
| JP | 6-43494 | 2/1994 |
| JP | 7-104316 | 4/1995 |

\* cited by examiner

*Primary Examiner*—William L. Sikes
*Assistant Examiner*—Tarifur R. Chowdhury
(74) *Attorney, Agent, or Firm*—Armstrong, Westerman, Hattori, McLeland & Naughton, LLP

(57) ABSTRACT

A first electrode 1 comprises an anode oxide electrode 5, a lower electrode 2 and signal electrodes, wherein the signal electrodes are connected to each other by the anode oxide electrode when the anodic oxidation treatment is performed, while a second electrode comprises an upper electrode on a nonlinear resistor layer, a display electrode connected to the upper electrode, and a connecting electrode covering a part of the anode oxide electrode, wherein the lower electrode, the nonlinear resistor layer and the upper electrode constitute the nonlinear resistor, and wherein a part of the anode oxide electrode is separated at the side thereof which is also a side of the connecting electrode comprising the second electrode, thereby forming independent signal electrodes. This can prevent the nonlinear resistor from being deteriorated in characteristic in the step involved in generation of static electricity such as a step of printing an orientational film onto a first substrate having the nonlinear resistor or a step of performing orienting process, thereby obtaining uniform and stable characteristic.

10 Claims, 36 Drawing Sheets

FIG. 2
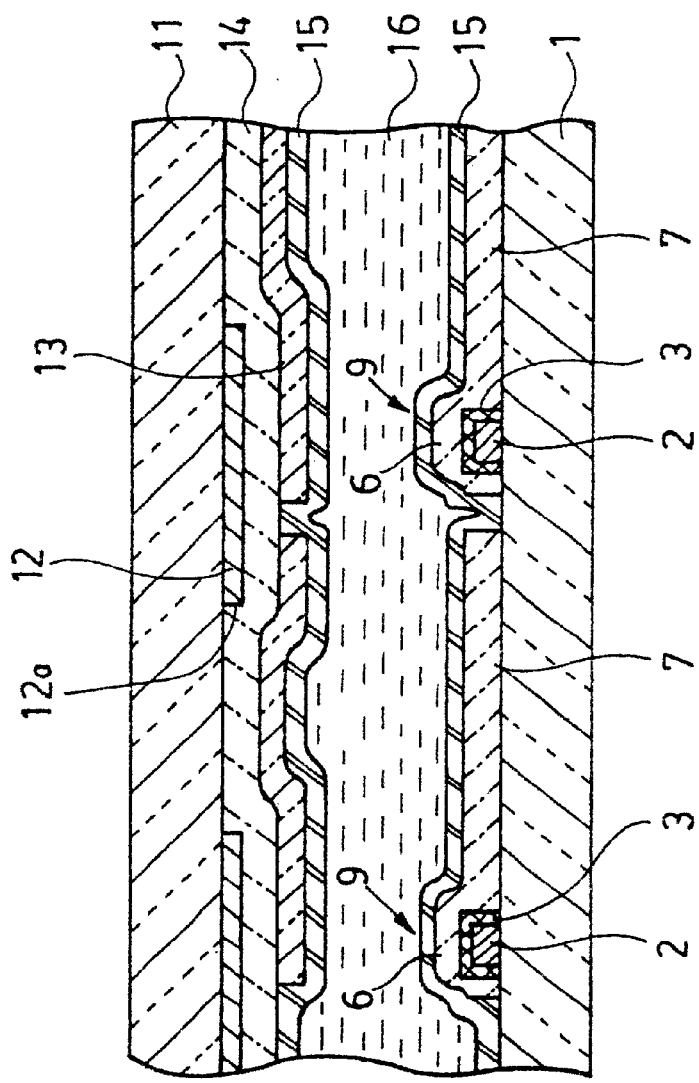
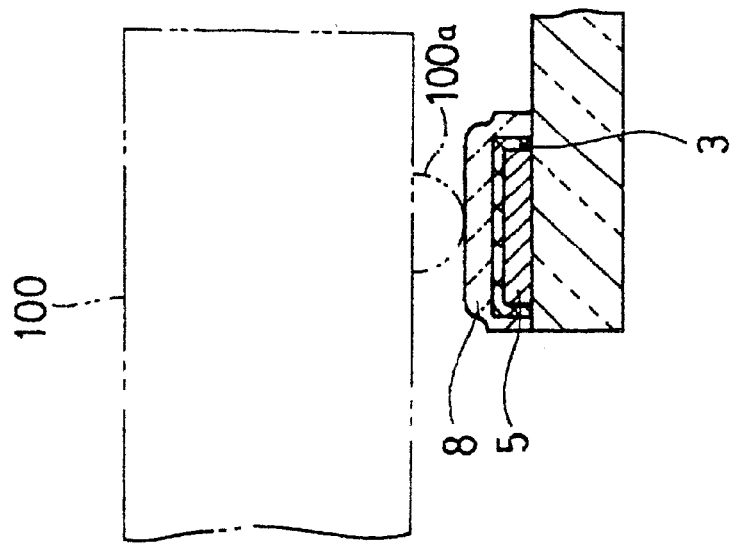

FIG.4
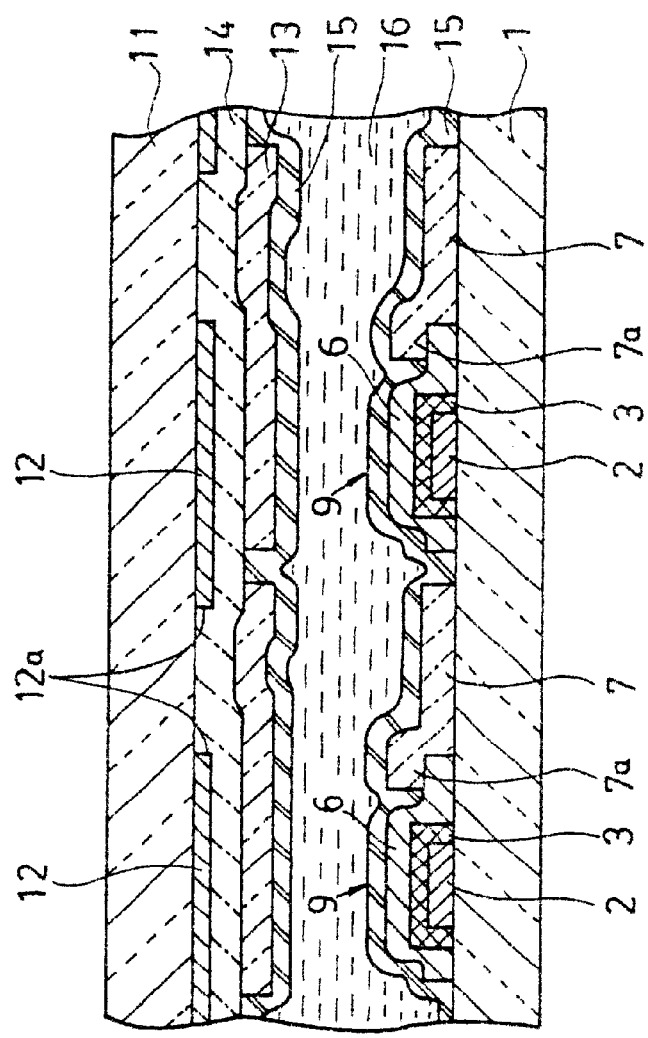
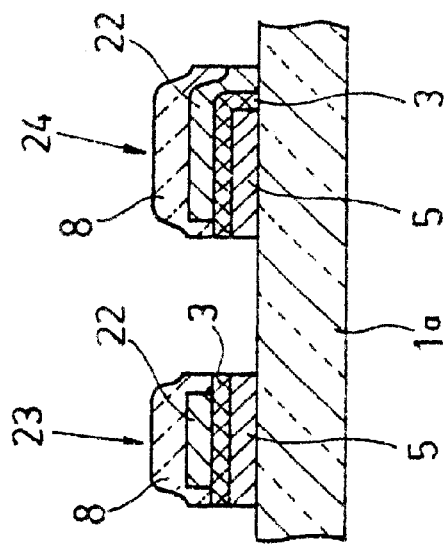

LIQUID CRYSTAL DISPLAY INCLUDING SIGNAL ELECTRODES CONNECTED TO EACH OTHER BY FIRST ANODE OXIDE ELECTRODE AND AUXILIARY ELECTRODE CONNECTED TO SECOND ANODE OXIDE ELECTRODE

This application is a division of parent application Ser. No. 09/553,403 filed Apr. 20, 2000, which is a division of application Ser. No. 08/836,481 filed May 7, 1997, now U.S. Pat. No. 6,128,050 issued Oct. 3, 2000 which was a §371 national phase of international application PCT/JP95/02285 filed Nov. 8, 1995.

TECHNICAL FIELD

The present invention relates to a monochrome or color liquid crystal display device which has been widely employed as a display device of a watch, a pocket calculator, a video camera, and a variety of electronic devices. Particularly, it relates to the structure of a liquid crystal display device having first and second electrodes which are disposed on one of two substrates between which a liquid crystal is filled, and also having an anode oxide film of the first electrode formed between the first and second electrodes as a nonlinear resistor layer, thereby forming a nonlinear resistor having a structure of "metal-insulating film-metal" or "metal-insulating film-transparent conductor" between the first and second electrodes.

BACKGROUND TECHNOLOGY

A display capacity of a liquid crystal display device using a liquid crystal display has been recently increased.

In a simple matrix structured liquid crystal display device employing a multiplex driving system, a contrast is dropped or a response speed is reduced as the speed of a time sharing is increased. Accordingly, if the liquid crystal display device has about 200 scanning lines, it is difficult to obtain a sufficient contrast.

Accordingly, there has been employed an active matrix system liquid crystal display panel having switching elements in each pixel to remove such drawback.

In the active matrix system liquid crystal display system, there are two types, one is a three terminal system employing thin film transistors (hereinafter referred to as "TFT") as switching elements and the other is two terminal system employing nonlinear resistors. The two terminal system is superior to the three terminal system since the former is simple in structure and a method of manufacturing thereof.

A diode type, a varistor type, a thin film diode (hereinafter referred to as "TFD") type and so on are developed as the two terminal system.

Among these types, the TFD type is simple in structure and has few manufacturing steps.

Further, the liquid crystal display panel is required to display with high density and high definition, and the switching elements require reduction of the area they occupy.

As a means for permitting the liquid crystal display panel to display with high density and high definition, a photo-lithography technique and an etching technique which are micro processing techniques in semiconductor production techniques are used. However, even if such semiconductor production techniques are employed, it is very difficult to realize a large area processing with low cost.

The structure of a conventional liquid crystal display device having a switching element which efficiently makes the area larger with low cost will be now described with reference to FIG. 45 which is a plan view showing an example of a conventional liquid crystal display device, FIG. 47 which is a plan view enlarging a part thereof and FIG. 46 which is a cross sectional view taken along the line 47—47 in FIG. 45.

The liquid crystal display device comprises, as shown in FIG. 47, a first substrate 1, a second substrate 11 which are made of a transparent material and oppose each other by way of a spacer 17 at a certain gap, and a liquid crystal 16 which is filled between the first and second substrates 1 and 11.

A lower electrode 2 and a signal electrode 4 are disposed on the first substrate 1 as a first electrode, and a nonlinear resistor layer 3 is provided on the lower electrode 2. Further, an upper electrode 6 as a second electrode is provided on the nonlinear resistor layer 3 so as to overlap, thereby constituting a nonlinear resistor 9. The upper electrode 6 as the second electrode extends from a display electrode 7 as shown in FIG. 46, and a part of the upper electrode 6 also serves as the display electrode 7.

The nonlinear resistors 9 and the display electrodes 7 are disposed in a matrix shape.

A black matrix 12 is disposed on the second substrate 11 at a part confronting the first substrate 1 as shown by the hatched line in FIG. 46 for preventing leaking of light from gaps defined in the display electrodes 7 disposed on the first substrate 1. That is, the black matrix 12 is disposed on a non-display portion as a shading portion.

An opposed electrode 13 is disposed on the second substrate 11 in a belt shape by way of an interlayer insulating film 14 so as to oppose the display electrode 7 as shown in FIG. 47 so that the opposed electrode 13 is not short circuited, without contact with the black matrix 12.

In FIG. 46, the lower electrode 2 and the signal electrode 4 serving as the first electrode, and the upper electrode 6 and the display electrode 7 serving as the second electrode, disposed on the first substrate 1, are shown by broken lines, wherein the illustration of the nonlinear resistor layer 3 is omitted, and the black matrix 12 and the opposed electrode 13 under the second substrate 11 are shown by solid lines.

The lower electrode 2 disposed on the first substrate 1 extends from the signal electrode 4 so as to constitute the nonlinear resistor 9, and the lower electrode 2 serving as an overhanging region overlaps the upper electrode 6 to constitute the nonlinear resistor 9.

The signal electrode 4 as the first electrode and the display electrode 7 as the second electrode are spaced at a certain gap d as shown in FIG. 46.

The display electrode 7 is disposed to overlap the opposed electrode 13 by way of the liquid crystal 16, thereby forming pixel portions of the liquid crystal display panel.

The black matrix 12 is provided to overlap a region forming the display electrode 7 to a given amount, thereby serving to prevent leaking of light from a peripheral region of the display electrode 7.

The liquid crystal display device performs a given image display owing to the change of transmittance of the liquid crystal 16 in a region where the black matrix 12 is not provided on the display electrode 7.

Further, orientational films 15 and 15 are provided between the first substrate 1 and the second substrate 11 at parts confronting the first substrate 1 and the second substrate 11 as processing layers for regularly aligning molecules of the liquid crystal 16.

As shown in FIG. 45, the signal electrodes 4 in M rows are disposed on the first substrate 1 while the opposed electrodes 13 or data electrodes in N columns are disposed on the second substrate 11 so as to structure the liquid crystal display device having a display region 18 formed of a matrix in M rows and N columns as shown by one dot chain line.

The display electrodes 7 are provided at an intersection between the signal electrodes 4 in M rows and the opposed electrodes 13 or data electrodes in N columns, and the nonlinear resistors (TFD in this example) 9 are provided between the signal electrodes 4 and the display electrodes 7.

An anode oxide electrode (anodizing electrode) 5 for connecting the signal electrode 4 in M rows with each other is disposed on the first substrate 1, and connecting electrodes 8 for connecting the signal electrodes 4 with an external circuit are provided at a portion opposite to the anode oxide electrode 5.

In such a manner, the signal electrodes 4 in each column are connected to each other by the anode oxide electrode 5, and the lower electrodes 2 connected to the signal electrodes 4 are at once subject to an anodic oxidation treatment so as to form the nonlinear resistor 3 on the surface of the lower electrodes 2 (FIG. 47), but the signal electrodes 4 in each column are separated from and independent of each other upon completion of the anodic oxidation treatment.

Accordingly, as shown in FIG. 45, the anode oxide electrode 5 has a cut portion 62 which extends outside of a separation line 34 (shown by a broken line) of the first substrate 1 by a length L, and the anode oxide electrode 5 is cut along the separation line 34 upon completion of the anodic oxidation treatment, so that the anode oxide electrode 5 and the cut portion 62 are separated from the first substrate 1.

However, it is necessary to provide the cut portion 62 so as to separate the anode oxide electrode 5 from the signal electrode 4. Accordingly, the anode oxide electrode 5 requires such a size that it can be bent by fingers of an operator after the separation line 34 is perforated, which causes a problem of wasting material of the cut portion 62 involved in bending and cutting the cut portion 62.

Further, in a step of separating the cut portion 62 from the signal electrode 4, there is a possibility that the nonlinear resistor 9 is deteriorated in characteristics by static electricity.

Since the end surface of each signal electrode is exposed at the cut part of the first substrate 1, there is a possibility that a short circuit occurs between a plurality of signal electrodes owing to adhesion of dust and moisture.

There is a possibility that the nonlinear resistor is deteriorated in characteristics and damaged depending on time when the cutting step of the anode oxide electrode 5 is taken.

It is impossible to disperse static electricity which locally occurs when the anode oxide electrode 5 are separated from each other during the orientation process for aligning the liquid crystal regularly, which is a treatment for processing the first substrate 1 having the nonlinear resistor 9 to be used for the liquid crystal display device, and during the conveyance or inspection of the liquid crystal display device.

Accordingly, there is a possibility that the nonlinear resistors 9 is deteriorated in characteristics or damaged when an excessive voltage is applied to the nonlinear resistor 9.

Further, it is possible to prevent the nonlinear resistor 9 from being deteriorated in characteristics and damaged by connecting the anode oxide electrodes with each other during the inspection of the liquid crystal display device.

Still further, it is possible to easily inspect the liquid crystal display device since the voltage can be applied to the display electrodes 7 by merely applying the voltage to the anode oxide electrodes 5 which are connected to each other during the inspection step of the liquid crystal display device.

It is required that the contaminant material does not enter between mounting electrodes and a conductive paste before ICs are mounted on the substrate, particularly when the external circuit is mounted on the first substrate 1 forming the nonlinear resistor 9, for example, when the ICs, which can be mounted with high density, are mounted on the substrate using a conductive adhesive by a chip on glass (COG) mounting method.

Accordingly, in a structure where the cut portion is defined in the first substrate 1 and the anode oxide electrode is formed on the cut portion, and the cut portion is cut upon completion of the anodic oxidation treatment to thereby separate the anode oxide electrode from the signal electrode as described above, the material is wasted and above-mentioned various demands cannot be satisfied.

Consequently, it is a first object of the invention to provide a liquid crystal display device capable of easily removing a part of the anode oxide electrode by an etching treatment upon completion of the aforementioned various steps, so as to permit the signal electrodes to be independent of each other, thereby preventing the nonlinear resistor from being deteriorated in characteristics and damaged owing to static electricity which occurs during a fabricating step of the nonlinear resistor or during the succeeding steps for manufacturing the liquid crystal display device, and reducing defects of the nonlinear resistor so as to stabilize the characteristics of the nonlinear resistor.

It is another object of the invention to dispense with a part such as a cut portion shown in FIG. 46, which is to be wasted, and to effectively utilize a part which remains after the signal electrodes for the anode oxide electrode used in the anodic oxidation treatment are separated from the anode oxide electrode.

Further, the liquid crystal display device having the aforementioned conventional nonlinear resistors has signal electrodes made of a metal film, and the initial signal electrode and the final signal electrode are the same in wiring width thereof. Accordingly, there is a problem that the signal electrode is hard to repair if poor etching occurs at a part of the signal electrode.

Further, in case that the signal electrode is used as a part of the anode oxide electrode, the anode oxide film cannot be formed if the signal electrode is broken. Still further, it is necessary to form the anode oxide electrode 5 as wide as possible so as to uniformly form an anode oxide film.

Still further, when the transparent conductive film is used as the display electrode, a short circuited part between the signal electrode and the display electrode cannot be easily detected since the display electrode is transparent even if the signal electrode and the display electrode are electrically short circuited owing to poor etching of the transparent conductive film.

Further, as for the TFT element, there is a possibility of occurrence of the breakage of the anode oxide electrode or an electric short circuit between the signal electrode (gate electrode or source electrode) and the transparent display electrode like the TFD element in case that anode oxide film of the gate electrode is used as the gate insulating film utilizing the gate electrode as the anode oxide electrode.

Accordingly, it is still another object of the invention capable of surely and uniformly forming an anode oxide film serving as the nonlinear resistor layers of the nonlinear resistors using the signal electrode as a part of the anode oxide electrode, of easily repairing a poorly etched part when the poor etching occurs in a part of the signal electrode, and of easily detecting a short circuited part when there occurs an electric short circuit between the display electrode of the transparent conductive film and the signal electrode or the anode oxide electrode.

SUMMARY OF THE INVENTION

To achieve the above objects of the invention, a liquid crystal display device is structured as follows.

The liquid crystal display device which is a subject of the invention includes a first substrate and a second substrate which confront each other at a certain gap, a plurality of electrodes disposed on the first substrate, a nonlinear resistor layer formed by an anode oxide film of one electrode in a region where the plurality of electrodes overlap, thereby forming nonlinear resistors such as a TFD element or TFT element. The liquid crystal display device has a structure further including a liquid crystal which is filled between the first substrate and the second substrate.

The electrodes are independent of each other by providing the anode oxide electrode for performing the anodic oxidation treatment quickly and uniformly by connecting the electrodes forming the anode oxide film to each other in advance so as to form the nonlinear resistor layer and other electrodes for masking a part of the anode oxide electrodes, and removing exposed parts of the anode oxide electrodes by etching utilizing other electrodes as a mask upon completion of the anodic oxidation treatment.

Accordingly, it is possible to omit or reduce a special covering for masking, and to perform an etching treatment so as to permit the electrodes to be easily independent of each other in an arbitrary step upon completion of the anodic oxidation treatment.

Further, the remaining parts of the anode oxide electrode can be effectively utilized for a connecting electrode, an input electrode (terminal), and the like.

Still further, when the anode oxide electrode is provided at the periphery of a display region or of a display element, it can be utilized as a shading portion, so that a frame can be provided in the liquid crystal display device having no black matrix.

Still further, it is possible to improve uniformity of the anode oxide film and to enhance the prevention of breakage of the anode oxide film by permitting the width of the anode oxide electrode to be wide at the initial stage, so that the electrode can be repaired utilizing the widened part of the anode oxide electrode even if the electrode is partly defect.

BRIEF DESCRIPTION OF THE DRAWINGS

FIG. 2 is a cross sectional view taken along the line 2—2 in FIG. 1.

FIG. 4 is a cross sectional view taken along the line 4—4 in FIG. 3.

BEST MODE FOR CARRYING OUT THE INVENTION

Embodiments of the invention will be now described with reference to the attached drawings for explaining the content of the invention in more detail.

Figure 45:
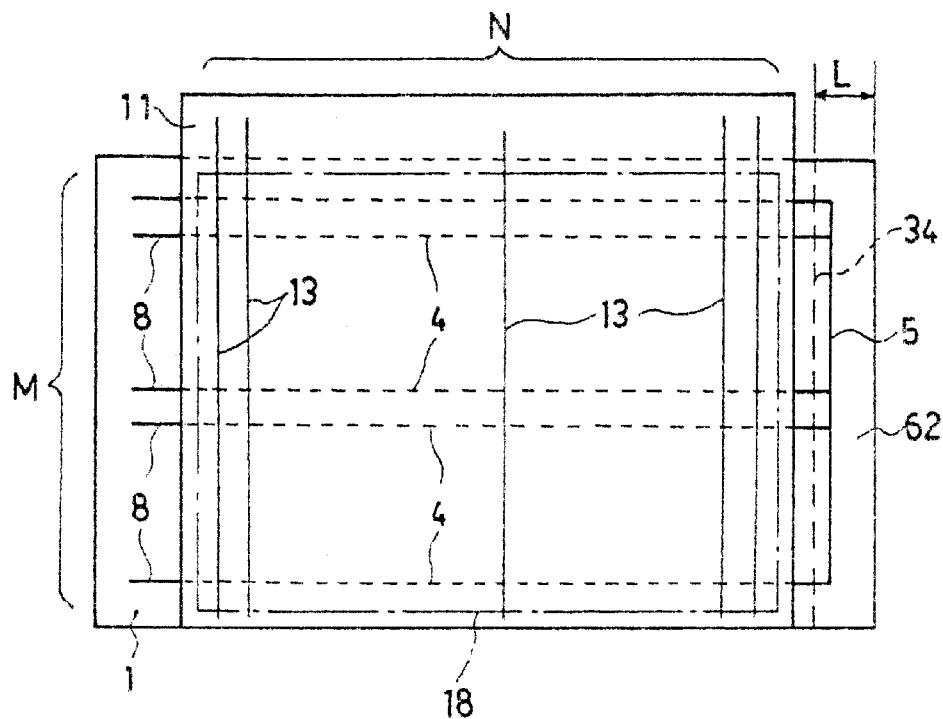
FIG. 45 is a plan view showing an entire structure of a conventional liquid crystal display device.
Figure 47:
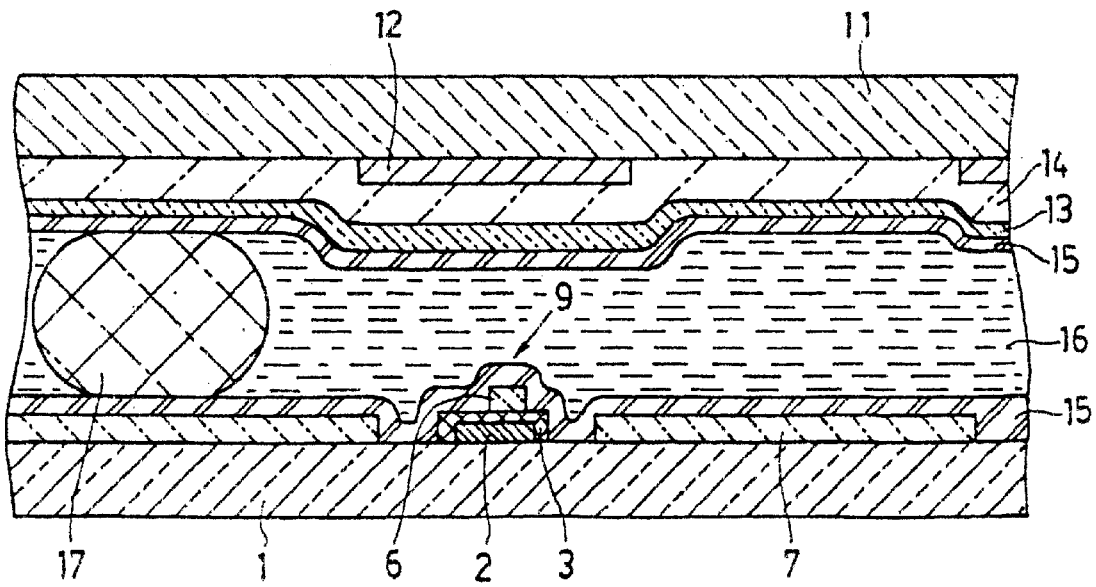
FIG. 47 is a cross sectional view taken along the line 47—47 in FIG. 46.
Figure 46:
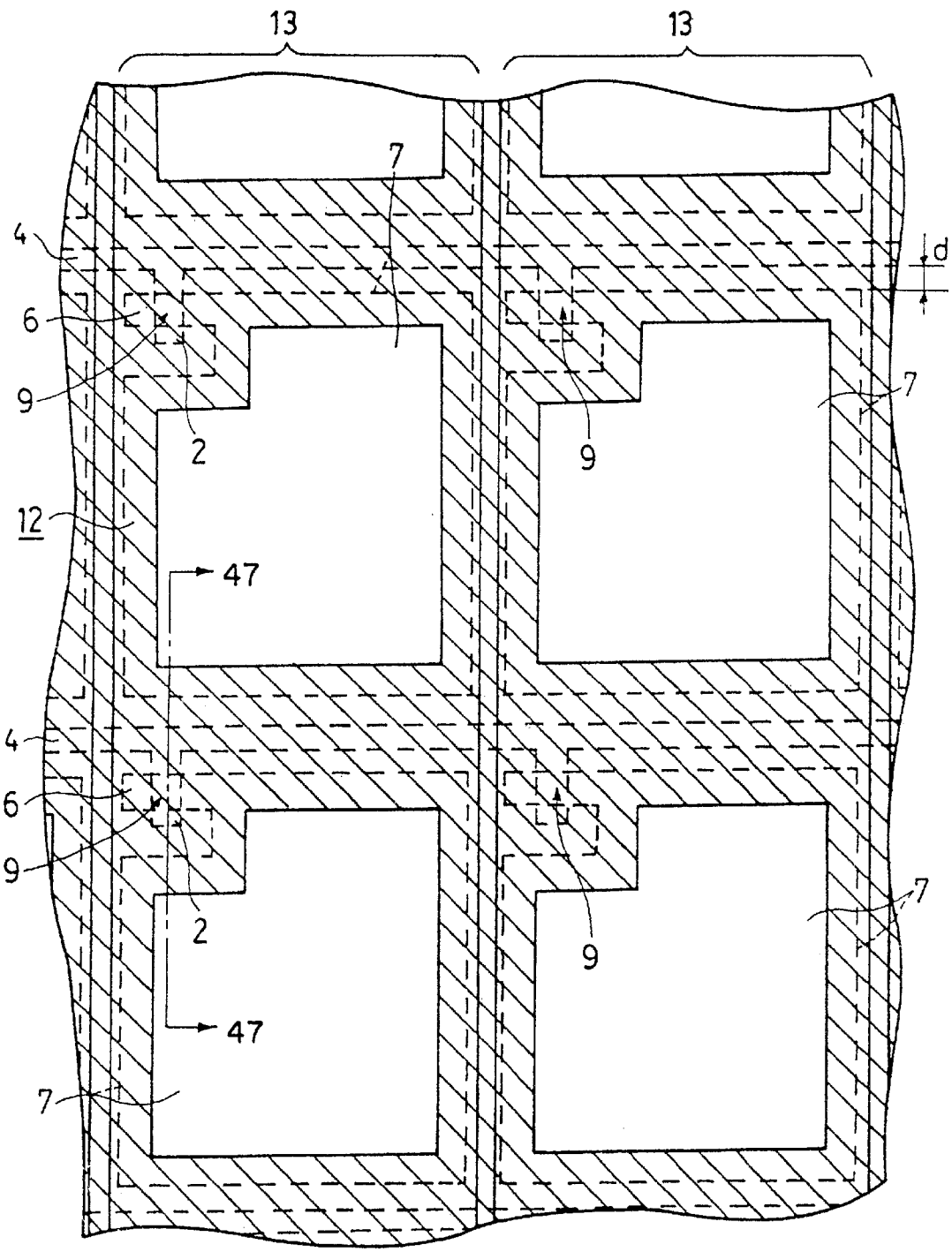
FIG. 46 is an enlarged plan view showing a part of the liquid crystal display device in FIG. 45

In FIGS. 1 through 44 are used for explaining following embodiments, components corresponding to those as explained above in FIGS. 45 through 47, and components corresponding to those in figures of each embodiment are denoted by the same numerals.

[First Embodiment]

First of all, a structure of a liquid crystal display device according to a first embodiment of the invention will be described with reference to FIGS. 1 and 2.

Figure 1:
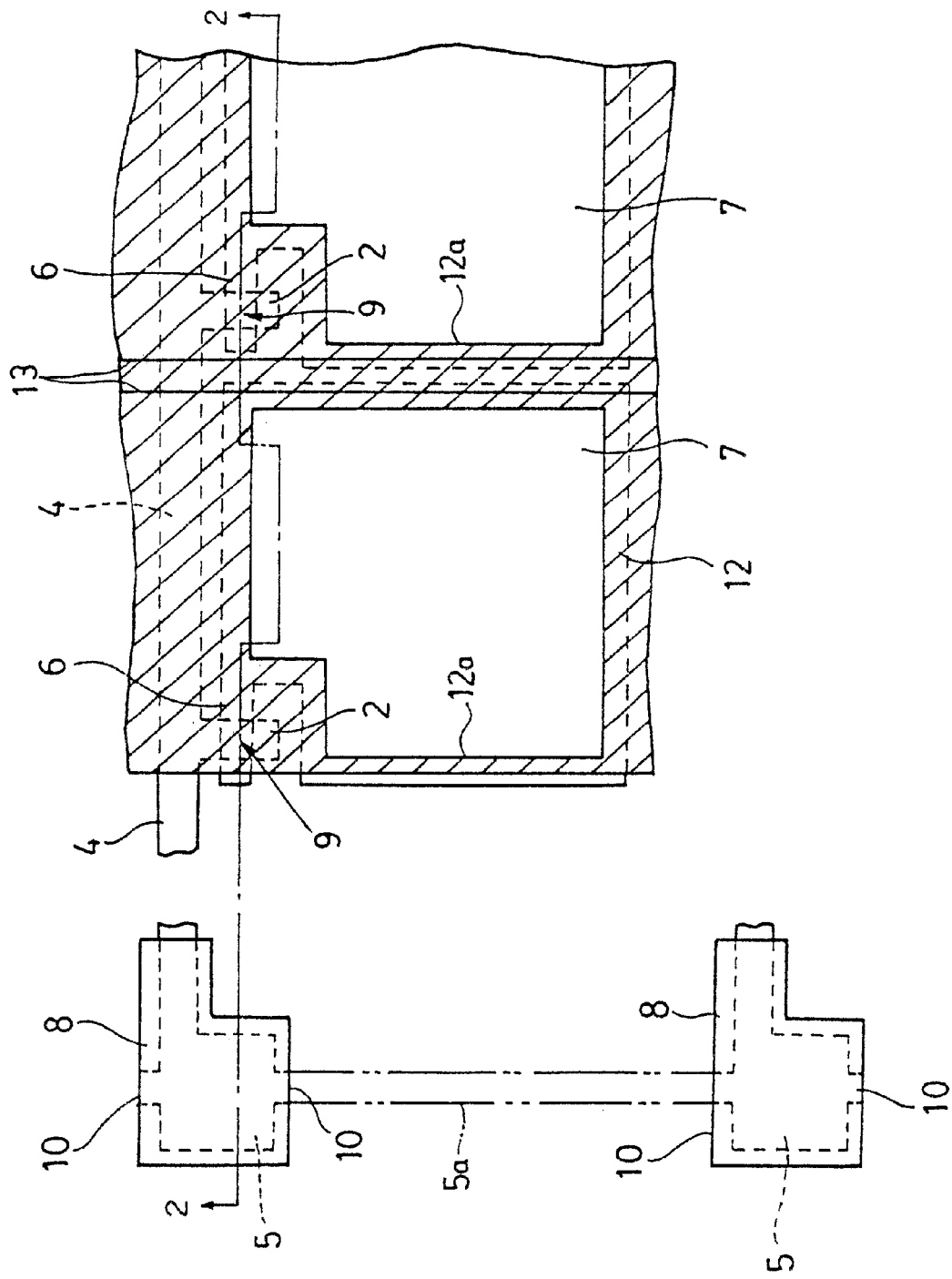
FIG. 1 is a plan view showing a part of a liquid crystal display device according to a first embodiment of the invention.

FIG. 1 is a plan view showing a part of a liquid crystal display device according to the first embodiment of the invention, and FIG. 2 is a cross sectional view taken along the line 2—2 in FIG. 1. In FIG. 1, illustration of first and second substrates is omitted.

The basic structure of the liquid crystal display device is the same as that of the aforementioned conventional liquid crystal display device, and it comprises the first and second substrates 1 and 11 made of a material such as a transparent glass and opposing each other at a certain gap by way of a spacer not shown, and the liquid crystal 16 is filled between the first and second substrates 1 and 11.

The lower electrode 2 made of a tantalum (Ta) film, the signal electrode 4 and the anode oxide electrode 5 are disposed on the first substrate 1 as a first electrode. A nonlinear resistor layer 3 made of a tantalum oxide ($Ta_2O_5$) film which is an anode oxide film of the lower electrode 2 by itself is formed on the lower electrode 2. The anode oxide film is formed on an entire surface of the first electrode, namely, on the surfaces of the signal electrode 4 and the anode oxide electrode 5 as well as on the surface of the lower electrode 2.

Further, an upper electrode 6 on the nonlinear resistor layer 3, a display electrode 7 connected to the upper electrode 6 and a connecting electrode 8 forming a part of the anode oxide electrode 5 are made of an indium tin oxide (ITO) film as a second electrode.

The lower electrode 2, the nonlinear resistor layer 3 and the upper electrode 6 constitute a TFD structured nonlinear resistor 9.

The connecting electrode 8 comprising the second electrode covers a part of the anode oxide electrode 5 comprising the first electrode, wherein runner parts 5a of the anode oxide electrodes 5 connect the signal electrodes 4 in each row with each other at the time of the anodic oxidation treatment as shown by imaginary lines in FIG. 1, and they are separated from each other at a separating side 10 of the connecting electrode 8 upon completion of the anodic oxidation treatment, thereby constituting independent signal electrodes 4.

The connecting electrode 8 is an electrode to be connected to an output terminal 100a of a driver IC 100 for driving the liquid crystal display device as shown in FIG. 2.

A black matrix 12 made of a chromium (Cr) film is disposed on an inner surface of the second substrate 11 for preventing leaking of light from gaps between the display electrodes 7 disposed on the first substrate 1.

Incidentally, the black matrix 12 is not disposed on the second substrate 11 at a region opposing the display electrode 7 disposed on the first substrate 1 as shown in FIG. 1.

An opposed electrode 13 made of an indium tin oxide film is disposed on the inner surface of the second substrate 11 so as to oppose the display electrode 7. The opposed electrode 13 is provided by way of an interlayer insulating film 14 so as not to be short circuited when it contacts the black matrix 12.

The first electrode (signal electrode 4) and the display electrode 7 are spaced at a certain gap so that they are not short circuited as shown in FIG. 1.

The display electrode 7 becomes a display pixel portion of a liquid crystal display panel when it is arranged to overlap the opposed electrode 13 by way of the liquid crystal 16 as shown in FIG. 2. In each display pixel portion, the black matrix 12 has an opening 12a. A region for forming the black matrix 12 which is shown by the hatched line in FIG. 1 becomes a shading portion.

Owing to the change of transmittance of the liquid crystal 16 in the display pixel portion, the liquid crystal display device performs a predetermined pixel display.

Further, the first substrate 1 and the second substrate 11 respectively have orientational films 15 and 15 respectively as processing layers for regularly aligning molecules of the liquid crystal 16.

With the arrangement of the first embodiment as explained above, the anode oxide electrode 5 comprising the first electrode has a structure that it is separated in a self-matching manner by the connecting electrode 8 comprising the second electrode.

That is, the signal electrodes 4 in each row are connected to each other by the anode oxide electrodes 5 when the anodic oxidation treatment is performed on the lower electrode 2 to form the nonlinear resistor layer. When an etching treatment is performed using the connecting electrode 8 comprising the second electrode serving as a mask upon completion of the anodic oxidation treatment, e.g. upon completion of the inspection of the liquid crystal display panel, the runner parts 5a of the anode oxide electrodes 5 which are not covered with the connecting electrode 8 are removed, and they are separated from each other at the separating side 10 of the connecting electrode 8, thereby constituting the independent signal electrodes 4 in each row.

Since the connecting electrode 8 which is the second electrode is used as an etching mask, it is possible to process the signal electrodes 4, which are connected to each other, to form independent signal electrodes during manufacturing of or inspecting of the liquid crystal display panel or upon completion of the inspection of the liquid crystal display panel.

Accordingly, it is possible to apply an external signal to nonlinear resistors 9 in each row using the signal electrodes 4 which are independent of the connecting electrodes 8.

In such steps which involve generating static electricity as printing the orientational films 15 onto the first substrate 1 having the nonlinear resistor 9 or performing an orienting process by rubbing the surfaces of the orientational films 15 with a cloth, the signal electrodes 4 remain connected to each other by the anode oxide electrodes 5, thereby preventing the nonlinear resistor 9 from being deteriorated in characteristics.

As a result, it is possible to obtain the liquid crystal display device having a uniform and stable characteristic and excellent display quality.

[Second Embodiment]

A structure of a liquid crystal display device according to a second embodiment of the invention will be described next with reference to FIGS. 3 and 4.

Figure 3:
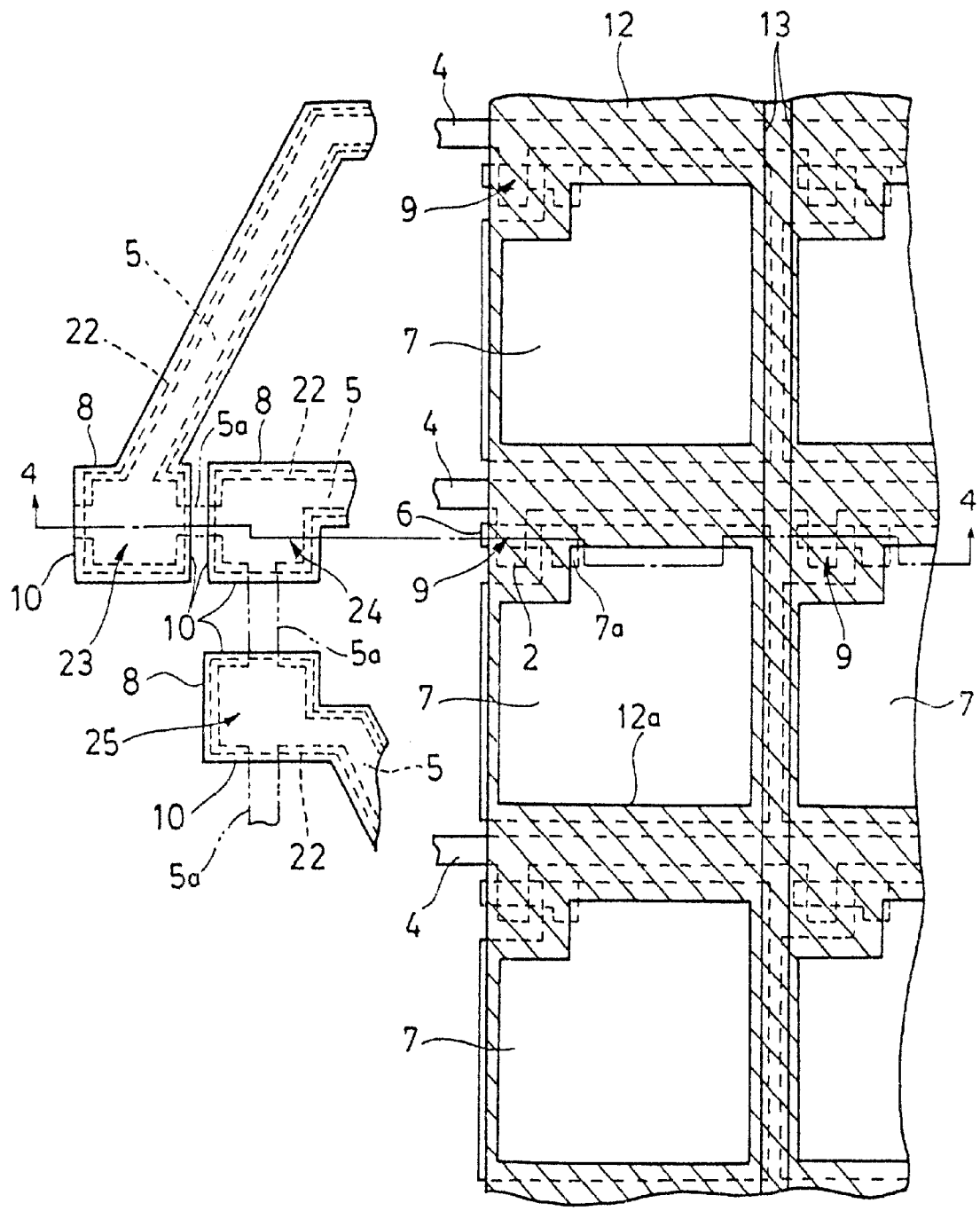
FIG. 3 is a plan view showing a part of a liquid crystal display device according to a second embodiment of the invention.

FIG. 3 is a plan view showing a part of the liquid crystal display device according to the second embodiment of the invention, and FIG. 4 is a cross sectional view taken along the line 4—4 in FIG. 3. A first and second substrates by itself are not shown in FIG. 3.

Also in the second embodiment, the lower electrode 2, the signal electrode sand the anode oxide electrode 5 are disposed on the first substrate 1 as a first electrode made of a tantalum (Ta) film. The nonlinear resistor layer 3 made of tantalum oxide ($Ta_2O_5$) film is formed on the surface of the first electrode including the lower electrode 2 as an anode oxide film of the first electrode by itself.

Further, the upper electrode 6 made of a chromium (Cr) film and a first connecting electrode 22 forming a part of the anode oxide electrode made of the same chromium (Cr) film are formed on the nonlinear resistor layer 3 as a second electrode.

The lower electrode 2, the nonlinear resistor layer 3 and the upper electrode 6 constitute the TFD structured nonlinear resistor 9.

The display electrode 7 and the second connecting electrode 8 (corresponding to the connecting electrode 8 in the first embodiment) forming a part of the anode oxide electrode 5 are made of an indium tin oxide (ITO) film and disposed on the first substrate 1 as a third electrode. The upper electrode 6 is electrically connected to the display electrode 7 by way of a connecting part 7a forming the part of the display electrode 7.

Further, the first connecting electrode 22 comprising the second electrode and the second connecting electrode 8 comprising the third electrode cover a part of the anode oxide electrodes 5 comprising the first electrode, wherein the anode oxide electrodes 5 are separated at the separating side 10 of the second connecting electrode 8, thereby constituting independent connecting terminals 23, 24, 25 . . .

Since the connecting terminals 23, 24, 25 . . . conduct with the signal electrodes 4 in each row by way of the separated anode oxide electrodes 5, an external circuit (a driver IC, etc. like the case of the first embodiment) is connected to the connecting terminals 23, 24, 25 . . . so as to apply a voltage independently to the nonlinear resistors 9 by way of the signal electrodes 4 in each row, so that an intended image can be displayed on the display electrodes 7.

Further, in the second embodiment, the connecting terminals 23, 24, 25 . . . are disposed on the terminal forming part 1a of the first substrate 1 to be close to each other so that they can be connected to the external circuit using a chip-on-glass (COG) method.

The COG method comprises forming an anisotropic conductive sealing agent or conductive particles in convex on a semiconductor integrated circuit (IC) so as to mount the IC on the substrate utilizing an adhesive in the anisotropic conductive sealing agent.

Also in the second embodiment, the signal electrodes 4 in each row are connected to each other by the anode oxide electrode 5 when the anodic oxidation treatment is performed for forming the nonlinear resistor layer on the lower electrode 2.

Further, when the etching treatment is performed using the second connecting electrode 8 comprising the second electrode as a mask upon completion of the anodic oxidation treatment, e.g., upon completion of the inspection of the liquid crystal display panel, the runner parts 5a (shown by an imaginary line in FIG. 3) which are not covered with the second connecting electrode 8 of the anode oxide electrode 5 are removed, and they are separated from each other at each separating side 10 in the periphery of the second connecting electrode 8, thereby constituting the independent connecting terminals 23, 24, 25 . . . conducting the signal electrodes in each row.

Consequently, according to the second embodiment, even in the case of utilizing the COG method which is employed for mounting of the ICs with high density, the signal electrodes 4 are connected to each other by the anode oxide electrode 5 at the time of anodic oxidation treatment, and thereafter they may be independent of each other with a simple etching treatment upon completion of predetermined steps.

Accordingly, it is possible to obtain the same effect as the first embodiment, and also possible to easily process each terminal of the independent signal electrodes even in case that the electrode terminals are arranged with high density, which is needed for mounting the ICs with high density during manufacturing of or inspecting of the liquid crystal display panel or upon completion of the inspection of the liquid crystal display panel.

Further, it is possible to enhance the adhesive force or bonding between the anode oxide electrode 5 and the second connecting electrode 8 since the first connecting electrode 22 comprising the second electrode and the second connecting electrode 8 comprising the third electrode are formed in this order on the anode oxide electrode 5 comprising the first electrode.

[Third Embodiment]

A liquid crystal display device according to a third embodiment of the invention will be described next with reference to FIGS. 5 through 8.

Figure 5:
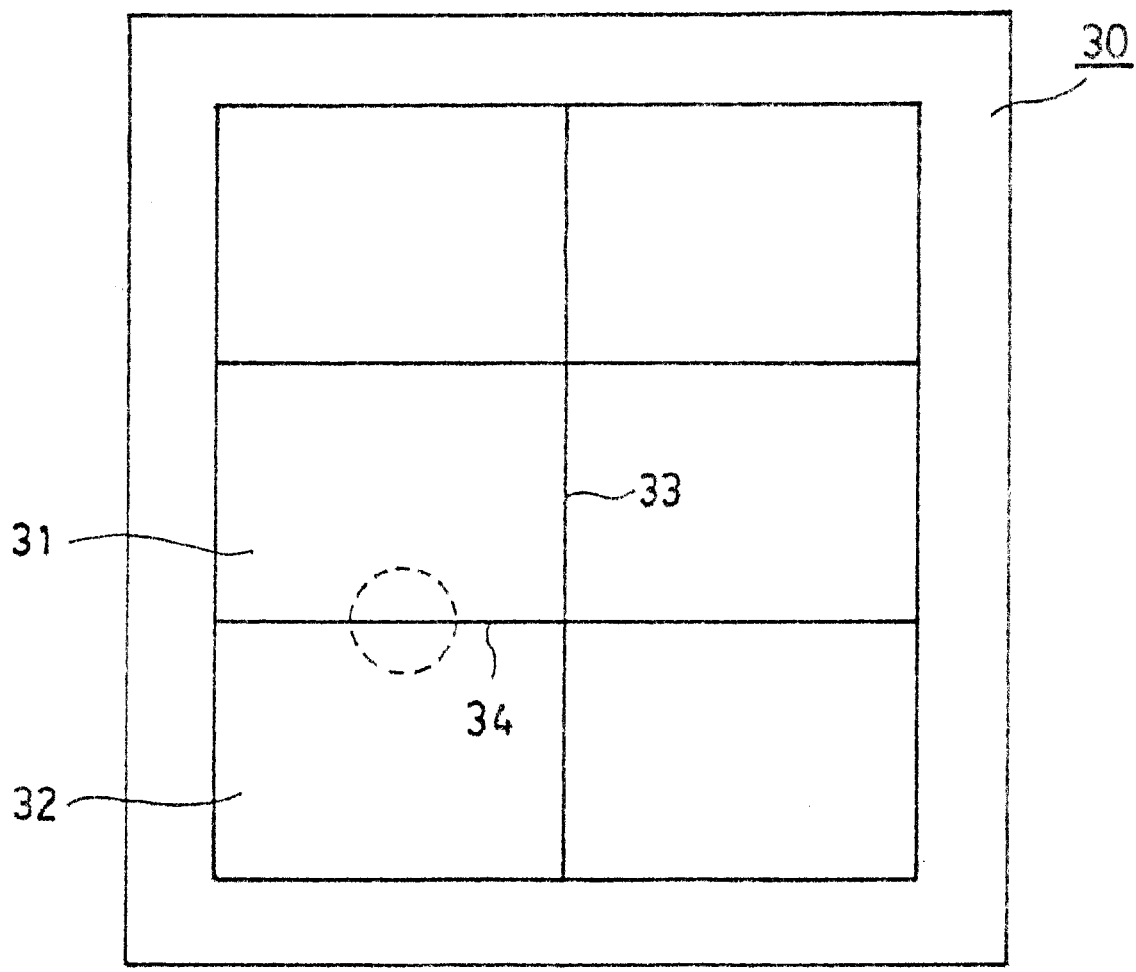
FIG. 5 is a view showing a state where a plurality of substrates for liquid crystal display devices are arranged on a large substrate according to a third embodiment of the invention.
Figure 6:
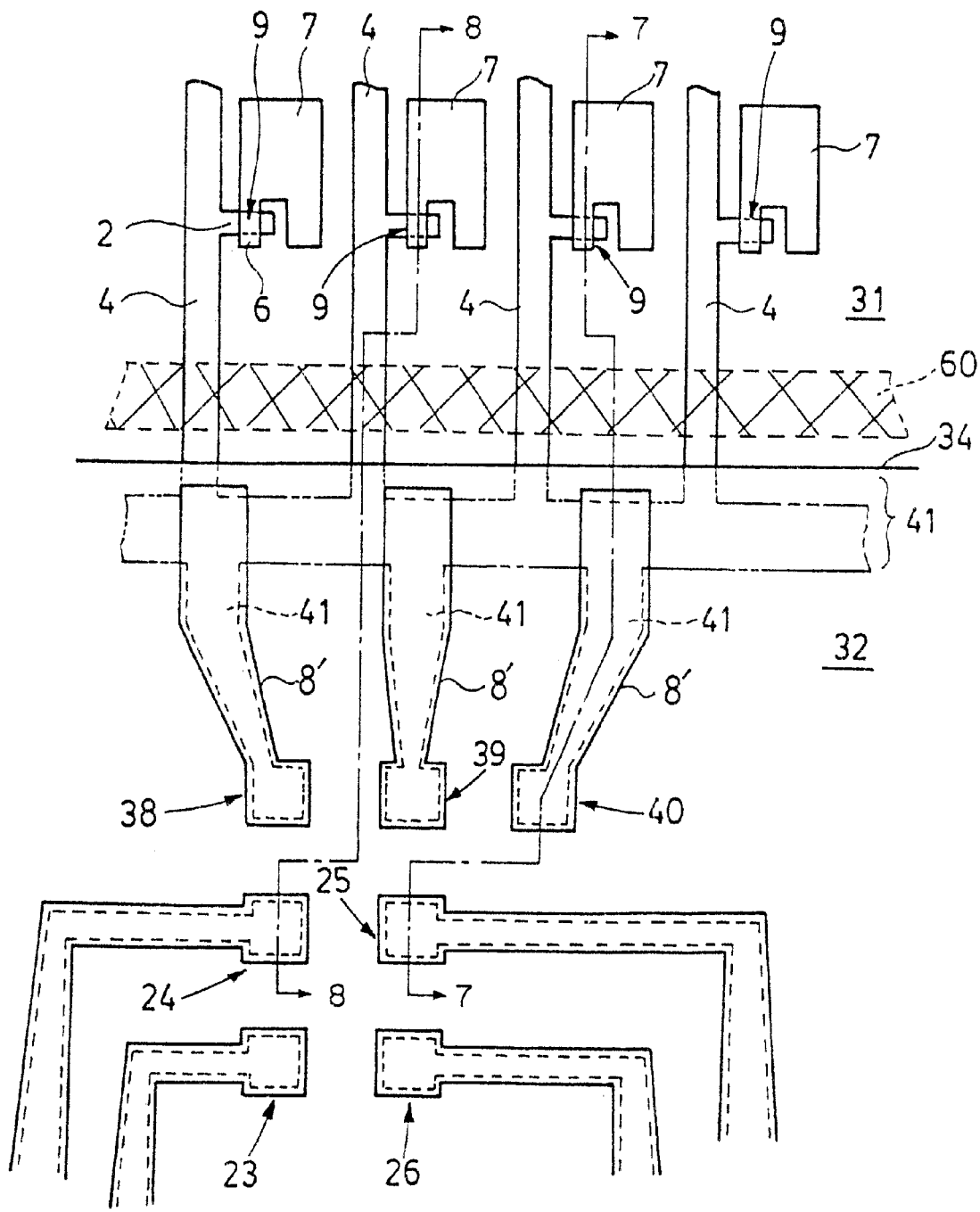
FIG. 6 is an enlarged plan view showing a bordering part of two substrates for the liquid crystal display devices which are encircled by a broken line in FIG. 5.
Figure 7:
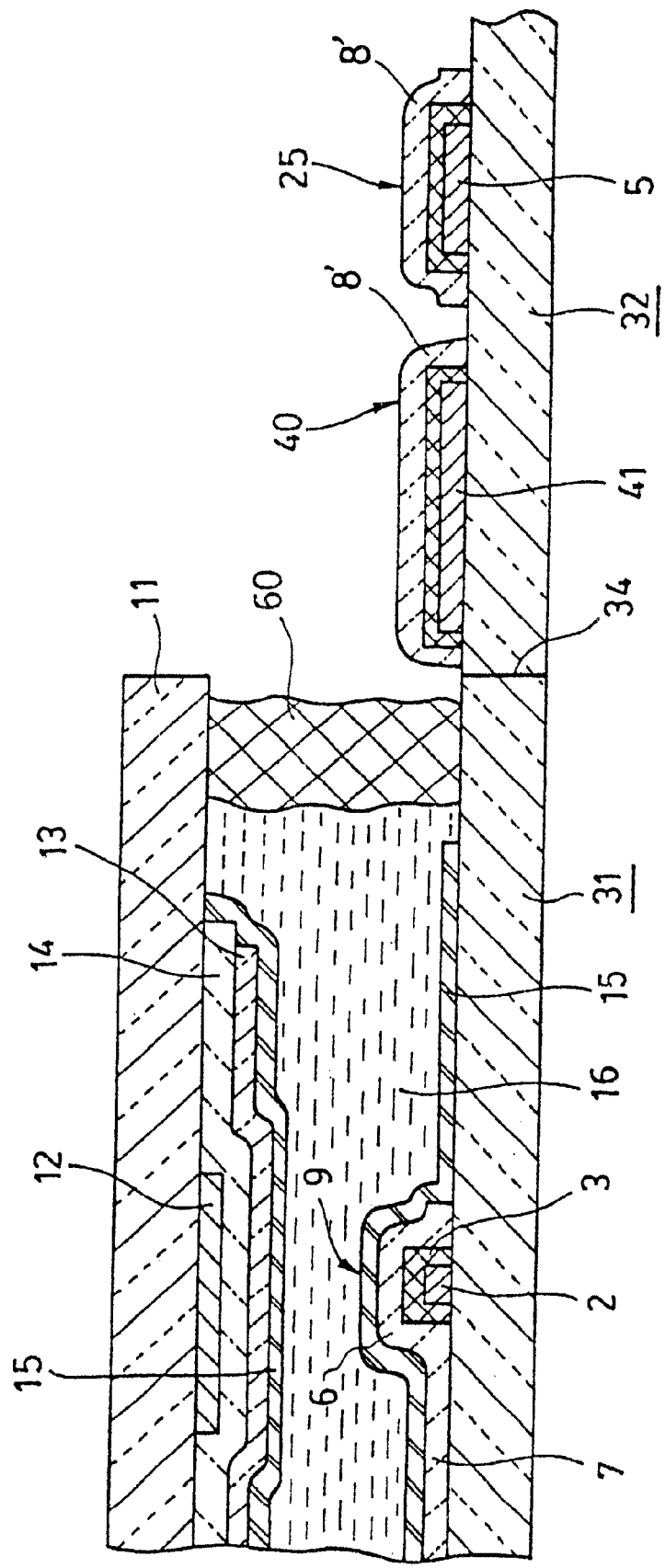
FIG. 7 is a cross sectional view taken along the line 7—7 in FIG. 6. showing a state where the liquid crystal display device is structured.

FIG. 5 is a plan view showing a state where a plurality of substrates for liquid crystal display devices are arranged on a large substrate according to a third embodiment of the invention. FIG. 6 is an enlarged plan view showing a bordering part of two substrates of the liquid crystal display devices which are encircled by a broken line in FIG. 5. FIG. 7 is a cross sectional view taken along the line 7—7 in FIG. 6, and FIG. 8 is a cross sectional view taken along the line 8—8 in FIG. 6.

As shown in the plan view in FIG. 5, a plurality of (6 in this case) substrates 31, 32 . . . for the liquid crystal display devices are formed on a first large substrate 30. The substrates 31 and 32 . . . for the liquid crystal display devices are used by being separated at separating lines 33 and 34.

Figure 8:
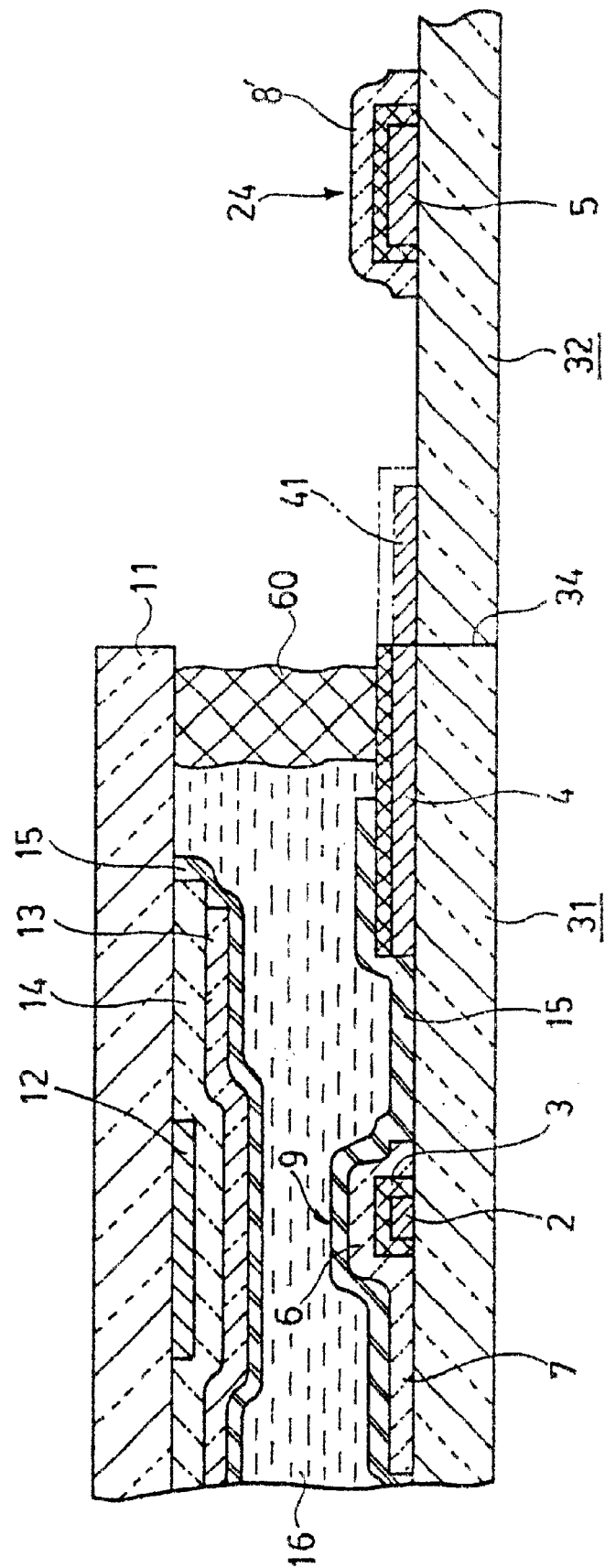
FIG. 8 is a cross-sectional view taken along the line 8—8 in FIG. 6.

Further, as the first electrode made of the tantalum (Ta) film, the lower electrode 2, the signal electrode 4 and an anode oxide electrode 41 are disposed on the substrates 31 or 32 for the liquid crystal display devices (corresponding to the first substrate 1 of the aforementioned embodiments) as shown in FIGS. 6 and 8.

The anode oxide electrode 41 has a structure that it is disposed on the substrate 32 for the liquid crystal display device as shown in FIG. 6, and it connects the signal electrodes 4 of the adjoining substrates 31 for the liquid crystal display devices to each other to apply a voltage from the signal electrodes 4 to the lower electrodes 2 at the time of anodic oxidation treatment.

There is provided on the lower electrode 2 the nonlinear resistor layer 3 made of the tantalum oxide ($Ta_2O_5$) film serving as an anode oxide film formed by subjecting the lower electrode 2 by itself to an anodic oxidation treatment.

Further, the upper electrode 6 provided on the nonlinear resistor layer 3, the display electrode 7 connected to the upper electrode 6, and an input electrode 8' (corresponding to the connecting electrode 8 in the aforementioned embodiments) for covering a part of the anode oxide electrode 41 comprising the first electrode on the adjoining substrates for the liquid crystal display devices disposed on the large substrate 30 are provided as the second electrode made of an indium tin oxide (ITO) film.

The lower electrode 2, the nonlinear resistor layer 3 and the upper electrode 6 constitute the TFD structured nonlinear resistor 9.

As shown in FIG. 6, since the input electrode 8' comprising the second electrode covers a part of the anode oxide electrode 41 comprising the first electrode of the adjoining substrates 32 for the liquid crystal display devices, the anode oxide electrode 41 is separated at the side which is the same as that of the input electrode 8' in the etching treatment upon completion of the anodic oxidation treatment, so that the parts as illustrated by imaginary lines shown in FIG. 6 are removed. Accordingly, independent input terminals 38, 39 and 40 in the adjoining substrates 32 for the liquid crystal display devices are formed together with the connecting terminals 23, 24, 25, and 26 for the driver ICs.

Denoted by 60 is a seal for sealing the liquid crystal 16 between the substrate 31 or 32 for the liquid crystal display device and the second substrate 11, and the internal structure thereof as the liquid crystal display device is the same as that of the first embodiment.

With the arrangement of the third embodiment, even if the substrates for the liquid crystal display devices are disposed in plural numbers on the large substrate, the signal electrodes 4 are connected to each other by the anode oxide electrode 41 at the time of anodic oxidation treatment, and it is possible to obtain independent signal electrodes 4 as the anode oxide electrode 41 when performing the etching treatment using the input electrode 8' as a mask during or after the inspection of the liquid crystal display panel.

Accordingly, the independent signal electrodes can be easily processed even if the high density signal electrodes necessary for mounting the ICs with high density are arranged.

In the case of providing a plurality of substrates for the liquid crystal display devices on the large substrate, the connection and separation of signal electrodes 4 are carried out utilizing the anode oxide electrode 41 comprising the first electrode of the adjoining liquid crystal display devices and the input electrode 8' comprising the second electrode thereof so that a space for removing the anode oxide electrode is not required, enabling an effective utilization of the large substrate.

Parts which remain after the anode oxide films 41 or 5 are separated can be effectively utilized as input terminals or connecting terminals of the adjoining liquid crystal display device.

[Fourth Embodiment]

A liquid crystal display device according to a fourth embodiment of the invention will be described next with reference to FIGS. 9 and 10.

Figure 9:
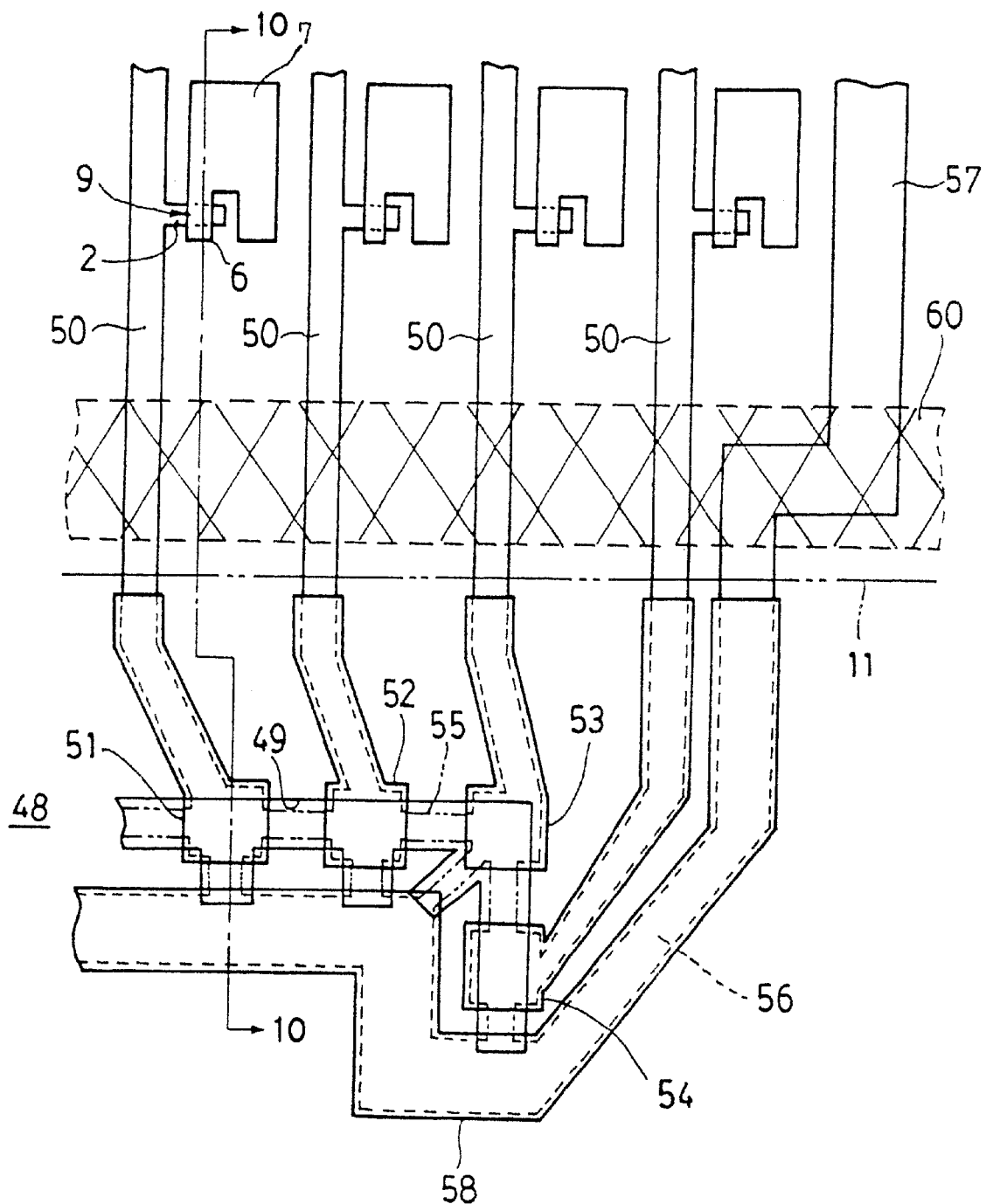
FIG. 9 is a plan view showing a part of a first substrate of a liquid crystal display device according to a fourth embodiment of the invention.
Figure 10:
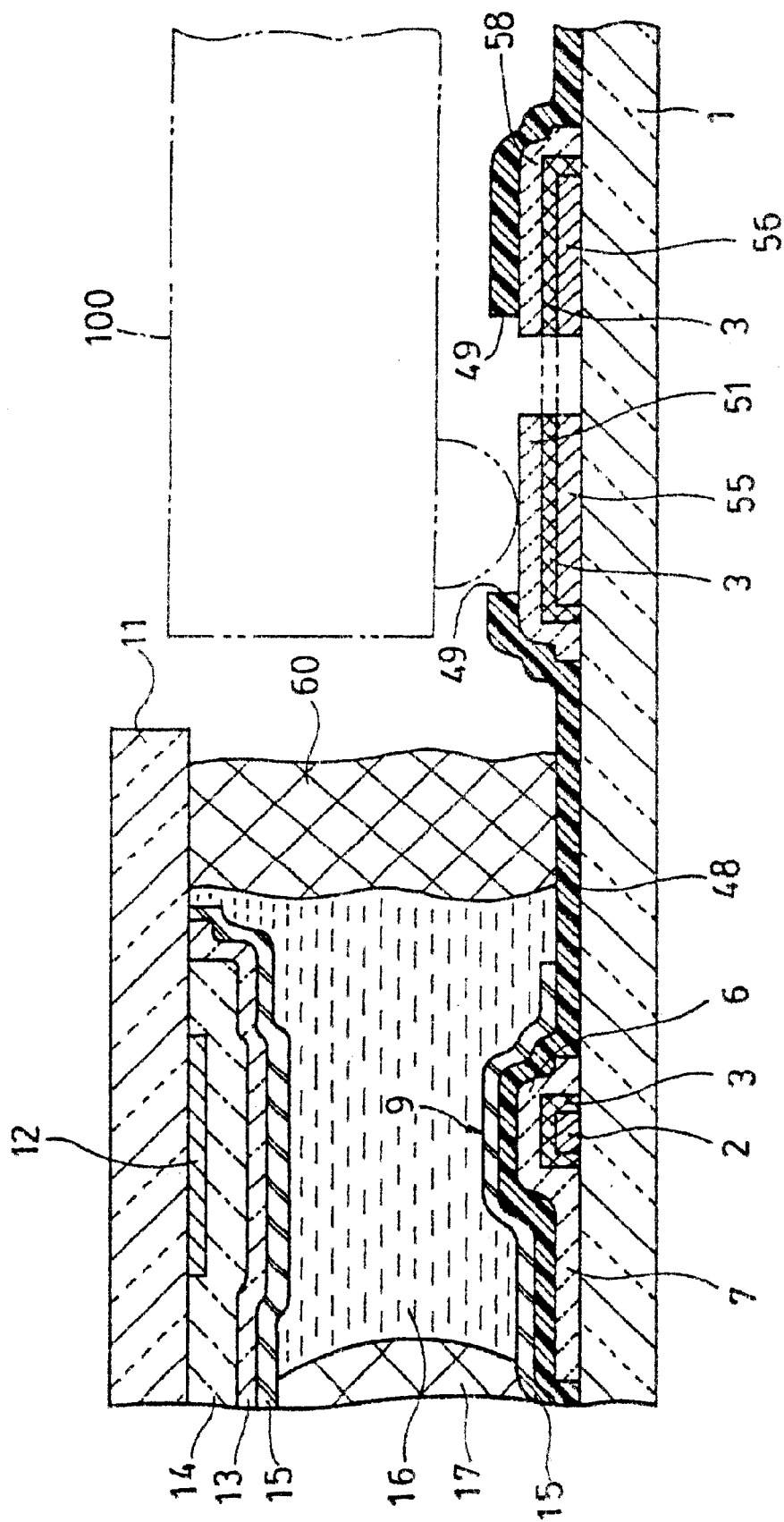
FIG. 10 is a cross sectional view taken along the line 10—10 in FIG. 9 showing a state where the liquid crystal display device is structured.

FIG. 9 is a plan view showing a part of a first substrate of the liquid crystal display device according to the fourth embodiment of the invention, and FIG. 10 is a cross sectional view taken along the line 10—10 in FIG. 9 in a state where the liquid crystal display device is structured.

The lower electrode 2 made of a tantalum (Ta) film, a signal electrode 50, a first anode oxide electrode 55 and a second anode oxide electrode 56 are disposed on the first substrate 1 as a first electrode in the present embodiment.

Further, the nonlinear resistor layer 3 made of a tantalum oxide ($Ta_2O_5$) film which is the anode oxide film of the lower electrode 2 by itself is provided on the lower electrode 2. The nonlinear resistor layer 3 comprising the anode oxide film is also formed on the surfaces of the signal electrodes, the first anode oxide electrode 55 and the second anode oxide electrode 56 which are the first electrode the same as the lower electrode 2.

The upper electrode 6 formed on the nonlinear resistor layer 3 and the display electrode 7 connected to the upper electrode 6 are respectively made of an indium oxide (ITO) film as the second electrode, and signal electrodes 50 extending onto the first substrate 1 outside the seal 60, the connecting electrodes 51, 52, 53 and 54 for covering a part of the first anode oxide electrode 55 between the signal electrodes 50, and a peripheral electrode 58 covering most of the second anode oxide electrodes 56 are provided as the second electrode made of tantalum oxide.

The second anode oxide electrode 56 and the peripheral electrode 58 are arranged so as to surround the connecting electrodes 51, 52, 53 and 54, and they are further connected to the peripheral electrode 57 which is adjacent to the display electrode 7 close to the seal 60.

The lower electrode 2, the nonlinear resistor layer 3 and the upper electrode 6 constitute the TFD structured nonlinear resistor 9.

There is a possibility that ion components of an orientational film 15 to regularly align liquid crystals or the liquid crystal 16 influence upon the nonlinear resistor 9 so that the nonlinear resistor 9 is changed or deteriorated in characteristics.

A transparent insulating film 48 is provided on the nonlinear resistor 9 or on the periphery thereof so as to prevent the nonlinear resistor 9 from being changed or deteriorated in characteristics.

The insulating film 48 has an opening 49 at the upper part of the first anode oxide electrode 55 for connecting the connecting electrodes 51 through 54 of the signal electrodes 50 and the second anode oxide electrode 56.

In a state where the liquid crystal display device is structured, a part of the first anode oxide electrode 55 exposed to the opening of the insulating film 48 as illustrated by imaginary lines in FIG. 9 is removed. Accordingly, the connecting electrodes 51 through 54 and the peripheral electrode 58 are electrically separated from each other, thereby constituting the independent electrodes.

Other structures are the same as those of the aforementioned embodiments.

In the structure of the liquid crystal display device according to the fourth embodiment, the insulating film 48 is provided on the anode oxide electrodes 55 and 56 comprising the first electrode for preventing the nonlinear resistor 9 from being changed or deteriorated in characteristic.

In the opening 49 of the insulating film 48, the anode oxide electrode 55 comprising the first electrode has such a shape that it is separated at a part of the side of the second electrode while it is self-aligned so that the signal electrodes 50 are independent of each other, and the connecting electrodes 51 through 54 constitute independent electrode terminals connected to an external circuit such as the driver IC 100 as illustrated by an imaginary line in FIG. 10.

When the anodic oxidation treatment is performed in this embodiment, it is possible to obtain the same effect as that of the aforementioned embodiments since the signal electrodes 50 are connected to each other by the first and second anode oxide electrodes 55 and 56.

Since the second anode oxide electrodes 56 are arranged close to the connecting electrodes 51 through 54, and the connecting electrodes 51 through 54 are connected to each other by branched portions of the first anode oxide electrodes 55, it is possible to disperse the static electricity to the peripheries of the connecting electrodes 51 through 54 and the signal electrode 50 when the static electricity is generated in the connecting electrodes 51 through 54 or from the signal electrode 50.

Further, there is no increase in manufacturing steps since the first anode oxide electrode 55 in the opening 49 (illustrated by the imaginary lines in FIG. 9) is removed so as to process the signal electrodes 50 to be independent of each other at the same time when performing the etching treatment when the opening 49 is defined in the insulating film 48.

The second substrate 11 and the seal 60 are assembled with each other when the opening 49 is defined in the insulating film 48.

By this, it is possible to define the opening 49 in the insulating film 48 when a voltage is applied from a region where a part of the insulating film is removed by laser beam to the signal electrode 50 upon completion of the manufacture or inspection of the liquid crystal display panel which is liable to generate static electricity or immediately before the driver IC 100 is mounted using the chip-on-glass method.

Accordingly, it is possible to prevent the nonlinear resistor 9 from being deteriorated in characteristic in the step involving in generation of static electricity such as the step of printing the orientational films 15 onto the first substrate 1 having the nonlinear resistor 9 or the step of performing orienting process by rubbing the surfaces of the orientational films 15 with a cloth.

As a result, it is possible to obtain a liquid crystal display device having uniform and stable characteristics with excellent display quality.

[Modifications of First to Fourth Embodiments]

A tantalum film is employed as the first electrode in the first to fourth embodiments. Besides, it is possible to employ a tantalum film containing nitrogen, a tantalum film containing phosphorus, or a tantalum film containing niobium as well as an ordinary tantalum film as a first electrode.

Further, it is possible to employ a multilayer film as the first electrode comprising a low resistance material such as aluminum, copper or nickel, and a film comprising tantalum or tantalum containing impurities.

In each of the aforementioned embodiments, a tantalum film is employed as the first electrodes 2 and the tantalum oxide film is formed as the nonlinear resistor layer. However, it may be possible to provide a silicon oxide film, a silicon nitride film or silicon oxide containing impurities on the surface of the tantalum oxide film, and to employ a nonlinear resistor layer comprising a multilayer film composed of the tantalum oxide film and these films.

Further, a film to be formed on the tantalum oxide film of the nonlinear resistor layer comprising the multilayer film is preferable to be formed utilizing a plasma vapor chemical deposition method (CVD method). Thus, when a voltage is applied to the tantalum oxide film, electrical stability is improved, thereby preventing the nonlinear resistor from being deteriorated.

Further, it is possible to control a current-voltage characteristic of the nonlinear resistor by employment of the nonlinear resistor layer comprising the multilayer film. Accordingly, an overcurrent is restrained from flowing to the nonlinear resistor, thereby further improving the characteristics of the liquid crystal display device.

Still further, although the liquid crystal display device has one nonlinear resistor in each pixel in the first to fourth embodiments, a plurality of nonlinear resistors may also be provided in each pixel.

Even in this case, it is possible to control the current-voltage characteristic of the nonlinear resistor by employment of a nonlinear resistor layer comprising a multiple layer film. As a result, the overcurrent is restrained from flowing into the nonlinear resistor, thereby improving the characteristics of the liquid crystal display device.

[Fifth Embodiment]

A liquid crystal display device according to a fifth embodiment of the invention will be described next with reference to FIGS. 11 through 14.

Figure 11:
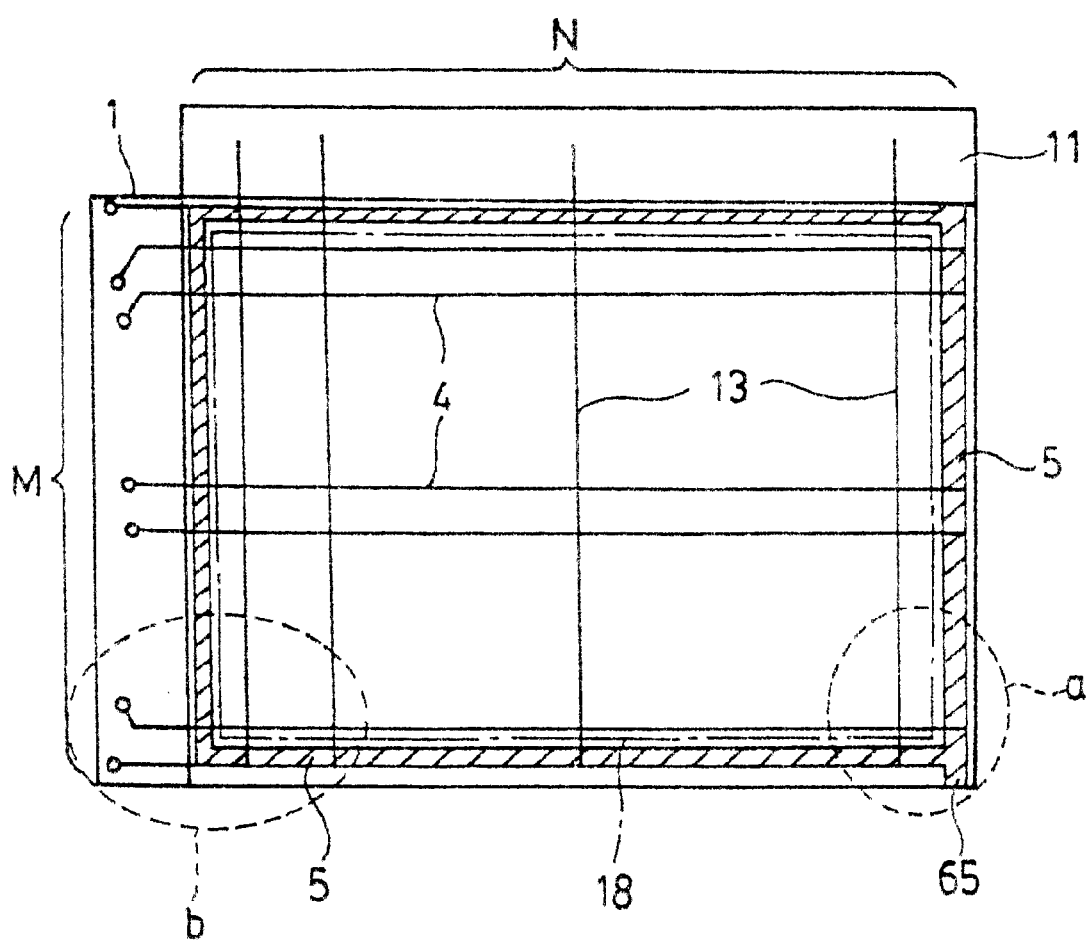
FIG. 11 is a plan view showing an entire structure of a liquid crystal display device according to a fifth embodiment of the invention.

FIG. 11 is a plan view showing an entire structure of the liquid crystal display device according to the fifth embodiment, and the structures of both first and second substrates which are overlaid on top of each other are denoted by solid lines so as to be understood easily.

Figure 12:
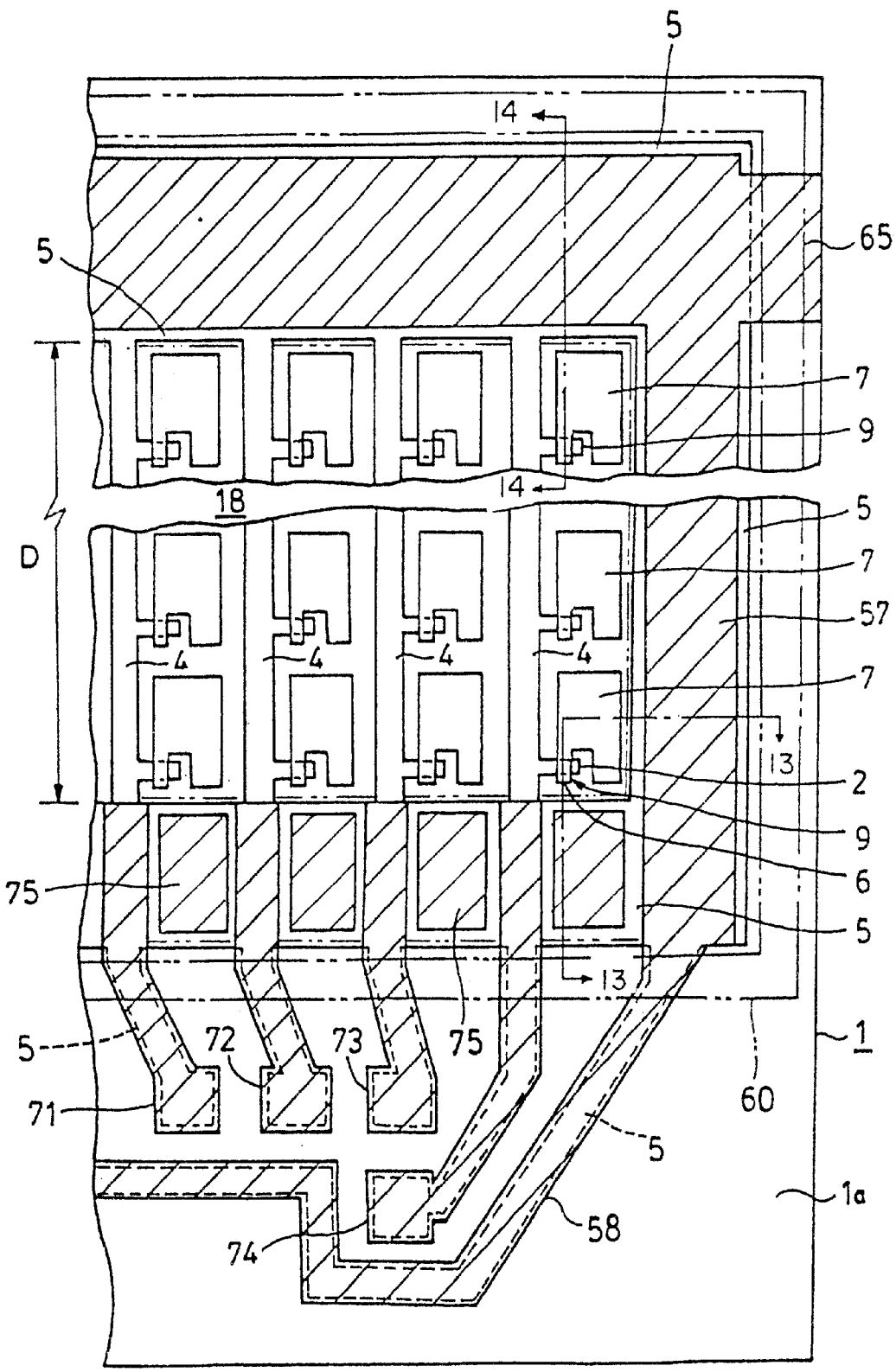
FIG. 12 is a plan view enlarging parts which are encircled by broken lines a and b in FIG. 11.

FIG. 12 is a plan view enlarging the parts encircled by the broken lines a and b in FIG. 11. The upper substrate and a film formed thereon are not shown in FIG. 12. The part encircled by the broken line a is shown above while the part encircled by the broken line b is shown below.

Figure 13:
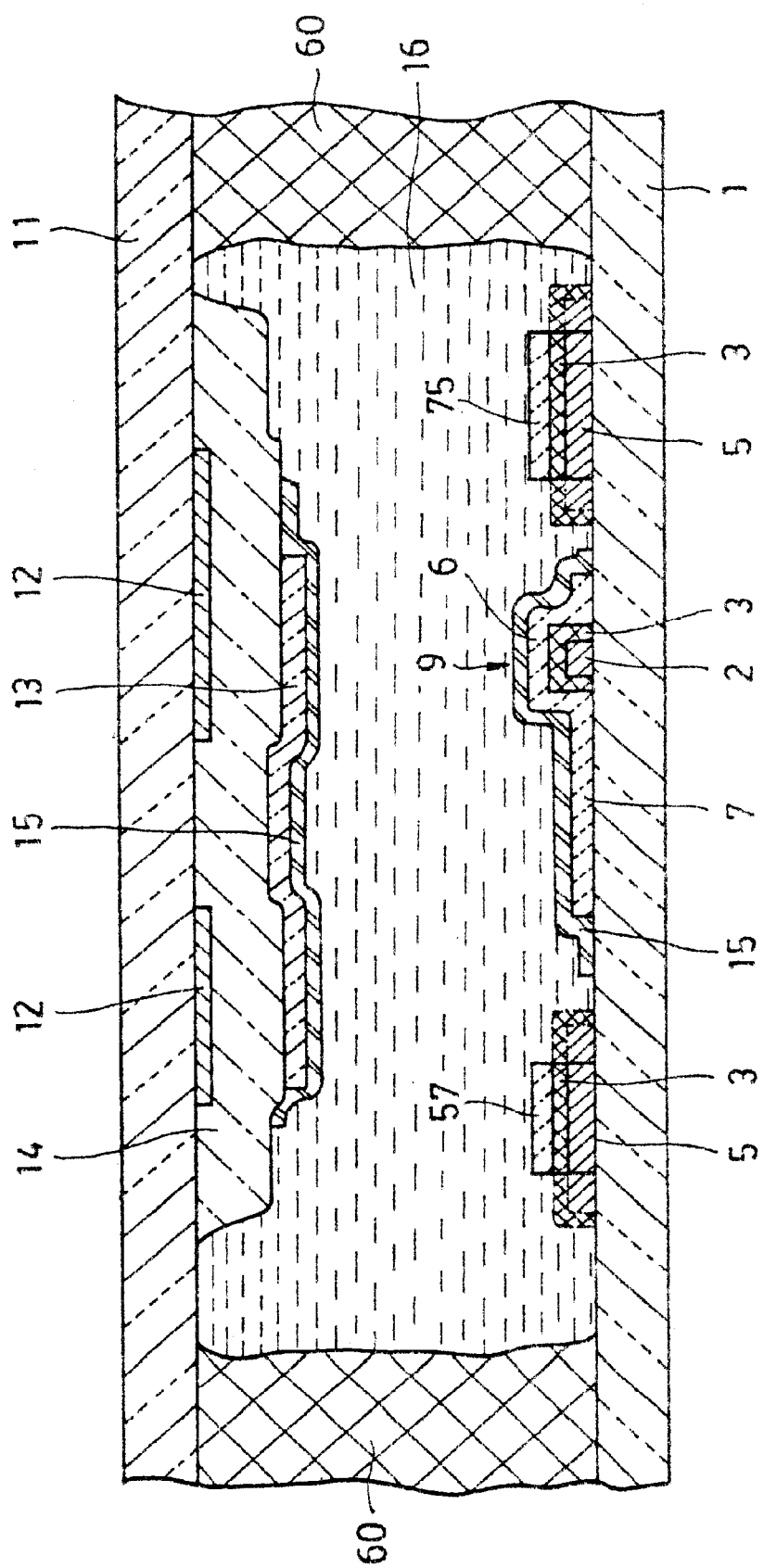
FIG. 13 is a cross sectional view taken along the line 13—13 in FIG. 12 showing a state where the liquid crystal display device is structured.
Figure 14:
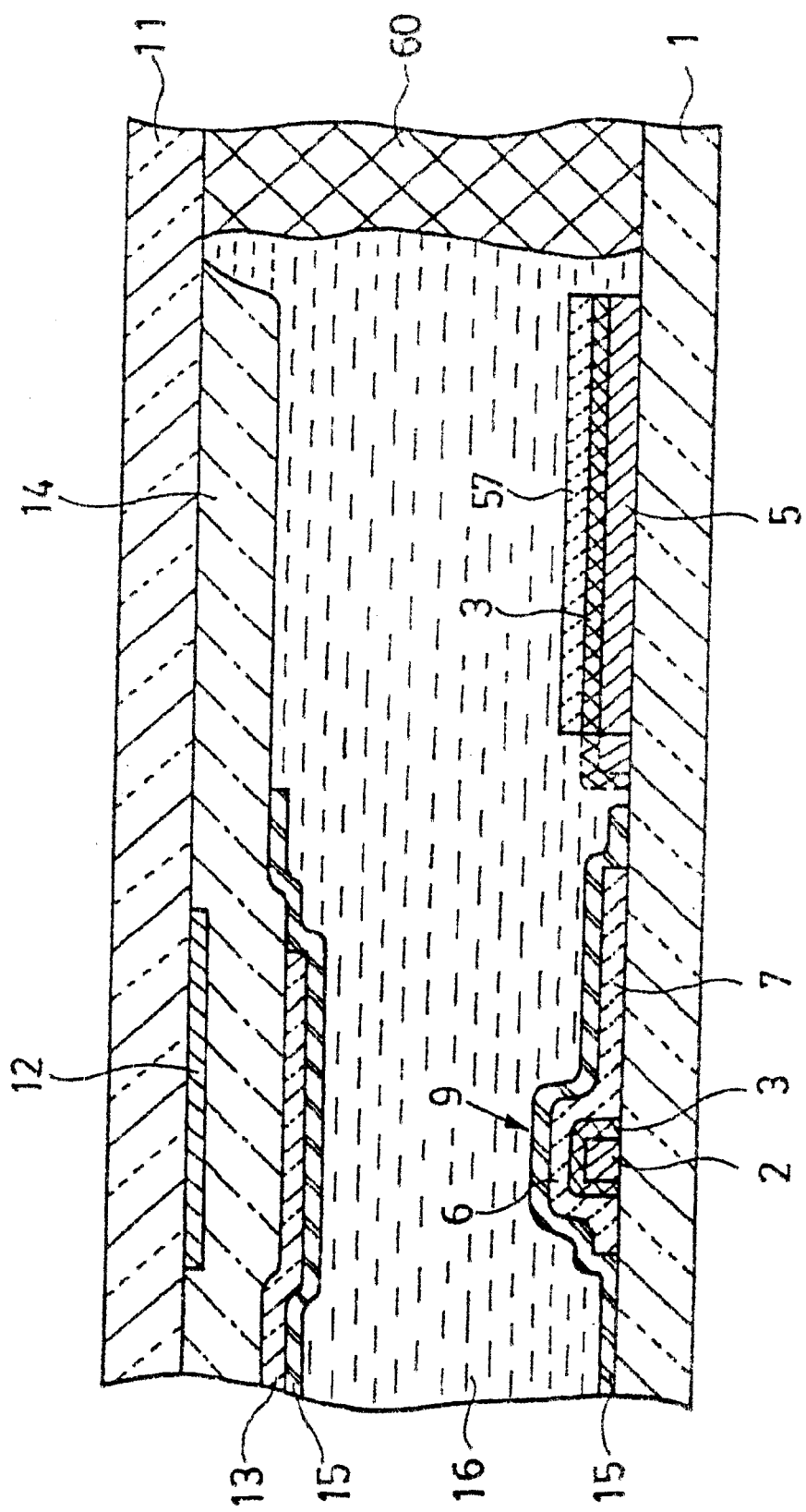
FIG. 14 is a cross sectional view taken along the line 14—14 in FIG. 12.

FIG. 13 is a cross sectional view taken alone the line 13—13 in FIG. 12 in a state where the liquid crystal display device is structured, and FIG. 14 is a cross sectional view taken along the line 14—14 in the same FIG. 12.

The basic structure of the liquid crystal display device of this embodiment is common to that of the aforementioned each embodiment.

That is, the lower electrode 2, the signal electrode 4 and the anode oxide electrode 5 are provided on the first substrate 1 as the first electrode comprising the tantalum (Ta) film. The nonlinear resistor layer 3 made of a tantalum oxide ($Ta_2O_5$) film is formed on the lower electrode 2 and the anode oxide electrode 5 as the anode oxide film of these first electrodes.

In this embodiment, the anode oxide electrode 5 is formed in a belt shape so as to surround the periphery of the display region 18 as illustrated by a hatched line in FIG. 11. A mutual connecting electrode 65 is provided at the end of the first substrate 1 to connect the anode oxide electrodes 5 of the first substrates 1 to prepare a plurality of first substrates 1 from a large basic substrate.

The anode oxide electrodes 5 comprising the first electrode has a structure that a plurality of signal electrodes 4, 4 . . . are connected to each other at a periphery of the matrix-shaped display region 18 comprising the signal electrodes 4 in M rows and the opposed electrodes 13 in N columns as shown in FIGS. 11 and 12.

The upper electrode 6 on the nonlinear resistor layer 3 and the display electrode 7 connected to the upper electrode 6 are made of an indium tin oxide (ITO) film as the second electrode.

The lower electrode 2, the nonlinear resistor layer 3 and the upper electrode 6 constitute the TFD structured nonlinear resistor 9.

Further, the peripheral electrodes 57 illustrated by a hatched line, connecting electrodes 71 through 74 connected to signal electrodes 4 and extending to a terminal forming part 1a outside the seal 60 of the first substrate 1, rectangular shading electrodes 75 which are arranged between the connecting electrodes with slight gaps, and the peripheral electrode 58 extending from the peripheral electrode 57 so as to surround the tip ends of the connecting electrodes 71 through 74 are made of an indium tin oxide (ITO) film as the second electrodes and are arranged on the anode oxide electrodes 5 provided so as to surround the display region 18 in which a plurality of display electrodes 7 are arranged in a matrix shape in FIG. 12.

That is, all of the anode oxide electrodes 5 are formed at the lower parts of each electrode illustrated by the hatched lines in FIG. 12, and all of the signal electrodes 4 are surely connected to each other at both ends thereof by the anode oxide electrodes 5 at the time of the anodic oxidation treatment.

The peripheral electrodes 57 and 58, the connecting electrodes 71 through 74 and the shading electrodes 75 comprising these second electrodes serve as a mask to cover a part of the anode oxide electrodes 5, wherein the display region 18 in a width denoted by D in FIG. 12 is subject to an etching treatment while it is masked, so that the part of the anode oxide electrodes 5 exposed through these masks are removed.

Accordingly, the signal electrodes 4 and the connecting electrodes 71 through 74 connected thereto are separated from each other, thereby constituting the independent electrodes.

In FIGS. 13 and 14, the removed parts of the anode oxide electrodes 5 and the nonlinear resistor layers 3 are illustrated by imaginary lines.

The other structures are the same as those of the aforementioned embodiments, and hence the explanation thereof is omitted.

Also in the fifth embodiment, since the signal electrodes 4 are connected to each other by the anode oxide electrodes 5 at the time of anodic oxidation treatment for forming the nonlinear resistor layer 3 and in the succeeding inspection step, etc., the same effect as that of the aforementioned embodiments can be obtained. Further, since the connection of the signal electrodes 4 is carried out at both ends thereof, it can be surely performed, and even if the signal electrodes are broken at some part of the signal electrodes, the anodic oxidation treatment can be surely performed.

When the etching treatment is performed in an arbitrary step utilizing the second electrode as a mask, it is possible to easily separate the signal electrodes 4 from the connecting electrodes 71 through 74 in FIG. 12, thereby forming the independent electrodes. At this time, both sides of the peripheral electrode 57, right and left sides of the connecting electrodes 71 through 74 and the peripheral sides of the shading electrodes 75 form the separating side.

Opaque anode oxide electrodes 5 remain on the outer periphery of the display region 18 to form the shading portion, thereby constituting a frame of the display region 18.

In such a manner, it is possible to form the frame (frame surrounding the periphery of the display region) even in the liquid crystal display device having no black matrix 12 by utilizing the anode oxide electrode 5 as the shading portion.

The width of the anode oxide electrode 5 can be widened by the anode oxide electrode 5 which is utilized for the frame, thereby improving uniformity of the anode oxide film.

[Sixth Embodiment]

A liquid crystal display device according to a sixth embodiment of the invention will be described next with reference to FIGS. 15 and 16.

In the sixth embodiment, TFD structured elements are employed as the nonlinear resistor in which two TFD elements are connected in series with each other in each pixel portion, and the TFD elements are provided at the data electrodes arranged in N columns.

Figure 15:
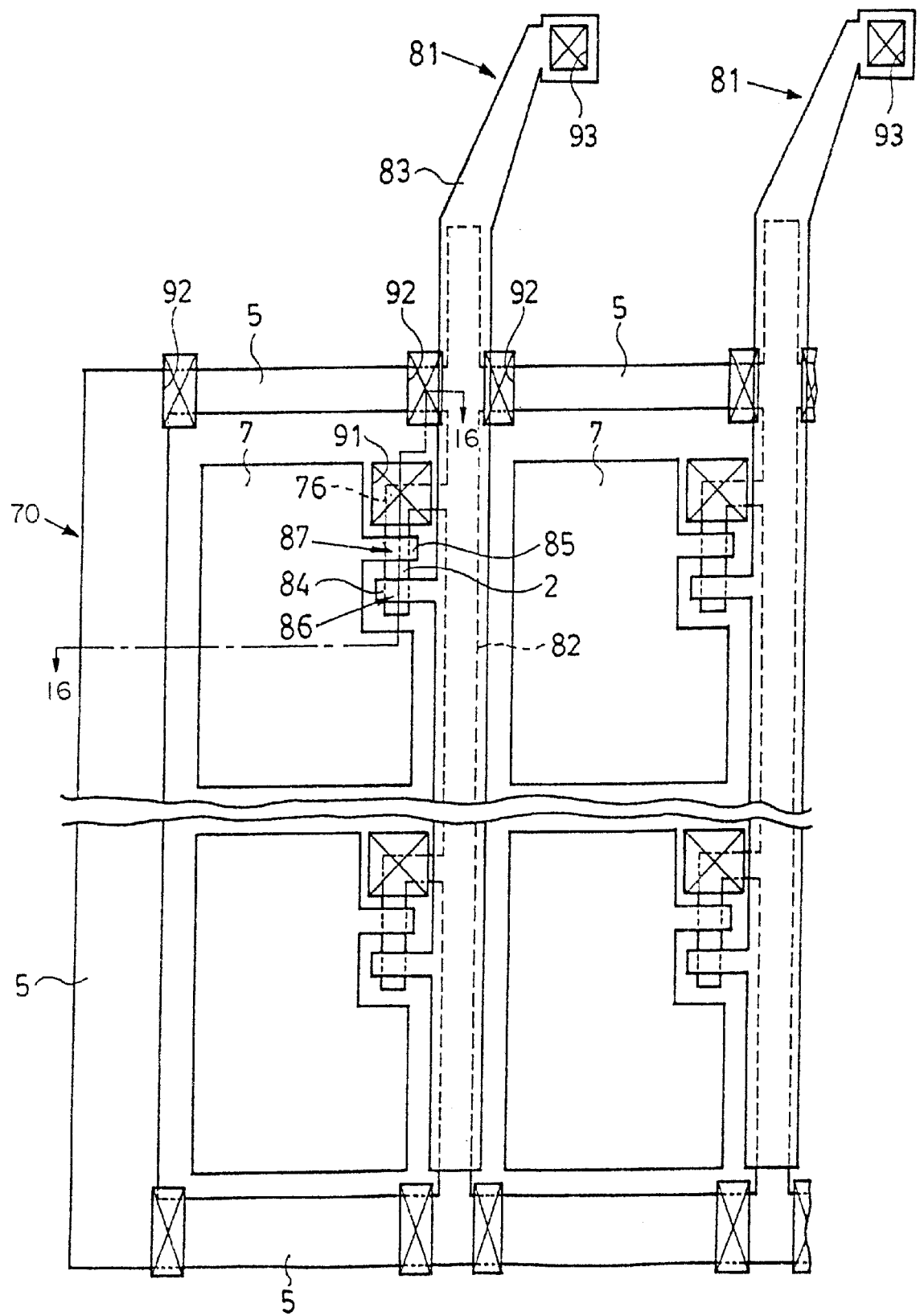
FIG. 15 is an enlarged plan view of a part of a liquid crystal display device according to a sixth embodiment of the invention.
Figure 16:
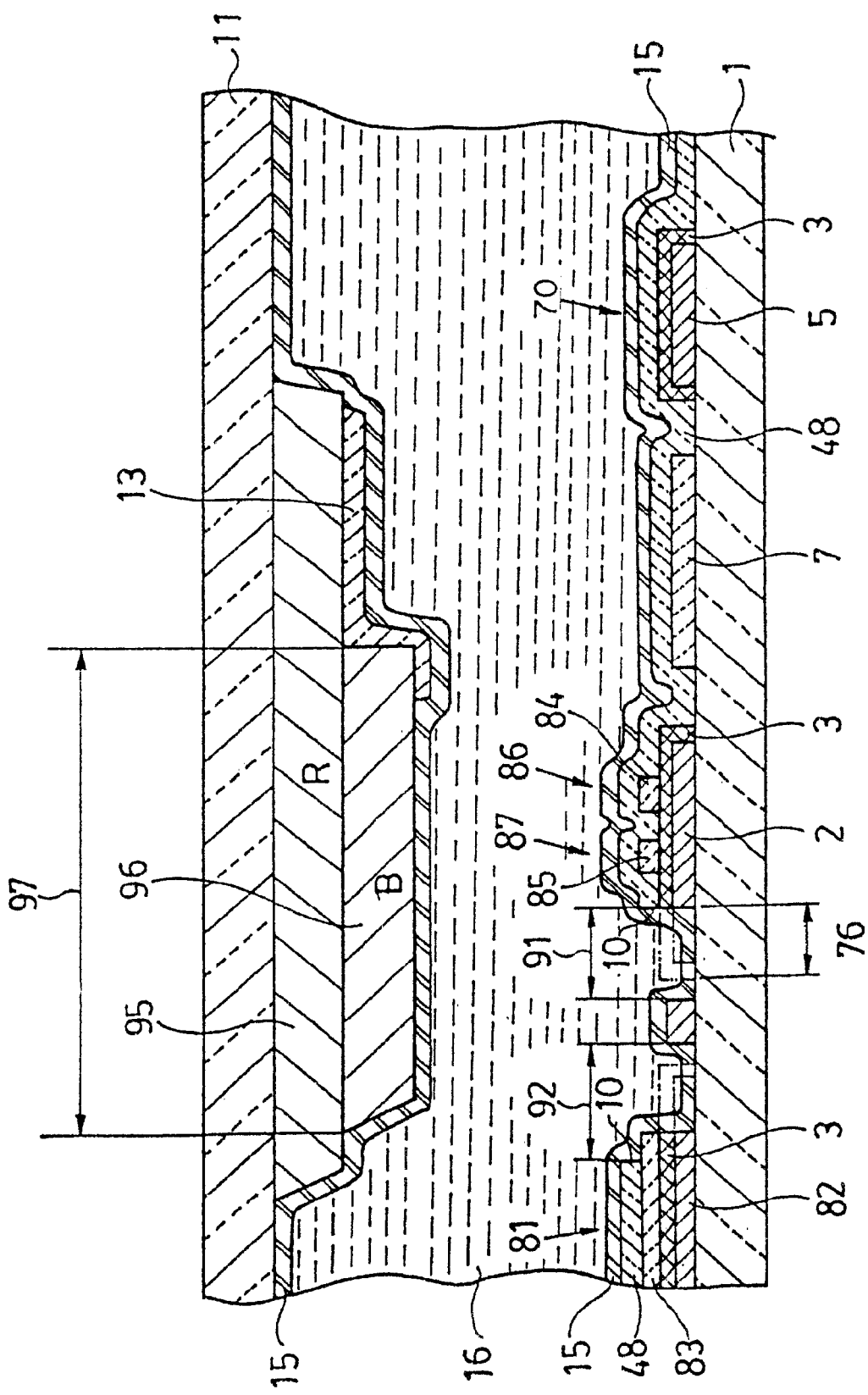
FIG. 16 is a cross sectional view taken along the line 16—16 in FIG. 15.

FIG. 15 is a plan view enlarging a part of the liquid crystal display device, and FIG. 16 is a cross sectional view taken along the line 16—16 of FIG. 15.

In this embodiment, an island-shaped lower electrode 2, a first data electrode 82, the anode oxide electrode 5, a line connecting part 76 for connecting the island-shaped lower electrode 2 and the first data electrode 82 are disposed on the first substrate 1 as a first electrode made of a tantalum (Ta) film, and the nonlinear resistor layer 3 made of a tantalum oxide ($Ta_2O_5$) film is formed on the first electrode as the anode oxide film of the first electrode.

The anode oxide electrode 5 comprising the first electrode has a structure that it connects a plurality of data electrodes 81 and 81 to each other at the periphery of the matrix-shaped display region comprising the opposite electrodes in M rows and the data electrodes 81, 81 in N columns.

Further, an upper electrode 84 for a data electrode to be connected to a second data electrode 83, an upper electrode 85 for a display electrode to be connected to the display electrode 7, the display electrode 7 and the second data electrode 83 on the first data electrode 82, which are made of an indium tin oxide (ITO) film are disposed on the nonlinear resistor 3 on the island-shaped lower electrode 2 as the second electrode.

The island-shaped lower electrode 2, the nonlinear resistor layer 3 and the upper electrode 84 for a data electrode constitute a TFD structured first nonlinear resistor 86. Further, the island-shaped lower electrode 2, the nonlinear resistor layer 3 and the upper electrode 85 for a display electrode constitute a TFD structured second nonlinear resistor 87.

The second data electrode 83, the upper electrode 84 for a data electrode, the nonlinear resistor layer 3, the lower electrode 2, the nonlinear resistor layer 3, the upper electrode 85 for a display electrode, and the display electrodes 7 are connected in this order. The second data electrode 83 and the display electrode 7 constitute symmetric TFD elements with respect to the island-shaped lower electrode 2.

The insulating film 48 made of a tantalum oxide ($Ta_2O_5$) film is provided on the first substrate 1 as shown in FIG. 16. A separating opening 91 for a wire connection part is defined in the insulating film 48 at the periphery of the line connecting part 76 for connecting the first signal electrode 4 and the island-shaped lower electrode 2. A plurality of separating openings 92 are defined in the anode oxide electrodes 5 as shown in FIG. 15.

Further, a connecting opening 93 for connecting the external circuit and the second data electrode 83 is defined in the second data electrode 83.

In the separating opening 91 for a wire connection part defined in the line connecting part 76 for connecting the first data electrode 82 and the island-shaped lower electrode 2, the insulating film 48 and the lower electrode 2 as the first electrode have the same separating side.

In a plurality of the separating openings 92 defined in the anode oxide electrodes 5, the insulating film 48 and the anode oxide electrode 5 have the same separating side 10.

The shading portions 70 formed by separating the anode oxide electrodes 5 at the same separating side as the insulating film 48 are provided on the upper and lower sides, and right and left sides of the display region.

Accordingly, a frame is structured by the shading portion 70 at the outer periphery of the display region.

Further, color filters comprising a red filter 95, a blue filter 96, and a green filter not shown, are provided at the inner surface of the second substrate 11 so that the liquid crystal display device performs a color display as shown in FIG. 16. A region 97 formed by overlapping the color filters is provided for preventing leaking of light from the gaps of the display electrodes 7.

Further, the opposed electrode 13 made of the indium tin oxide film is disposed on the second substrate 11 so as to confront the display electrode 7.

The display electrode 7 forms a display pixel portion of the liquid crystal display panel when it is disposed to overlap the opposed electrode 13 by way of the liquid crystal 16. The display pixel portion has a single color filter, e.g., the red filter 95.

The liquid crystal display device performs a given image display owing to the change of transmittance of the liquid crystal 16 in the display pixel portion.

Further, the orientational films 15 and 15 are provided between the first substrate 1 and the second substrate 11 as the processing layers for regularly aligning the molecules of the liquid crystal 16.

With the arrangement of the sixth embodiment, the anode oxide electrodes 5 comprising the first electrodes have the separating side 10 at which they are separated in a self-alignment manner by the opening of the insulating film 48 at the periphery of the display region.

Further, as shown in this embodiment, when a plurality of TFD elements are connected with each other, it is necessary to separate the island-shaped lower electrodes 2 from the anode oxide electrode 5 or the first data electrode 82 after the nonlinear resistor layer 3 is formed.

Accordingly, it is necessary to adopt a method of separating utilizing the opening of the insulating film 48 or separating without the insulating film. Owing to the presence of this separating step, the shading portion 70 can be provided at the periphery of the display region using the anode oxide electrode 5 without particularly increasing the number of the steps in case of this embodiment.

Accordingly, when the portion where the color filters overlap is used as the frame instead of the black matrix, a frame having a sufficient shading ability can be formed utilizing the shading portion 70 where the anode oxide electrode 5 remains even if the shading property is insufficient at the frame.

Since a voltage can be applied from the periphery before the anode oxide electrode 5 is separated when the anodic oxidation treatment is performed for forming the nonlinear resistor layer 3, for example, even if there occurs a defect in a minority of the anode oxide electrodes 5, a voltage can be supplied from the other parts.

[Seventh Embodiment]

A liquid crystal display device according to a seventh embodiment of the invention will be described next with reference to FIGS. 17 and 18.

In this embodiment, a TFT structured element is employed as the nonlinear resistor.

Figure 17:
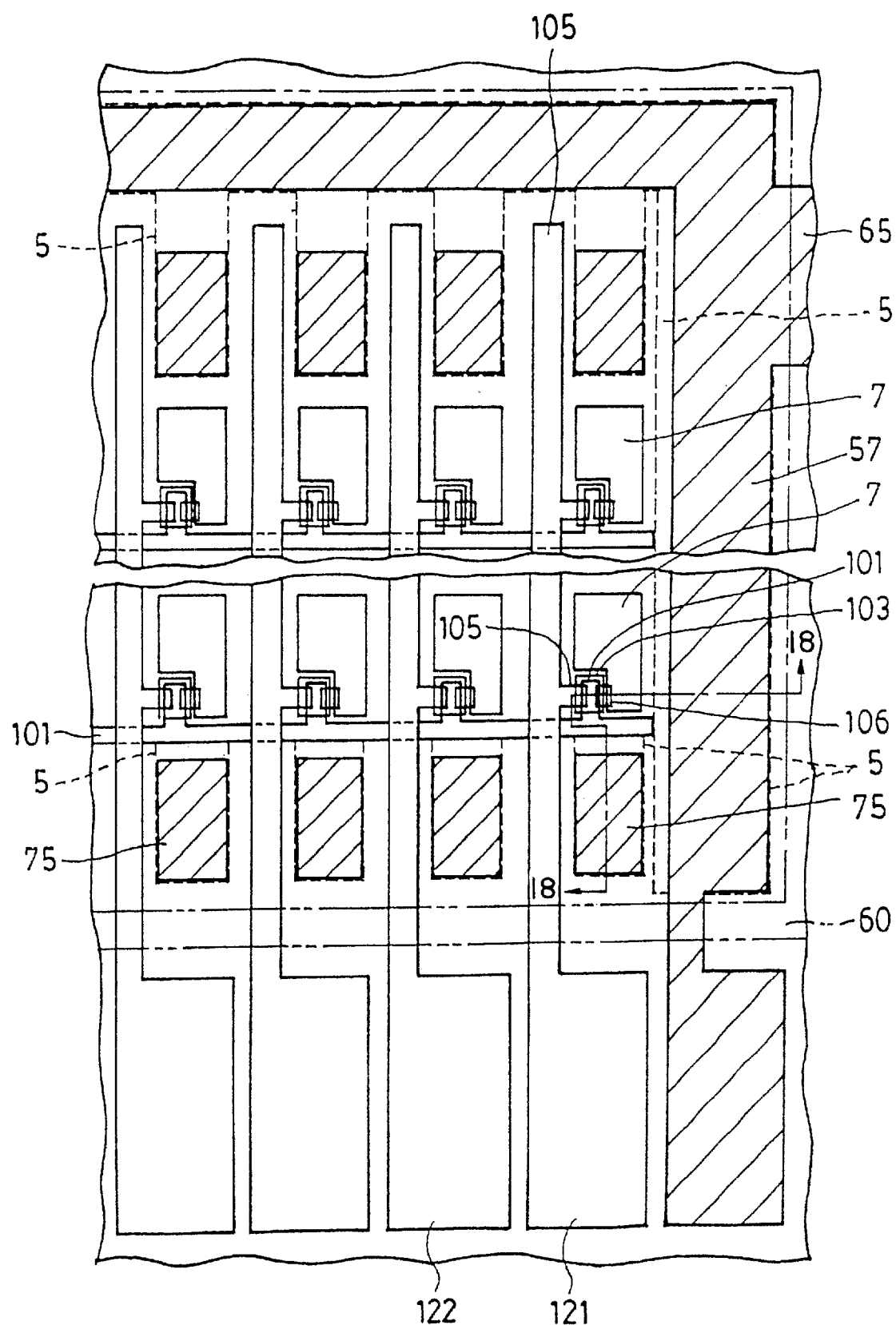
FIG. 17 is an enlarged plan view of a part of a liquid crystal display device according to a seventh embodiment of the invention.
Figure 18:
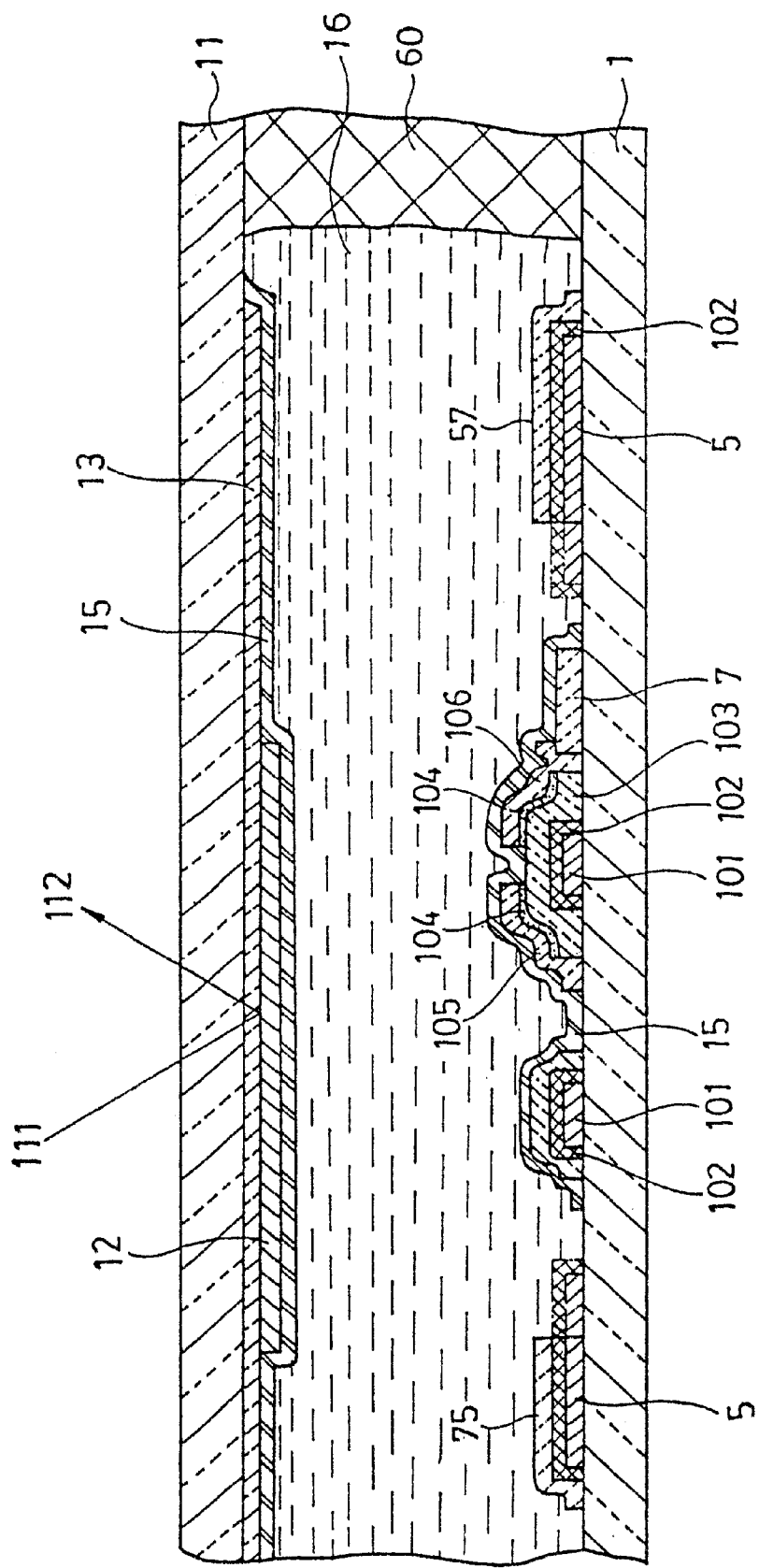
FIG. 18 is a cross sectional view taken along the line 18—18 in FIG. 17.

FIG. 17 is a plan view enlarging a part of the liquid crystal display device, and FIG. 18 is a cross sectional view taken along the line 18—18 in FIG. 17.

In this seventh embodiment, a gate electrode 101 corresponding to the signal electrode 4 and the anode oxide electrode are disposed on the first substrate 1 as the first electrode made of a tantalum (Ta) film, and a gate insulating film 102 made of a tantalum oxide ($Ta_2O_5$) film is formed on the first electrode as the anode oxide film of the first electrode.

The anode oxide electrodes 5 comprising the first electrode connects a plurality of gate electrodes 101 and 101 with each other at the periphery of the matrix-shaped display region comprising the gate electrodes 101 in M rows and a source electrode 105 in N columns as shown in FIG. 17. The anode oxide electrodes 5 are also provided under the peripheral electrode 57 and the shading electrode 75, as shown by hatched lines in FIG. 17.

An amorphous silicon (a-Si) film is provided on a gate insulating film 102 and a periphery thereof as a semiconductor layer 103. Further, a semiconductor layer 104 containing phosphorus (P) as impurity ion is provided on the semiconductor layer 103.

The source electrode 105 and a drain electrode 106 are provided on the semiconductor layer 104 containing impurity ions. The source electrode 105 and the drain electrode 106 are made of molybdenum (Mo). The semiconductor layer 104 containing impurity ions is provided on an overlapping part where the source electrode 105, the drain electrode 106, and the semiconductor layer 103 overlap. Further, the source electrode 105 is connected to data electrodes 121 and 122 connected to the external circuit.

The drain electrode 106 is connected to the display electrode 7 made of a transparent conductive film, thereby forming a display pixel portion.

A film which is the same as the display electrode 7 is provided on the anode oxide electrode 5 connected to the gate electrode 101. A part of the anode oxide electrode 5 is separated at the separating side which is the same as that of the display electrode 7, forming the shading portion.

A part of the anode oxide electrode 5 is covered with the peripheral electrode 57 and the anode shading electrodes 75 made of the films which are the same as that of the display electrode 7, wherein the display region is subject to an etching treatment while masking the display region so that the anode oxide electrodes 5 as shown by broken lines are removed, thereby permitting the gate electrodes 101 to be independent of each other. The frame is formed by the shading portion which is formed by the remained anode oxide electrode 5 at the outer peripheral portion of the display region.

The opposed electrode 13 made of a transparent conductive film is first disposed on the second substrate 11 so as to reduce the amount of light of a reflecting light 112 from an external light source 111 as shown in FIG. 18. Next, the black matrix 12 made of a chromium (Cr) film is provided for preventing leaking of light from the periphery of the display electrode 7. The reflecting light 112 can be reduced owing to the interference between the opposed electrode 13 made of the transparent conductive film, the second substrate 11 and the black matrix 12 made of the chromium film.

The liquid crystal display device performs a given image display owing to the change of transmittance of the liquid crystal 16 of the display pixel portion.

Further, the first substrate 1 and the second substrate 11 have orientational films 15 and 15 as processing layers for regularly aligning molecules of the liquid crystal 16.

The first substrate 1 and the second substrate 11 are confronted each other at a certain gap by a spacer (not shown), and they are bonded to each other by the seal 60, thereby filling the liquid crystal 16 between the first substrate 1 and the second substrate 11.

With the arrangement of the seventh embodiment, the anode oxide electrode 5 comprising the first electrode has a separating side for separating in self-matching manner by the same film as the display electrode 7 at the periphery of the display region.

It is possible to provide the shading portion at the periphery of the display region utilizing the anode oxide electrode 5 which remains after the separation thereof.

Since a voltage can be applied from the periphery of the anode oxide electrode 5 to the gate electrode 101 when performing the anodic oxidation treatment for forming the nonlinear resistor layer, before the anode oxide electrodes 5 are separated, it is possible to apply a voltage from the other part even if there occurs a defect in a minority of the anode oxide electrodes 5.

[Eighth Embodiment]

Figure 20:
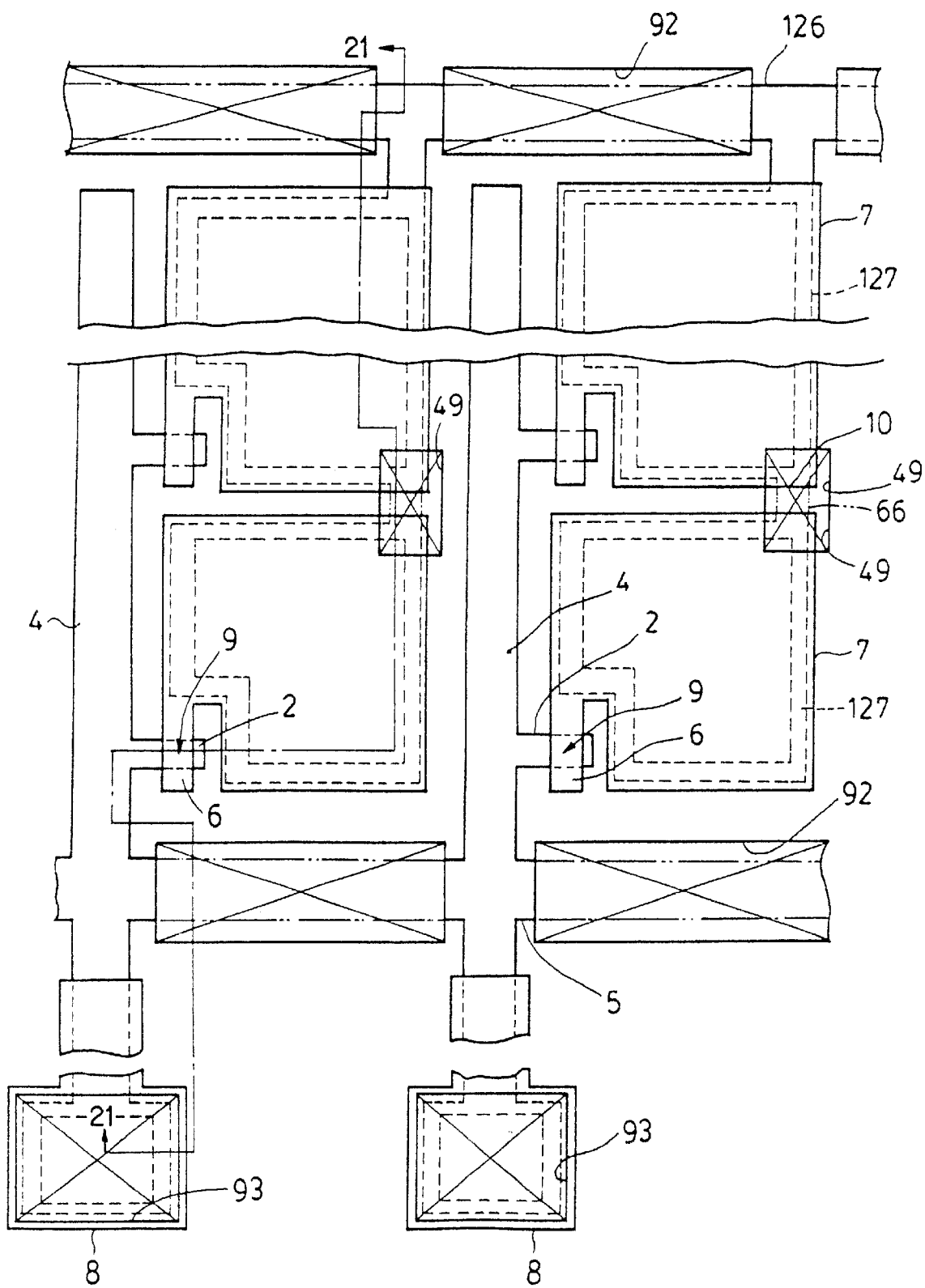
FIG. 20 is an enlarged plan view of a part of the liquid crystal display device in FIG. 19.
Figure 21:
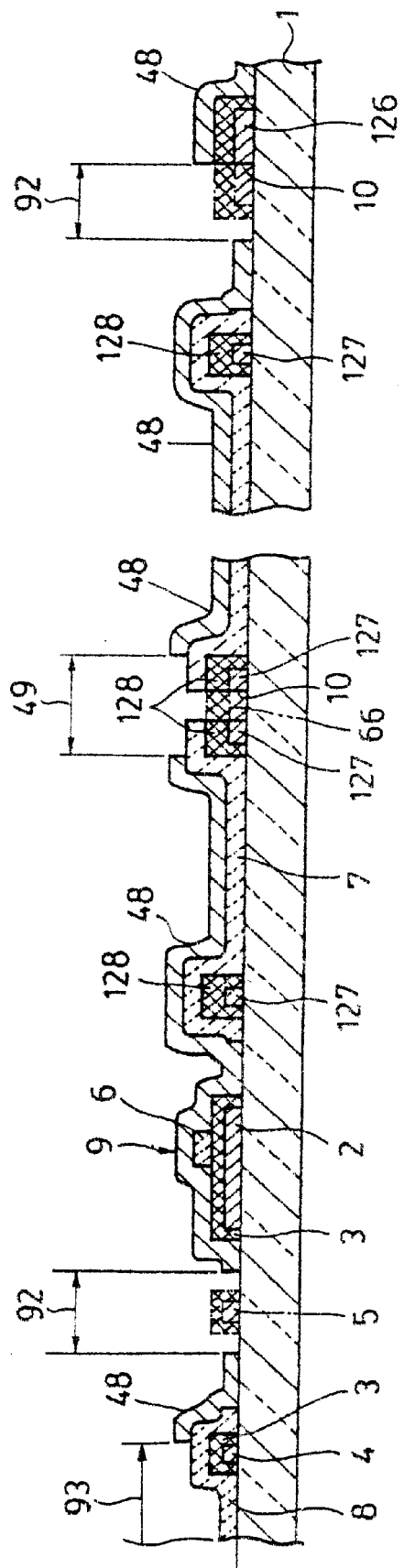
FIG. 21 is a cross sectional view taken along the line 21—21 in FIG. 20.

A liquid crystal display device according to an eighth embodiment of the invention will be described next with reference to FIGS. 19 through 21.

In the eighth embodiment, a TFD element is provided on the signal electrodes in M columns utilizing the TFD structured element as the nonlinear resistor.

The shading portion provided at the periphery of the display electrode 7 utilizes a part of a second anode oxide electrode 126, and a nonlinear resistor layer 128 on the second anode oxide electrode 126 is different in film thickness from the first nonlinear resistor layer 3 which is employed by the nonlinear resistor 9.

Figure 19:
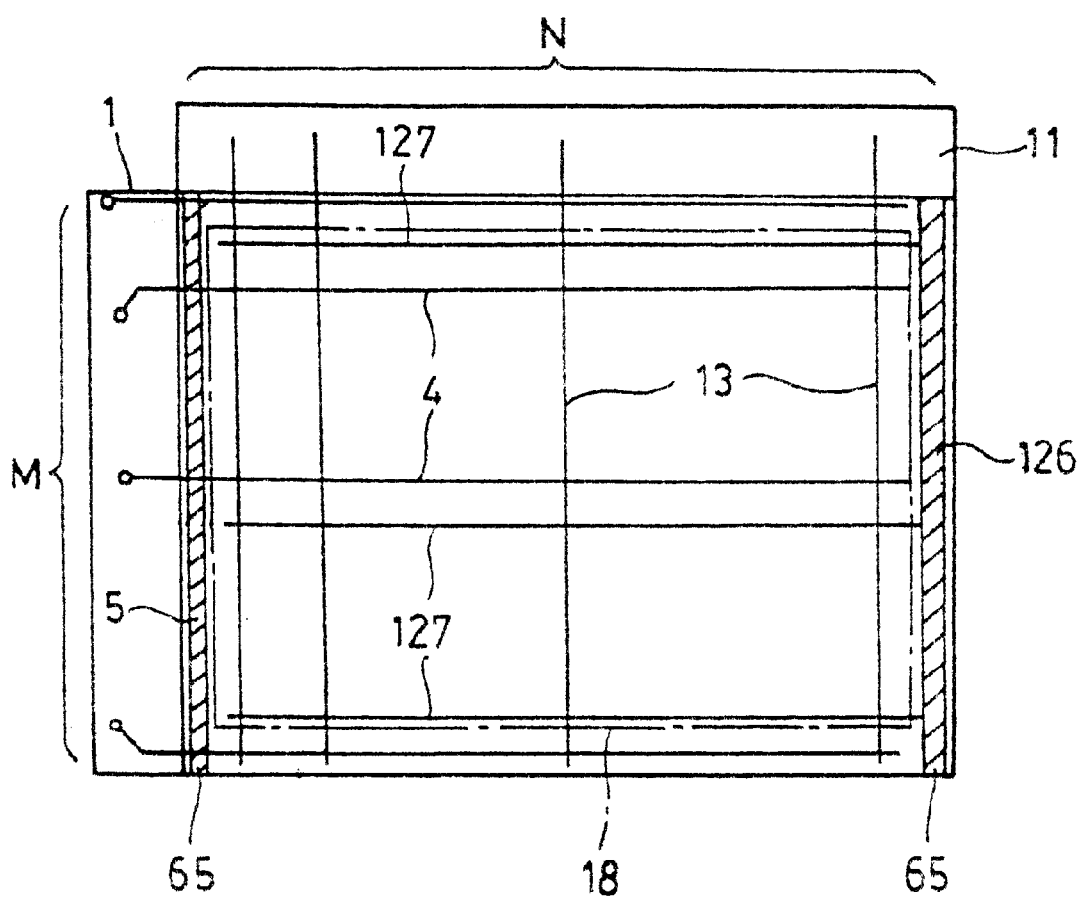
FIG. 19 is a plan view showing an entire structure of a liquid crystal display device according to an eighth embodiment of the invention.

FIG. 19 is a plan view showing an entire structure of the liquid crystal display device according to the eighth embodiment of the invention. FIG. 20 is a plan view enlarging a part of the liquid crystal display device in FIG. 19, and FIG. 21 is a cross-sectional view taken along the line 21—21 in FIG. 21. However, FIGS. 20 and 21 omit the illustration of the upper second substrate, and films formed on the same substrate, etc., and the liquid crystal.

The lower electrode 2, the signal electrode 4, the first anode oxide electrode 5, a second anode oxide electrode 126, an auxiliary electrode 127 and a mutual connecting electrode 66 are disposed on the first substrate 1 as the first electrode made of a tantalum (Ta) film, and the first nonlinear resistor layer 3 made of a tantalum oxide (Ta$_2$O$_5$) film is provided on the lower electrode 2, the first anode oxide electrode 5 and the signal electrode 4 as the anode oxide film of the first electrode.

The mutual connecting electrodes 65 are disposed on the ends of the first substrate 1 so as to connect the anode oxide electrodes 5 to each other for manufacturing a plurality of first substrates 1 from a large substrate as shown in FIG. 19.

The nonlinear resistor layer 128 made of the tantalum (Ta$_2$O$_5$) film is provided on the second anode oxide electrode 126 and the auxiliary electrode 127 as the anode oxide film of the first electrode. Further, the mutual connecting electrodes 65 and 65 are disposed on both ends of the first substrate 1 so as to connect the first anode oxide electrode 5 and the second anode oxide electrode 126 mutually for manufacturing a plurality of first substrates 1 from a large substrate as shown in FIG. 19.

The first anode oxide electrode 5 and the second anode oxide electrode 126 are separated from each other. The second nonlinear resistor layer 128 is larger in film thickness than the first nonlinear resistor layer 3 which is employed by the nonlinear resistor 9.

The first anode oxide electrode 5 comprising the first electrode has a structure that it connects a plurality of signal electrodes 4 to each other at the periphery of a matrix-shaped display region 18 composed of the signal electrodes 4 in M rows and the opposed electrode 13 in N columns.

The second anode oxide electrode 126 has a structure that it connects a plurality of the auxiliary electrodes 127 by the mutual connecting electrode 66. Further, the upper electrode 6 provided on the first nonlinear resistor layer 3, the display electrode 7 connected to the upper electrode 6, and the connecting electrode 8 forming a part of the first anode oxide electrode 5 are made of indium tin oxide (ITO) film.

The lower electrode 2, the first nonlinear resistor layer 3 and the upper electrode 6 constitute the TFD structured nonlinear resistor 9.

A part of the display electrode 7 covers the auxiliary electrode 127 connected to the second anode oxide electrode 126, and the display electrode 7 and the auxiliary electrode 127 constitute the shading portion.

The insulating film 48 made of tantalum oxide (Ta$_2$O$_5$) film is provided on the first substrate 1, the nonlinear resistor 9, the signal electrode 4, the display electrode 7, the first anode oxide electrode 5, and the second anode oxide electrode 126.

The separating openings 92 are defined in the insulating film 48 and arranged on the first anode oxide electrode 5 and the second anode oxide electrode. The first anode oxide electrodes 5 are separated from each other at the separating side 10 which is the same as that of the separating openings 92, so that they constitute the independent signal electrodes 4, while the second anode oxide electrodes 126 constitute the independent auxiliary electrodes 127.

Openings 49 are defined at the periphery of the display electrodes 7 and the auxiliary electrodes 127 are separated from each other at the separating side 10 which is the same as that of the display electrodes 7 or the openings 49 of the insulating films 48 every display electrodes 7, thereby forming the shading portions.

Openings 93 are also defined in the connecting electrode 8, enabled to be connected to the external circuit.

The structure of the second substrate 11 is the same as those of the aforementioned embodiments, wherein it comprises a black matrix made of a chromium (Cr) film for preventing leaking of light from gaps between the display electrodes 7, the opposed electrode 13 and an interlayer insulating film for securing an electric insulation between the black matrix and the opposed electrode 13.

The first substrate 1 and the second substrate 11 are bonded to each other at a certain gap, and the liquid crystal is filled therebetween, thereby forming the liquid crystal display device.

With the arrangement of the eighth embodiment, the second anode oxide electrode 126 comprising the first electrode is independent of the anode oxide electrode 5 from the first stage. Accordingly, the influence of the second anode oxide electrode 126 is not given to the first anode oxide electrode 5. Further, the second anode oxide electrode 126 has the separating side 10 at which it is separated in self-matching manner from the display electrode 7 comprising the second electrode or the opening 49 of the insulating film 48 at the periphery of the display region, thereby forming the independent shading portion for every display electrodes 7.

Further, the second nonlinear resistor layer 128 provided on the second anode oxide electrode 126 is made larger in film thickness than the first nonlinear resistor layer 3 provided on the lower electrode 2 by the first anode oxide electrode 5, thereby enhancing insulating property, so that the yield is improved without influencing upon the display quality even if the display electrode 7 and the auxiliary electrode 127 are electrically short circuited.

[Ninth Embodiment]

A liquid crystal display device according to a ninth embodiment will be described next with reference to FIGS. 22 and 23.

Figure 22:
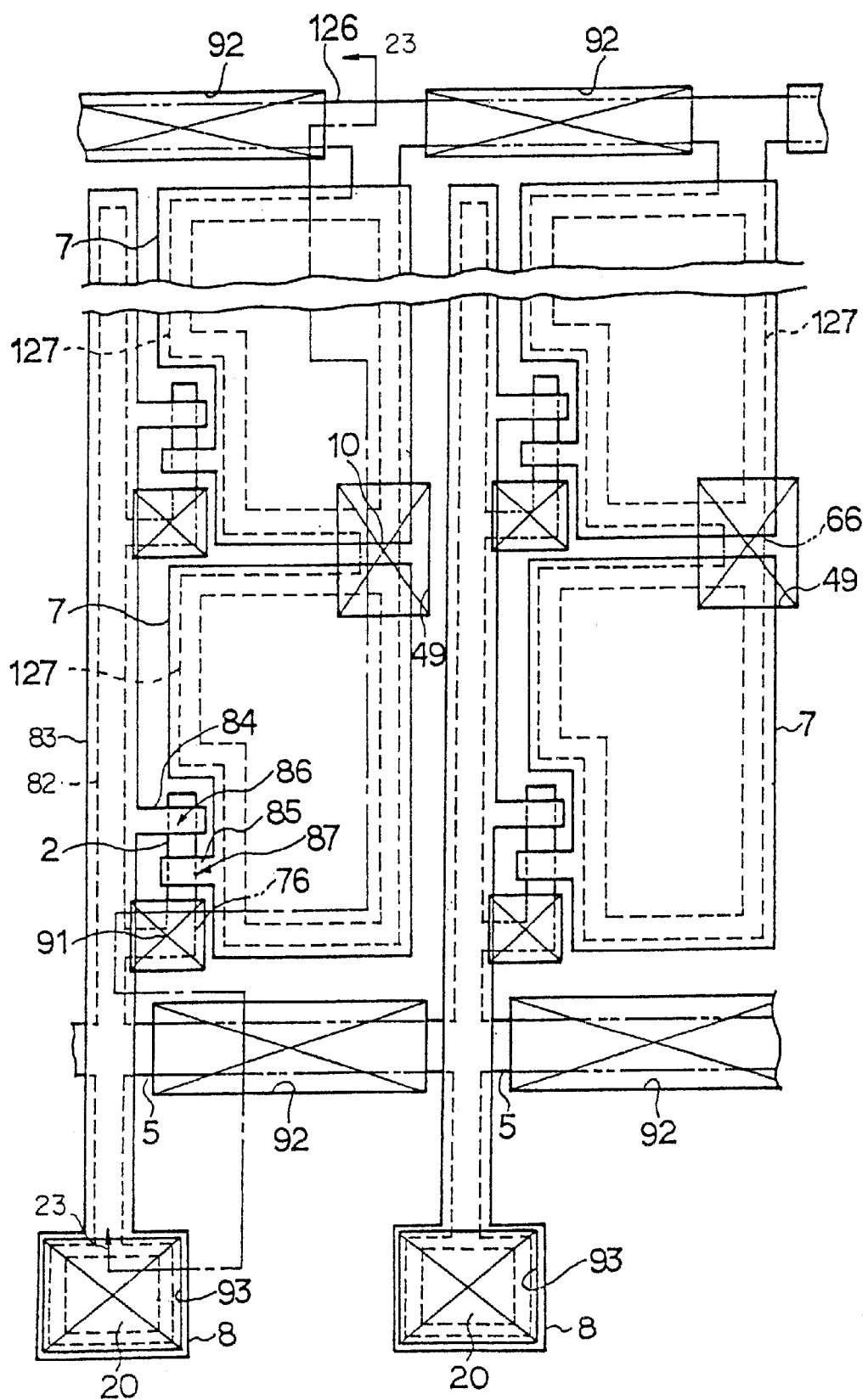
FIG. 22 is an enlarged plan view of a part of a liquid crystal display device according to a ninth embodiment of the invention.
Figure 23:
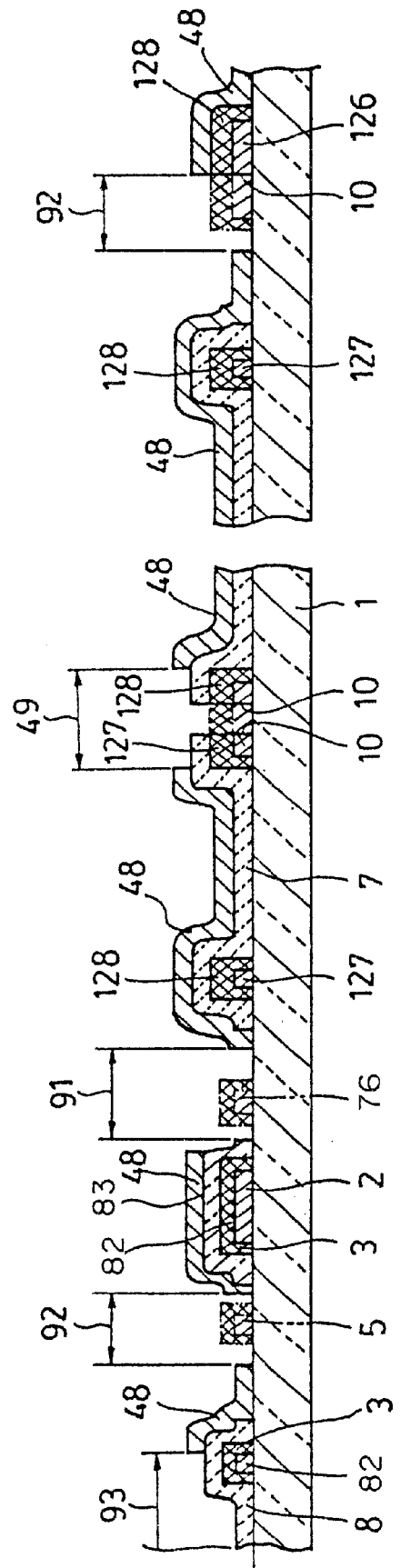
FIG. 23 is a cross sectional view taken along the line 23—23 in FIG. 22.

FIG. 22 is a plan view enlarging a part of the liquid crystal display device, and FIG. 23 is a cross sectional view taken along the line 23—23 in FIG. 22. In these figures, the components corresponding to those in FIGS. 15 and 16 are denoted by the same numerals.

The lower electrode 2, the first data electrode 82, a line connecting part 76 for connecting the first data electrode 82 and the lower electrode 2, the first anode oxide electrode 5, the second anode oxide electrode 126, the auxiliary electrode 127, and the mutual connecting electrode 66 are disposed on the first substrate 1 as the first electrode made of tantalum (Ta) film according to this embodiment.

The first nonlinear resistor layer 3 made of the tantalum oxide ($Ta_2O_5$) film is formed on the lower electrode 2, the first anode oxide electrode 5 and the first data electrode 82 as the anode oxide film of the first electrode.

The second nonlinear resistor layer 128 made of the tantalum oxide ($Ta_2O_5$) film is formed on the second anode oxide electrode 126 and the auxiliary electrode 127 as the anode oxide film of the first electrode.

The first anode oxide electrode 5 and the second anode oxide electrode 126 are separated from each other. The second nonlinear resistor layer 128 is larger in film thickness than the first nonlinear resistor layer 3 which is employed by the nonlinear resistor 9.

The first anode oxide electrode 5 comprising the first electrode has a structure that it connects the first data electrodes 82 in N columns to each other at the periphery of the display region as shown in FIG. 22. Further, the second anode oxide electrode 126 has a structure that it connects a plurality of auxiliary electrode 127 to each other.

Further, as the second electrode, there are provided the second data electrode 83 on the first data electrode 82, the upper electrode 84 for a data electrode connected to the second data electrode 83 on the first nonlinear resistor layer 3 of the lower electrode 2, the display electrode 7 on a part of the auxiliary electrode 127 and the first substrate 1, and the upper electrode 85 for a display electrode connected to the display electrode 7 on the first nonlinear resistor layer 3 of the lower electrode 2, which are all made of the indium tantalum oxide (ITO) film.

The connecting electrode 8 forming a part of the first anode oxide electrode 5 is connected to the second data electrode 83 and is made of indium tin oxide (ITO) film like the above second electrode.

The lower electrode 2, the first nonlinear resistor layer 3 and the upper electrode 84 for a data electrode constitute the TFD structured first nonlinear resistor 86.

Further, the lower electrode 2, the first nonlinear resistor layer 3 and the upper electrode 85 for a display electrode constitute the TFD structured second nonlinear resistor 87.

A part of the display electrode 7 covers the auxiliary electrode 127 connected to the second anode oxide electrode 126, and the display electrode 7 and the auxiliary electrode 127 constitute the shading portion.

Still further, there is provided the insulating film 48 made of the tantalum oxide ($Ta_2O_5$) film so as to cover the upper surfaces of the first substrate 1, the nonlinear resistors 86 and 87, the second data electrode 83, the display electrode 7, the first anode oxide electrode 5, and the second anode oxide electrode 126.

The separating openings 92 are defined in the insulating film 48 and provided on the first anode oxide electrode 5 and the second anode oxide electrode 126. The first anode oxide electrodes 5 are separated at the separating side 10 which is the same as that of the separating openings 92, thereby forming the independent first data electrode 82. The second anode oxide electrodes 126 are also separated from each other to constitute the independent auxiliary electrodes 127.

Further, the openings 49 are defined at the periphery of the display electrodes 7, and the auxiliary electrodes 127 are separated from each other at the separating side 10 which is the same as that of the display electrode 7 or the opening 49 of the insulating film 48 of every display electrode 7, thereby forming the shading portion.

With the arrangement of the ninth embodiment, the second anode oxide electrode 126 comprising the first electrode is made independent of the anode oxide electrode 5 from the first stage. Accordingly, the influence of the auxiliary electrode 127 is not given to the first anode oxide electrode 5. Further, the second anode oxide electrode 126 has the separating side 10 at which it is separated in self-matching manner from the display electrode 7 comprising the second electrode or the opening 49 of the insulating film 48 at the periphery of the display region, thereby forming the independent shading portion on every display electrodes 7.

Further, the second nonlinear resistor layer 128 provided on the auxiliary electrode 127 is made larger in film thickness than the first nonlinear resistor layer 3 provided on the lower electrode 2 by the first anode oxide electrode 5, thereby enhancing insulating property, so that the shading portion can be provided at the periphery of the display electrode 7 with excellent yield without influencing the display quality even if the display electrode 7 and the auxiliary electrode 127 of the display electrode 7 are electrically short circuited.

Further, in the eighth and ninth embodiments of the invention, that the insulating film is provided for preventing the nonlinear resistor from being deteriorated mechanically when utilizing the first substrate having the nonlinear resistor for use in the liquid crystal display device, but the present invention is effective even if the insulating film is not provided.

According to the fifth to ninth embodiments of the invention, a part of the anode oxide electrode can be utilized as the shading portion.

Further, if there are a plurality of nonlinear resistors, the separation between the anode oxide electrode and the first signal electrode and the separation between the anode oxide electrode and the shading portion are carried out at the same time when the first signal electrode and the lower electrode are separated from each other.

If there is the protection insulating film, the anode oxide electrode can be easily separated by defining the opening of the protection insulating film at a part where the anode oxide electrode is intended to be separated, and by performing the etching treatment while the resist which is utilized for forming the protection insulating film or the opening of the protection insulating film serves as the mask when the opening of the protection insulating film is formed so as to be connected to the external circuit.

[Tenth Embodiment]

A liquid crystal display device according to a tenth embodiment will be described next with reference to FIGS. 24 and 25.

Figure 24:
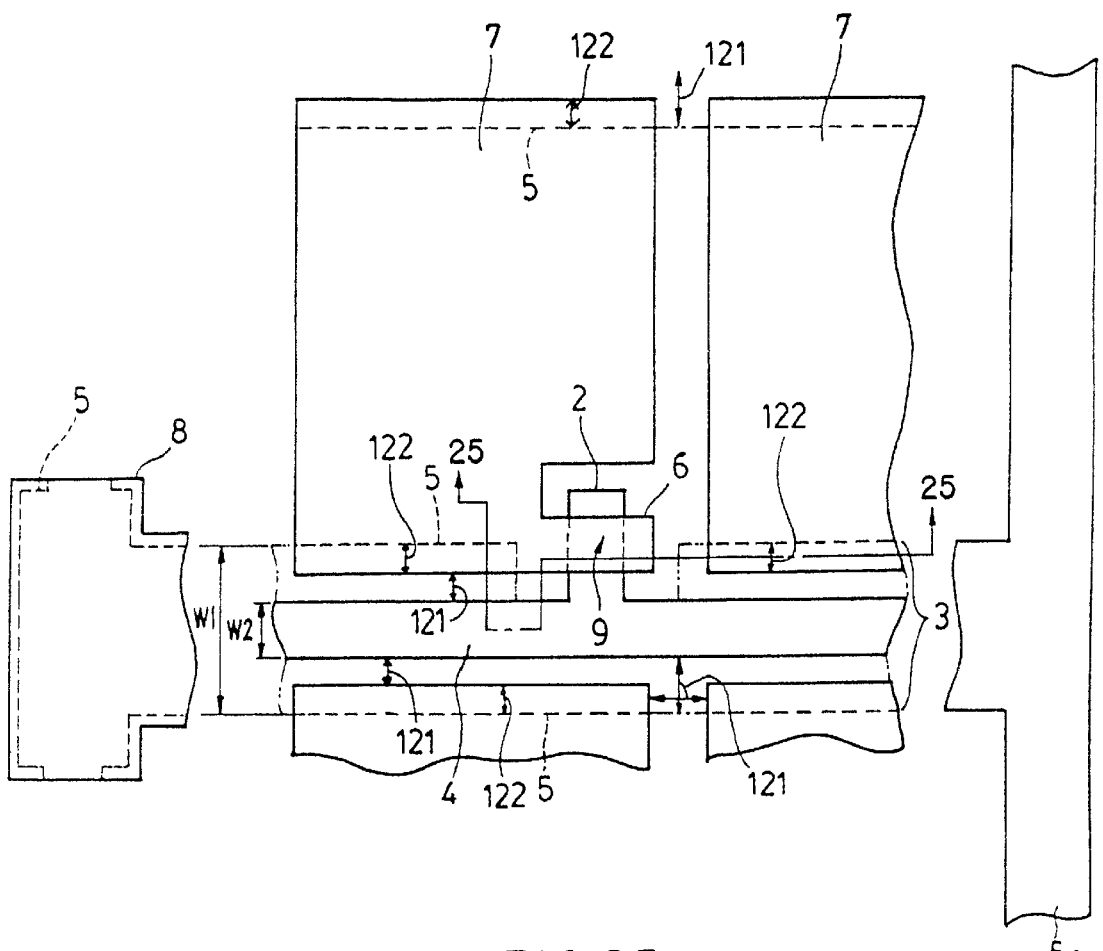
FIG. 24 is a plan view showing a region of a part of a first substrate forming a TFD element of a liquid crystal display device according to a tenth embodiment of the invention.
Figure 25:
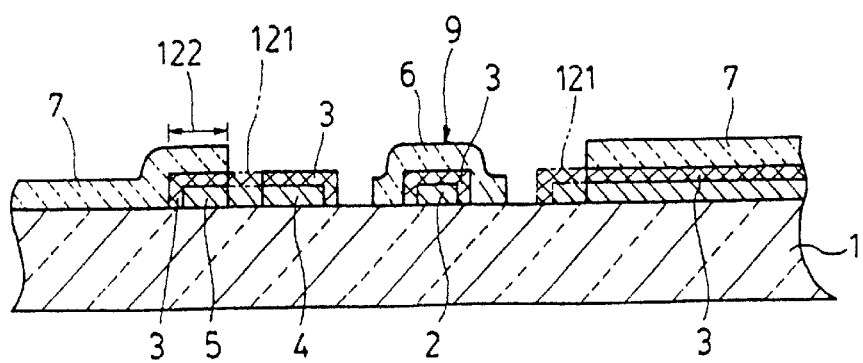
FIG. 25 is a cross sectional view taken along the line 25—25 in FIG. 24.

FIG. 24 is a plan view showing a part of a region of the first substrate forming the TFD element of the liquid crystal display device according to the tenth embodiment of the invention, and FIG. 25 is a cross sectional view taken along the line 25—25 in FIG. 24.

The structure of the TFD element in this embodiment will be explained with reference to these figures.

The anode oxide electrode 5 and the lower electrode 2 each made of tantalum (Ta) film as metal film are disposed on the first substrate 1 serving as an active substrate forming the TFD element.

A width W1 of the anode oxide electrode 5 is wider than a width W2 of the signal electrode 4 at a part other than the periphery of the lower electrode 2.

The anode oxide electrodes 5 are connected to each other by the runner part 5a at one end thereof, and the other end thereof is connected to the connecting electrode 8 for applying a signal from the external circuit to the nonlinear resistor. The anode oxide electrode 5 is used as an electrode for forming the nonlinear resistor layer 3 on the surface of the lower electrode 2 by the anodic oxidation treatment.

Accordingly, there is the anode oxide electrode 5 having the width W1 between the signal electrode 4 and the display electrode 7. An etching removal part 121 which is a part of the anode oxide electrode 5 is removed in the final shape thereof. That is, FIG. 24 shows an intermediary stage of the manufacturing steps so as to make the explanation easy.

Further, the nonlinear resistor layer 3 made of tantalum oxide ($Ta_2O_5$) film is provided on the surface of the lower electrode 2 which is formed by subjecting the lower electrode 2 to the anodic oxidation treatment.

Further, an overlapping portion 122 which is a part of the anode oxide electrode 5 and a transparent conductive film on the first substrate 1 form the display electrode 7. The upper electrode 6 connected to the display electrode 7 is provided on the lower electrode 2. Further, a transparent conductive film is also provided on the anode oxide electrode 5 to form the connecting electrode 8.

A part of the region of the display electrode 7 has the overlapping portion 122 which overlaps a part of the region of the anode oxide electrode 5.

The lower electrode 2, the nonlinear resistor layer 3 and the upper electrode 6 constitute the nonlinear resistor (TFD element) 9.

Meanwhile, the upper electrode 6 and the display electrode 7 are made of a transparent conductive film, e.g., a indium tin oxide (ITO) film.

Further, the etching removal part 121 between the signal electrode 4 composed of a part of the anode oxide electrode 5 and the overlapping portion 122 at the lower part of the display electrode 7 is removed, so that the signal electrode 4 and the display electrode 7 made of the transparent conductive film are separated from each other.

The runner part 5a for connecting a plurality of signal electrodes 4 are also removed, so that the signal electrodes 4 are made independent of each other.

The etching removal part 121 between the display electrodes 7 is also removed, so that the display electrodes 7 are also made independent of each other.

Accordingly, the width W1 of the anode oxide electrode 5 becomes the width W2 as the signal electrode 4.

That is, the width of the electrode as the anode oxide electrode 5 is W1 before performing the anodic oxidation treatment, and the width W1 is made larger than the width W2 of the signal electrode 4, and it is widened toward the lower part of the display electrode 7. Further, the adjoining display electrodes 7 are connected by the anode oxide electrode 5.

The anode oxide electrode 5 is subject to the etching treatment after the display electrode 7 is provided, then the etching removal part 121 which is a part of the anode oxide electrode 5 is removed, thereby permitting the width of the signal electrode 4 to become W2. Further, the etching removal part 121 between the adjoining display electrodes 7 is also removed, thereby forming the isolated display electrodes 7.

With the employment of this structure, the anode oxide electrode 5 is widened (W1) in width at the time of anodic oxidation treatment so that the nonlinear resistor layer 3 can be formed uniformly in a short time.

In case that the display electrode 7 is made of the transparent conductive film, it is normally difficult to inspect the etching condition at the periphery of the display electrode 7 since it is transparent.

However, according to this embodiment, since the tantalum film and the tantalum oxide film are provided at the periphery of the display electrode 7 as the anode oxide electrode 5, the tantalum or tantalum oxide film and the tantalum film remain while the transparent conductive film serves as an etching mask when the etching removal part 121 is subject to the etching treatment even if the display electrode 7 is made of transparent conductive film, so that the etching condition of the transparent conductive film at the periphery of the display electrode 7 can be easily inspected.

Further, when the transparent conductive film remains slightly, the transparent conductive film can be also removed when the etching removal part 121 is subject to the etching treatment, so that an etching remaining film at the periphery of the display electrode 7 can be completely removed.

Still further, since the width (W1) of the anode oxide electrode 5 is enlarged, it is possible to prevent the signal electrode 4 from being broken utilizing the anode oxide electrode 5 between the display electrode 7 and the signal electrode 4 if there is a breakage within the width (W2) of the signal electrode 4.

Figure 26:
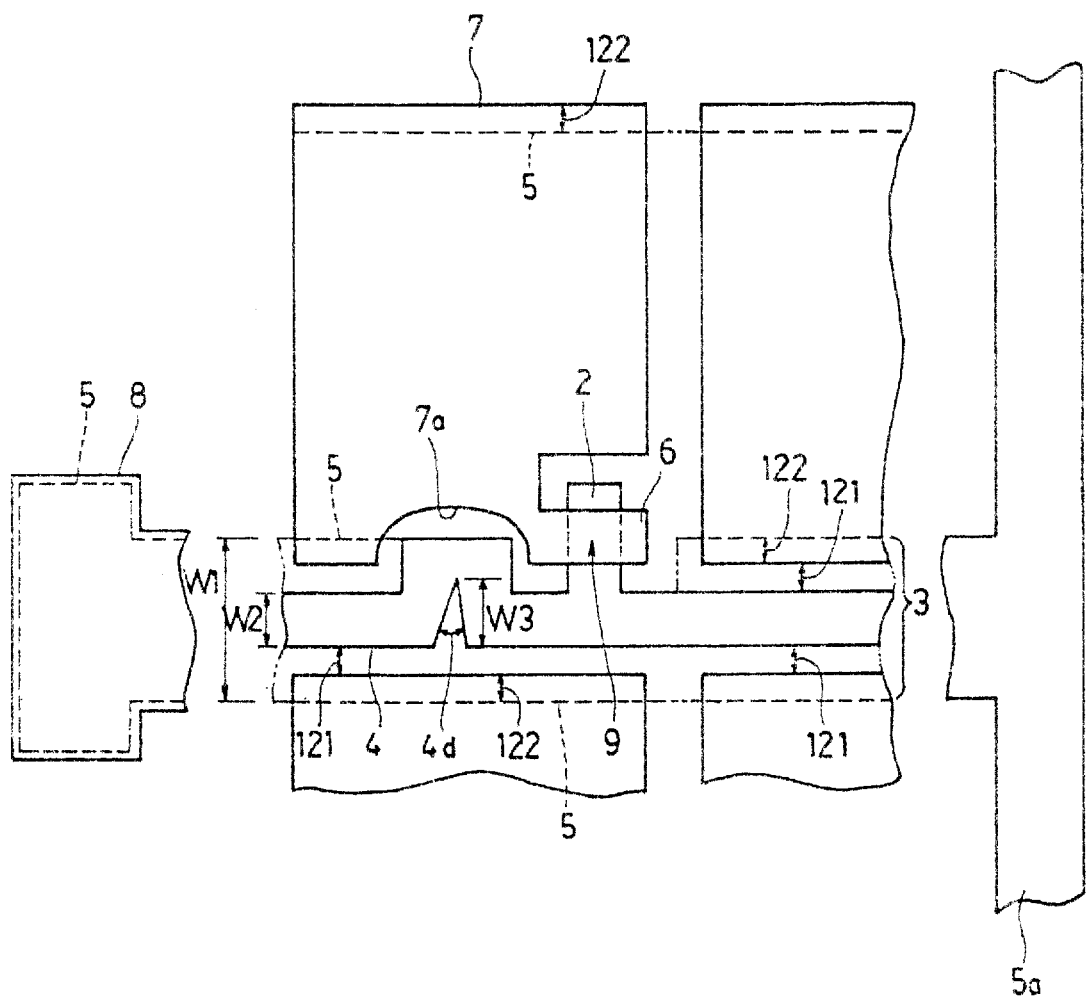
FIGS. 26 through 29 are plan views of the liquid crystal display device according to the tenth embodiment of the invention, and cross sectional views showing a method of fabricating an active substrate of the liquid crystal display device in the order of fabricating steps thereof.

FIG. 26 is plan view showing a state where there occurs a breakage 4d in the signal electrode 4 in this embodiment.

This figure shows a case that there occurs the breakage 4d which is deeper (depth W3) than the width (W2) of the signal electrode 4. If the signal electrode 4 remains to have the conventional electrode width W2, it will be broken. That is, it is impossible to perform the anodic oxidation treatment. Further, it is impossible to apply a voltage from outside to the nonlinear resistor (TFD element) 9.

However, the anodic oxidation treatment can be performed in this embodiment since the width of the anode oxide electrode 5 is larger than the width W2 of the signal electrode 4. Further, the signal electrode 4 will not be broken by the formation to detour the breakage of the signal electrode 4 utilizing a part of the anode oxide electrode 5 formed at the periphery of the signal electrode 4.

Further, the display electrode 7 has a removal part 7a which is removed at a part thereof for using a part of the overlapping portion 122 at the lower part of the display electrode 7 as a detouring part of the signal electrode 4.

Since the width of the anode oxide electrode 5 is enlarged as mentioned above, it is possible to improve the uniformity of the anode oxide film and to prevent the anode oxide film from not being formed owing to the breakage of the signal electrode 4, thereby improving the yield and enhancing the characteristics of the anode oxide film.

Figure 27:
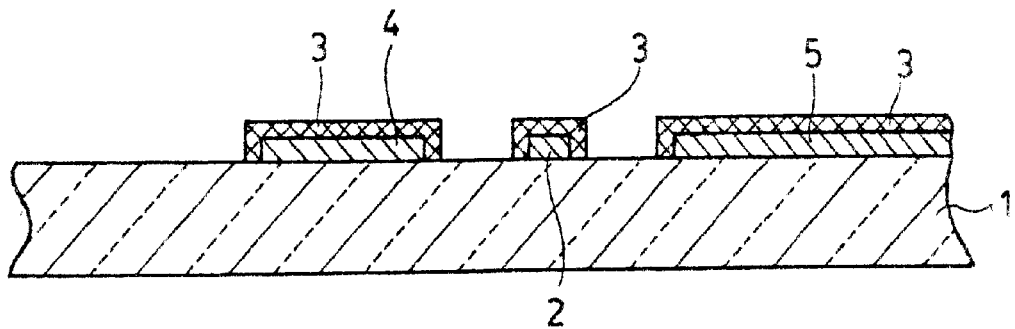
Figure 28:
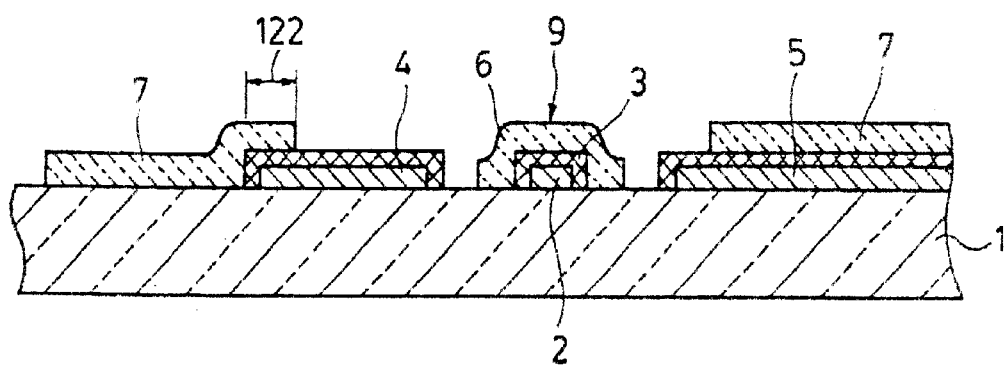
Figure 29:
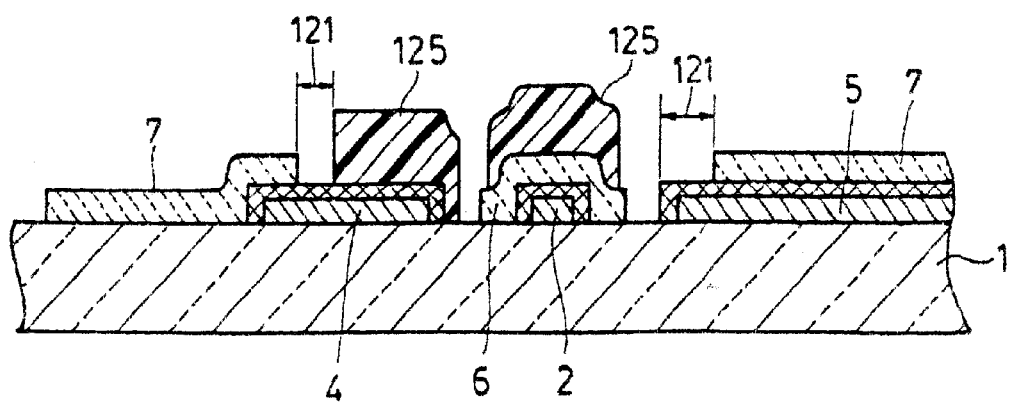

Next, a method of fabricating an active substrate of the liquid crystal display device according to the tenth embodiment will be now described. FIGS. 27 through 29 are cross-sectional views corresponding to FIG. 25 and showing the method of fabricating in the order of the fabricating steps.

First of all, a tantalum (Ta) film as a metal film is formed on the entire surface of the first substrate 1 which is the active substrate made of glass in the film thickness of 150 nm by a sputtering technique as shown in FIG. 27.

Thereafter, forming a photosensitive resin (not shown) on the entire surface of the tantalum film by a roll coating method, and subjecting the tantalum film to an exposing and developing treatment using a given photomask to thereby permit the photosensitive resin to be subject to a patterning treatment, thereafter patterning the anode oxide electrode 5, the lower electrode 2 and a part for connecting a plurality of signal electrodes 4 (anode oxide electrodes) by a photoetching treatment for etching the tantalum film employing the patterned photosensitive resin as an etching mask.

The etching of the tantalum film is performed using a reactive ion etching (hereinafter referred to as RIE) system.

As an etching condition, a mixture gas of sulfur hexafluoride ($SF_6$) and oxygen ($O_2$) is employed as an etching gas. The flow rate of the sulfur hexafluoride ranges from 100 to 200 sccm, and the flow rate of the oxygen ranges from 10 to 40 sccm at the pressure ranging from 4 to $12 \times 10^{-2}$ torr with the power ranging from 0.2 to 0.5 $kW/cm^2$.

Thereafter, the tantalum film is subject to the anodic oxidation treatment by applying a voltage ranging from 30 to 40V thereto while permitting the anode oxide electrode 5 to be an anode using an aqueous solution of citric acid ranging from 0.1 to 1.0 wt % or aqueous solution of ammonium borate as an anode oxide liquid.

As a result, the nonlinear resistor layer 3 made of a tantalum oxide ($Ta_2O_5$) film is formed on the side walls and upper surfaces of the lower electrode 2 and anode oxide electrode 5 in a film thickness ranging from 60 to 75 nm.

Thereafter, the indium tin oxide (ITO) film as the transparent conductive film is formed on the entire surface in a film thickness of 100 nm using a sputtering technique. Thereafter, a photosensitive resin (not shown) is formed on the indium tin oxide (ITO) film.

Then the indium tin oxide (ITO) film is subject to the etching treatment, so as to simultaneously pattern the display electrode 7, the upper electrode 6 connected to the display electrode 7 and the connecting electrode 8 (not shown) as shown in FIG. 28.

The etching of the indium tin oxide (ITO) film is performed by a wet etching technique using an aqueous solution etchant of ferric oxide and hydrochloric acid. An etchant liquid temperature at this time is set to range from 30° C. to 40° C.

Thereafter, the photosensitive resin 125 is formed for subjecting the etching removal part 121, which is positioned between the anode oxide electrode 5 and the overlapping portion 122 at the lower part of the display electrode 7, to patterning as shown in FIG. 29. The etching removal part 121 is subject to the etching treatment using the RIE system while the display electrode 7 composed of the photosensitive resin 125 and the indium tin oxide film serve as an etching mask.

As etching condition, a mixture gas of sulfur hexafluoride ($SF_6$) and oxygen ($O_2$) is employed as an etching gas. The flow rate of the sulfur hexafluoride ($SF_6$) ranges from 100 to 200 sccm, and the flow rate of the oxygen ranges from 10 to 40 sccm at a pressure ranging from 4 to $12 \times 10^{-2}$ torr with power ranging from 0.2 to 0.5 $kW/cm^2$.

In the etching condition set forth above, the indium tin oxide film is hardly subject to the etching treatment but only the tantalum film and the tantalum oxide film of the nonlinear resistor layer 3 are subject to the etching treatment.

Accordingly, the signal electrode 4 comprising a part of the anode oxide electrode 5 and the overlapping portion 122 of the display electrode 7 can be separated from each other by subjecting the etching removal part 121 to the etching treatment.

With the above steps, as shown in FIG. 25 of the tenth embodiment, the anode oxide electrode 5 is separated from the display electrode 7 to form the signal electrode 4 so that an intended voltage can be applied to the display electrode 7 connected to the upper electrode 6 by way of the connecting electrode 8 connected to the external circuit (not shown), the signal electrode 4, the lower electrode 2 connected to the signal electrode 4, the nonlinear resistor layer 3 formed on the lower electrode 2, and the upper electrode 6 formed on the nonlinear resistor layer 3.

The lower electrode 2, the nonlinear resistor layer 3 and the upper electrode 6 constitute the nonlinear resistor (TFD element) 9.

In this embodiment, when the anode oxide electrode 5 is processed by the etching treatment, the photosensitive resin 125 and the display electrode 7 are used as an etching mask. Accordingly, the etching removal part 121 can be formed in a shape which matches with the lower region of the display electrode 7.

Accordingly, even in case that the indium tin oxide film remains thin or slightly on the etching removal part 121, namely, even if poor etching occurs, the transparent conductive film at the poor etching part between the signal electrode 4 and the display electrode 7 can be removed at the same time when the etching removal part 121 is subject to the etching treatment.

Further, the inspection of the short circuited part can be very easily performed compared with the case comprising only the transparent conductive film since the indium tin oxide film remains on the etching removal part 121 in case that the indium tin oxide film remains on a large surface upon completion of the etching treatment so that tantalum oxide as the nonlinear resistor layer 3 and tantalum as the lower electrode 2 remain at the lower part of the indium tin oxide film.

Still further, it is very difficult to detect the etching remaining film of the transparent conductive film at the periphery of the display electrode 7 owing to the refractive index of the liquid crystal, the thickness of the first substrate 1 or the refractive index of the orientational films, etc. after the first substrate 1 and the second substrate (not shown) are bonded to each other and the liquid crystal is filled therebetween as the liquid crystal display device.

Also in this case, the detection can be easily performed since the tantalum, etc. remain as the etching remaining film.

[Eleventh Embodiment]

A liquid crystal display device according to an eleventh embodiment of the invention will be described next with reference to FIGS. 30 and 31.

Figure 30:
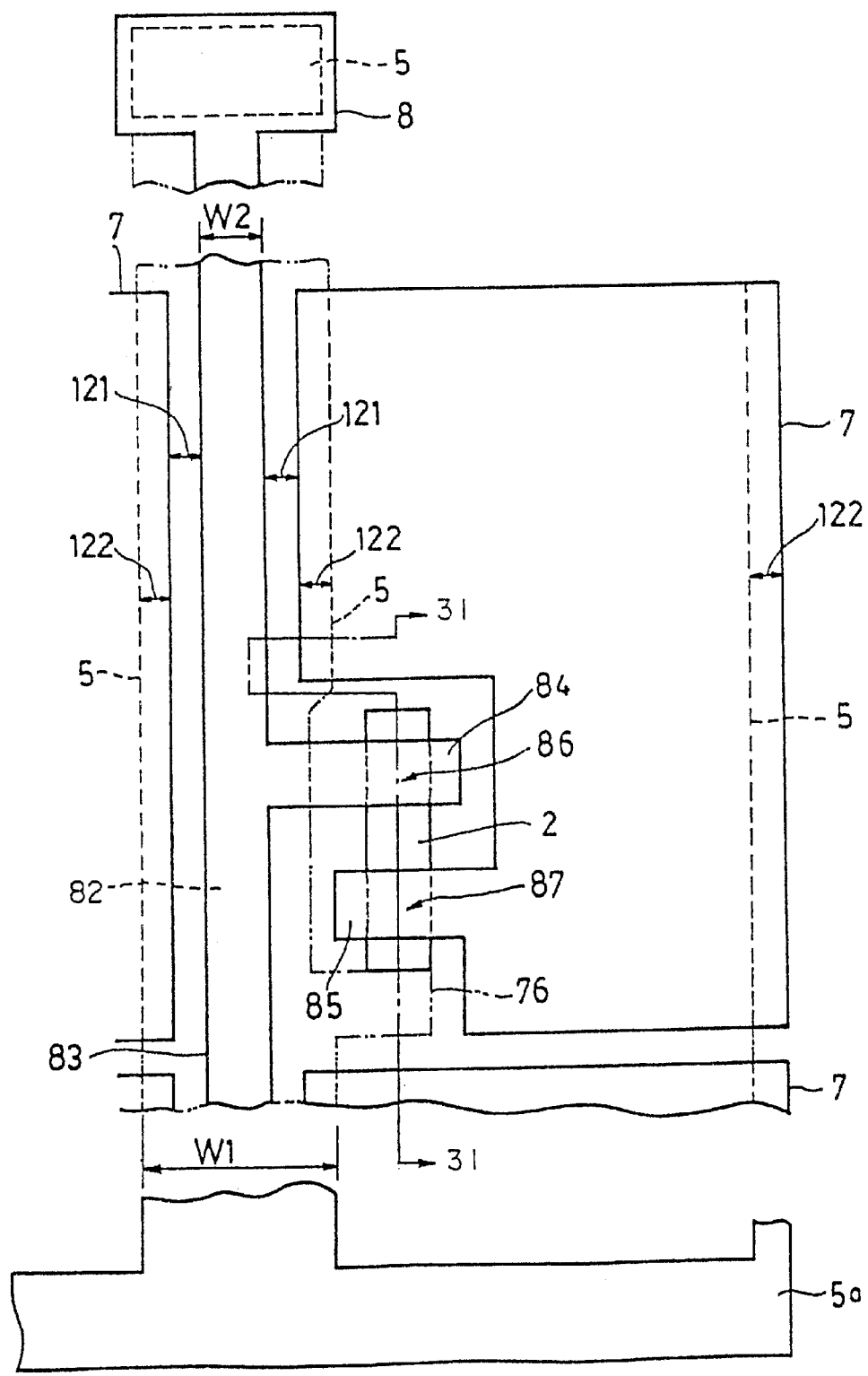
FIG. 30 is a plan view showing a region of a part of a first substrate forming a TFD element of a liquid crystal display device according to an eleventh embodiment of the invention.
Figure 31:
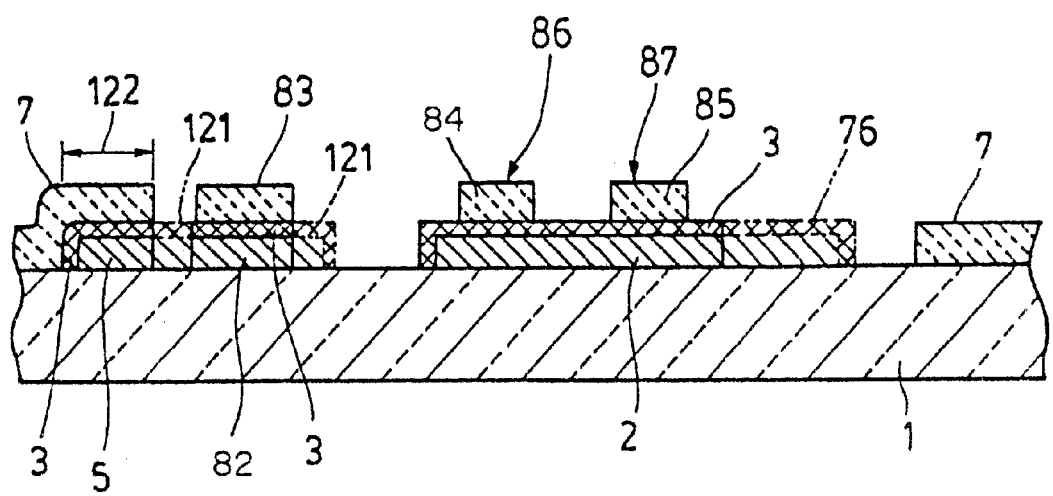
FIG. 31 is a cross sectional view taken along the line 31—31 in FIG. 30.

FIG. 30 is a plan view showing a region of a part of the first substrate forming a TFD element of the liquid crystal display device according to the eleventh embodiment, and FIG. 31 is a cross-sectional view taken along the line 31—31 in FIG. 30.

The structure of the TFD element of the eleventh embodiment will be described with reference to these figures.

The anode oxide electrode 5, the island-shaped lower electrode 2, the line connecting part 76 (shown by an imaginary line) for connecting the anode oxide electrode 5 and the lower electrode 2 each made of tantalum (Ta) film as metal film are disposed on the first substrate 1.

The anode oxide electrode 5 has a width W1 which is larger than the width W2 of the first data electrode 82 at a part other than the periphery of the island-shaped lower electrode 2.

The anode oxide electrodes 5 are connected to each other in plural numbers by the runner part 5a at one end thereof, and they are covered with the connecting electrode 8 for applying a signal from an external circuit to the nonlinear resistor 9 at the other end thereof.

The anode oxide electrode 5 is used as an electrode for forming the nonlinear resistor layer 3 on the surface of the lower electrode 2 by the anodic oxidation treatment.

The anode oxide electrode 5 is provided between the first data electrode 82 and the display electrode 7. The etching removal part 121 forming a part of the anode oxide electrode 5 is removed in the final structure.

Further, the first data electrode 82 and the line connecting part 76 connected to the island-shaped lower electrode 2 are also removed in the final structure. That is, the plan view in FIG. 30 and the cross-sectional view in FIG. 31 show an intermediary stage of the manufacturing steps denoted by imaginary lines so as to make the explanation easy.

Further, the nonlinear resistor layer 3 made of the tantalum oxide ($Ta_2O_5$) film, which is formed by subjecting the tantalum film to the anodic oxidation treatment, is provided on the surfaces of the anode oxide electrode 5 and the island-shaped lower electrode 2 by way of the line connecting part 76.

The transparent conductive film is provided on the overlapping portion 122 of the anode oxide electrode 5 and the first substrate 1 to form the display electrode 7. Further, the upper electrode 85 for a display electrode connected to the display electrode 7 is provided on the lower electrode 2. Still further, the second data electrode 83 is provided on the anode oxide electrode 5, and the upper electrode 84 for a data electrode connected to the second data electrode 83 is provided.

The connecting electrode 8 made of transparent conductive film is provided on the anode oxide electrode 5 made of tantalum for applying the signal from the external circuit to the nonlinear resistor. In the connecting electrode 8, tantalum of the anode oxide electrode 5 has a frame shape. The connecting electrode 8 made of the transparent conductive film covers frame-shaped tantalum.

With the provision of this shape, the matching accuracy is improved since the position can be clearly identified by frame-shaped tantalum compared with that of the transparent conductive film in the case of connecting the external circuit and the connecting electrode 8. Further, the connecting state between the external circuit and the input part can be verified through a transparent conductive film pad part by providing the transparent conductive film inside and outside the frame-shaped tantalum.

Particularly, the matching accuracy is improved by providing tantalum in the frame shape since it is inferior using only the transparent conductive film in the case of a so-called chip-on-glass (COG) method for directly connecting the integrated circuit (IC) and the input part onto the connecting electrode 8 by way of a medium such as a conductive paste, etc.

The island-shaped lower electrode 2, the nonlinear resistor layer 3 and the upper electrode 84 for a data electrode constitute the first nonlinear resistor (TFD element) 86. Further, the island-shaped lower electrode 2, the nonlinear resistor layer 3 and the upper electrode 85 for a display electrode constitute the second nonlinear resistor (TFD element) 87.

The upper electrode 85 for a display electrode, the upper electrode 84 for a data electrode and the display electrode 7 are all made of the transparent conductive film, e.g., indium tin oxide (ITO) film.

Further, the anode oxide electrode 5 has a structure that it is separated into the overlapping portion 122 where the anode oxide electrode 5 and the display electrode 7 made of the transparent conductive film overlap, and the first data electrode 82 made of tantalum at the lower part of the second data electrode 83. The etching removal part 121 between the first data electrode 82 and the display electrode 7 is removed to be separated from the display electrode 7.

Accordingly, the width W1 of the anode oxide electrode 5 becomes W2 as the first data electrode 81.

Consequently, the anode oxide electrode 5 is widened as the width W1 which is larger than the width W2 of the first data electrode 82 at the time of anodic oxidation treatment, and it is widened toward the lower part of the display electrode 7. Further, the adjoining display electrodes 7 are connected to each other by the anode oxide electrode 5.

The line connecting part 76 for connecting the first data electrode 82 and the island-shaped lower electrode 2 is subject to the etching treatment after the second data electrode 83 and the display electrode 7 are provided, thereby forming the isolated island-shaped lower electrode 2, and at the same time the etching removal part 121 between the first data electrode 82 and the display electrode 7 is subject to the etching treatment so as to form the isolated display electrode 7 and the first data electrode 82.

With the employment of this structure, since the anode oxide electrode 5 is large in width as denoted by W1 at the time of anodic oxidation treatment, the anode oxide film can be formed uniformly in a short time.

Further, since the width of the anode oxide electrode is enlarged like the case in FIG. 26, it is possible to prevent the breakage of the first data electrode 82 utilizing the anode oxide electrode 5 between the display electrode 7 and the data electrodes 82 and 83 if there is a breakage within the width W2 of the first data electrode 82.

Further, the island-shaped lower electrode 2 requires to be separated from the first data electrode 82 according to this embodiment, however it does not lead to the increase of steps because a step to process the first data electrode 81 from the anode oxide electrode 5 can be performed at the same time.

Successively, a method of fabricating an active substrate of the liquid crystal display device according to the eleventh embodiment will be described with reference to FIGS. 32 through 34.

Figure 32:
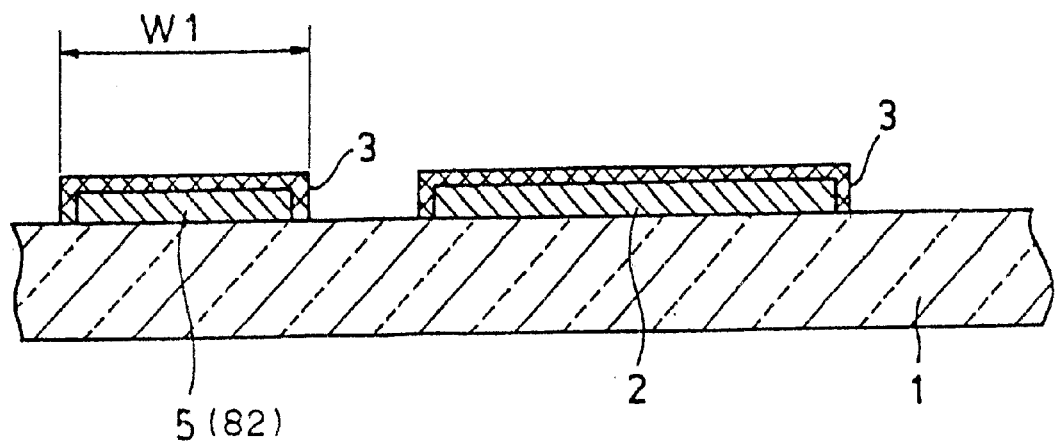
FIGS. 32 through 34 are cross sectional views showing a method of fabricating an active substrate of a liquid crystal display device according to an eleventh embodiment of the invention in the order of fabricating steps thereof.
Figure 33:
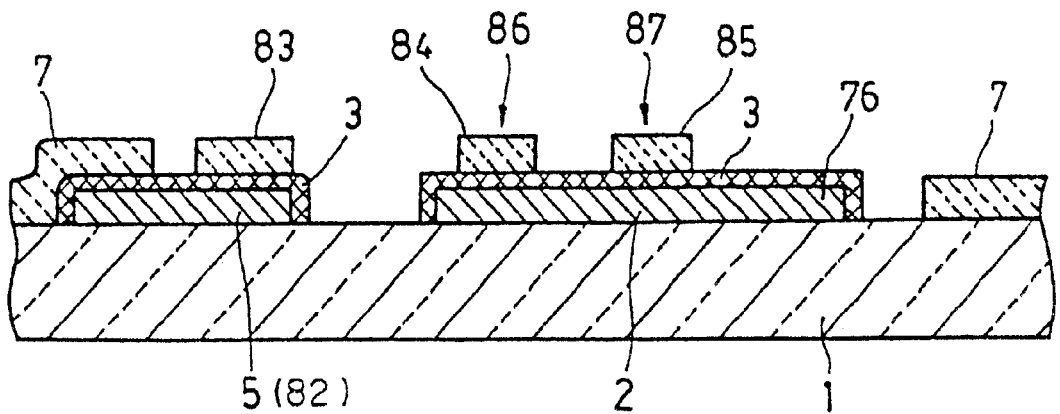
Figure 34:
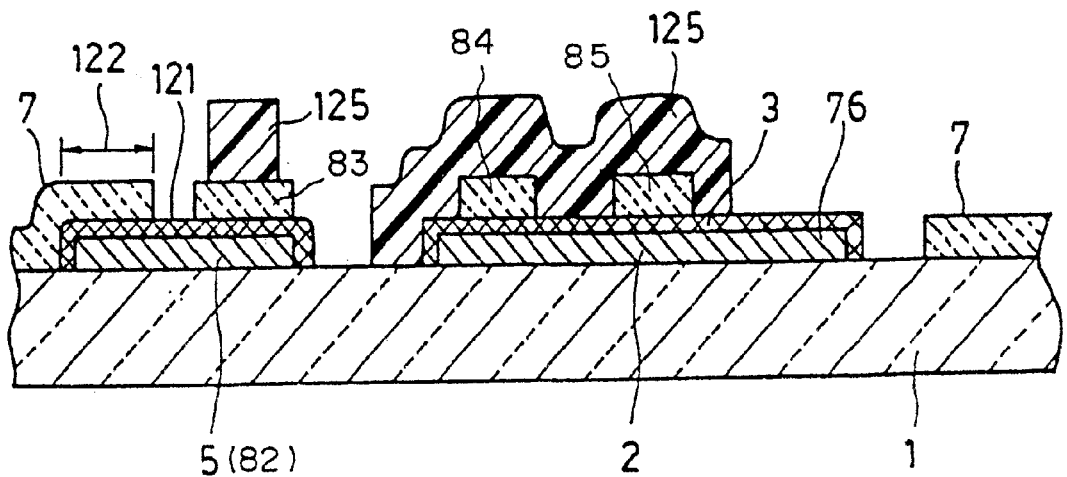

FIGS. 32 through 34 are cross-sectional views corresponding to FIG. 31 and showing in the order of fabricating steps of the active substrate of the liquid crystal display device according to the eleventh embodiment of the invention.

First of all, a tantalum (Ta) film as a metal film is formed on the entire surface of the first substrate 1 serving as the active substrate made of glass shown in FIG. 32 in the film thickness of 200 nm by a sputtering technique.

Thereafter, a photosensitive resin (not shown) is formed on the entire surface of the tantalum film by a roll coating method, and the tantalum film is subject to an exposing and developing treatment using a given photomask to thereby permit the photosensitive resin to be subject to patterning.

Thereafter, the anode oxide electrode 5 including the part forming the first data electrode 82, the island-shaped lower electrode 2, the line connecting part 76 for connecting the anode oxide electrode 5 and the island-shaped lower electrode 2, and a plurality of anode oxide electrodes 5 are patterned so as to be connected to each other by a photoetching treatment for etching the tantalum film employing the patterned photosensitive resin as an etching mask.

The etching of the tantalum film is performed using a RIE system.

As etching condition, a mixture gas of sulfur hexafluoride ($SF_6$) and oxygen ($O_2$) is employed as an etching gas. The flow rate of the sulfur hexafluoride ranges from 100 to 200 sccm, and the flow rate of the oxygen ranges from 10 to 40 sccm at a pressure ranging from 4 to $12 \times 10^{-2}$ torr with power ranging from 0.2 to 0.5 $kW/cm^2$.

Thereafter, the tantalum film is subject to the anodic oxidation treatment by applying a voltage ranging from 16 to 20 V thereto while permitting the anode oxide electrode 5 to be an anode using aqueous solution of citric acid ranging from 0.01 to 1.0 wt % or aqueous solution of ammonium borate or aqueous solution of phosphoric acid as an anode oxidation liquid.

As a result, the nonlinear resistor layer 3 made of the tantalum oxide ($Ta_2O_5$) film is formed on the side walls and upper surfaces of the lower electrode 2 and anode oxide electrode 5 in the film thickness ranging from 30 to 40 nm.

Thereafter, the indium tin oxide (ITO) film as the transparent conductive film is formed on the entire surface in a film thickness of 150 nm using a sputtering technique. Thereafter, a photosensitive resin (not shown) is formed on indium tin oxide (ITO) film.

Then the indium tin oxide (ITO) film is subject to the etching treatment so as to simultaneously pattern the display electrode 7, the upper electrode 85 for a display electrode connected to the display electrode 7, the connecting electrode 8, the second data electrode 83, and the upper electrode 84 for a data electrode connected to the second data electrode 83 as shown in FIG. 33.

The etching treatment of the indium tin oxide is performed by wet etching using an etchant of the aqueous solution of hydrogen bromine (HBr). The etchant liquid temperature at this time is set to range from 25° C. to 30° C.

Then, as shown in FIG. 34, the photosensitive resin 125 is formed by removing the line connecting part 76 for connecting the anode oxide electrode 5 and the island-shaped lower electrode 2, thereby forming the isolated island-shaped lower electrode 2. At this time, the etching removal part 121 which is a part of the anode oxide electrode 5 is removed so that the anode oxide electrode 5 is separated into the first data electrode 82 and the overlapping portion 122 at the lower part of the display electrode 7.

The anode oxide electrode 5 is subject to the etching treatment using a RIE system utilizing the photosensitive resin 125, the display electrode 7 made of the indium tin oxide film and the second data electrode 83 as an etching mask.

As etching condition, a mixture gas of sulfur hexafluoride ($SF_6$) and oxygen ($O_2$) Its employed as an etching gas. The flow rate of the sulfur hexafluoride ranges from 100 to 200 sccm, and the flow rate of the oxygen ranges from 10 to 40 sccm at a pressure ranging from 4 to $12 \times 10^{-2}$ torr with power ranging from 0.2 to 0.5 $kW/cm^2$.

In the etching condition set forth above, the indium tin oxide film is hardly subject to the etching treatment and only the tantalum film and the tantalum oxide film of the line connecting part 76 and the etching removal part 121 are subject to the etching treatment.

With the above steps, the anode oxide electrode 5 is separated into the first data electrode 82 and the overlapping portion 122 at the lower part of the display electrode 7 as shown in FIG. 31, so that the signal issued from the external circuit can be supplied through a passage described as follows.

That is, an intended voltage is applied to the display electrode 7 connected to the upper electrode 85 for a display electrode by way of the connecting electrode 8 connected to the external circuit (not shown), the first data electrode 82 connected to the anode oxide electrode 5, the second data electrode 83, the upper electrode 84 for a data electrode connected to the second data electrode 83, the nonlinear resistor layer 3, the island-shaped lower electrode 2, the nonlinear resistor layer 3 and the upper electrode 85 for a display electrode.

In this embodiment, the etching treatment is performed for separating the island-shaped lower electrode 2 utilizing the photosensitive resin 125, the display electrode 7 and the second data electrode 83 as an etching mask. At this time, since the etching removal part 121 between the first data electrode 82 and the overlapping portion 122 in the anode oxide electrode 5 is removed, the number of steps is not increased.

[Twelfth Embodiment]

A liquid crystal display device according to a twelfth embodiment of the invention will be described next with reference to FIGS. 35 and 36.

Figure 35:
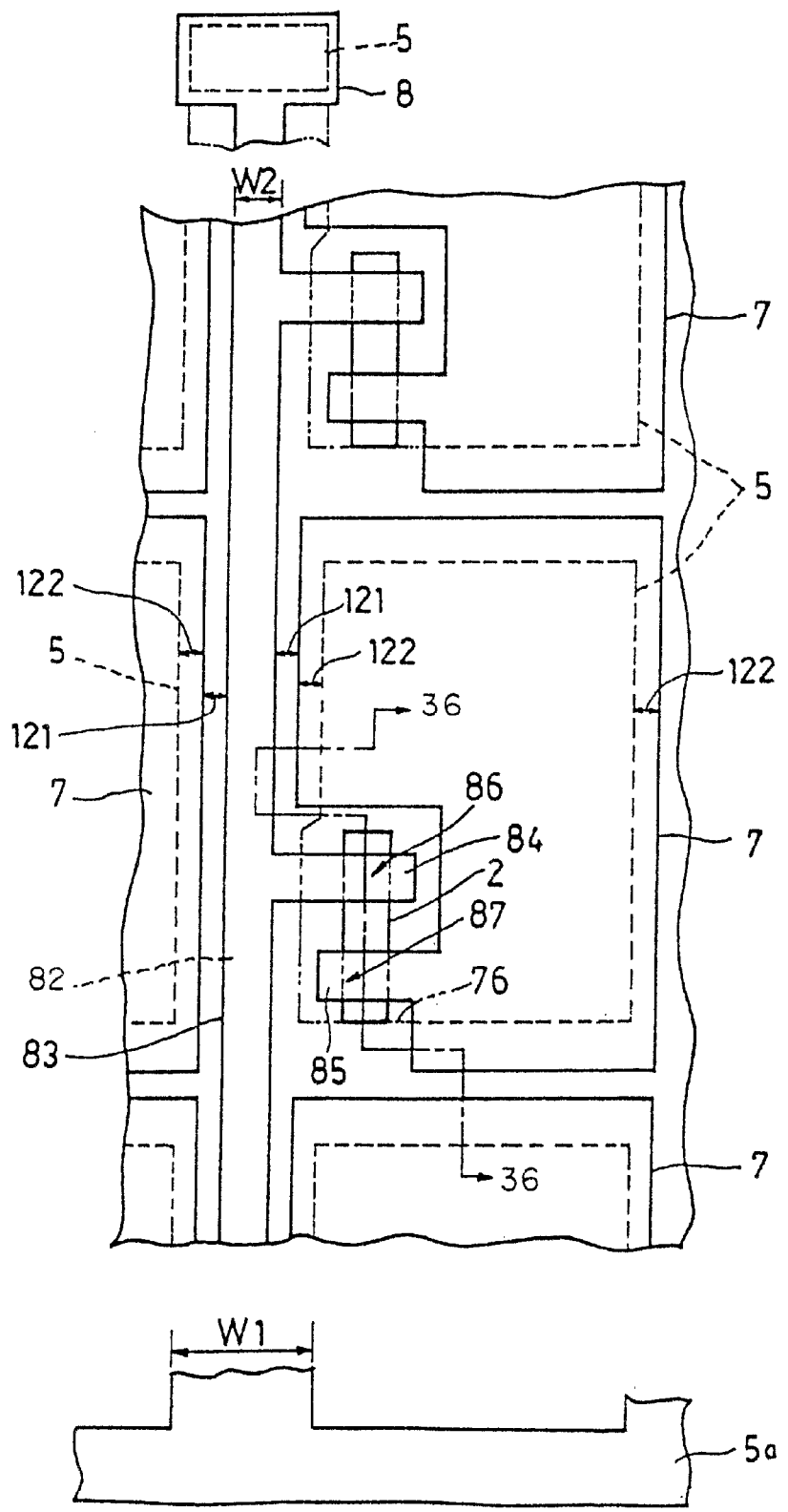
FIG. 35 is a plan view showing a region of a part of a first substrate forming a TFD element of a liquid crystal display device according to a twelfth embodiment of the invention.
Figure 36:
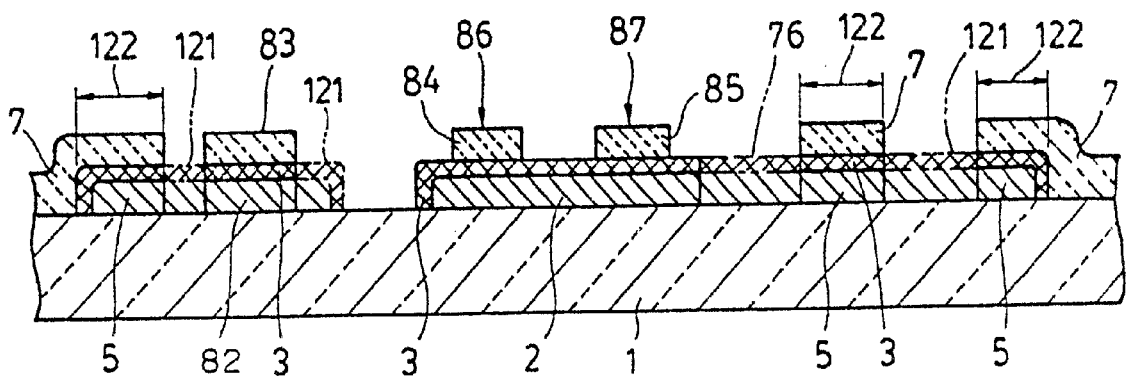
FIG. 36 is a cross sectional view taken along the line 36—36 in FIG. 35.

FIG. 35 is a plan view showing a region of a part of the first substrate for forming a TFD element of the liquid crystal display device according to the twelfth embodiment. FIG. 36 is a cross-sectional view taken along the line 36—36 in FIG. 35.

In this embodiment, the anode oxide electrode 5 in the eleventh embodiment extends to the upper and lower sides and the right and left sides of the display electrode 7 so as to form the overlapping portions 122 on the upper and lower sides and the right and left sides of the display electrode 7.

The anode oxide electrode 5, the island-shaped lower electrode 2, the line connecting part 76 for connecting the anode oxide electrode 5 and the lower electrode 2 (shown by imaginary lines in FIG. 35) are made of tantalum (Ta) film as a metal film and disposed on the first substrate 1.

The width of the anode oxide electrode 5 has the width W1 which is larger than the width W2 of the first data electrode 82 at a part other than the island-shaped lower electrode 2. Further the anode oxide electrodes 5 are connected to each other at the upper and lower sides and right and left sides thereof.

The anode oxide electrodes 5 have structures that they are connected to each other in plural numbers by the runner parts 5a at one end thereof, and the other end of the anode oxide electrode 5 is covered with the connecting electrode 8 for applying the signal from the external circuit to the nonlinear resistor. The anode oxide electrode 5 is used as an electrode for forming the nonlinear resistor layer 3 on the surface of the lower electrode 2 by the anodic oxidation treatment.

The anode oxide electrodes 5 are provided between the first data electrode 82 and the display electrode 7 and between the display electrodes 7 and the display electrode 7 in FIG. 35. The etching removal part 121 forming a part of the anode oxide electrode 5 is removed in the final structure.

Further, the first data electrode 82 and the line connecting part 76 connected to the island-shaped lower electrode 2 are also removed in the final structure. That is, the plan view in FIG. 35 and the cross-sectional view in FIG. 36 show an intermediary stage of the manufacturing steps by an imaginary line so as to make the explanation easy.

Further, the nonlinear resistor layer 3 made of the tantalum oxide ($Ta_2O_5$) film, which is formed by subjecting the tantalum film to the anodic oxidation treatment, is provided on the surfaces of the anode oxide electrode 5 and the island-shaped lower electrode 2 by way of the line connecting part 76.

The transparent conductive film is provided on the overlapping portion 122 of the anode oxide electrode 5 and the substrate 1 to form the display electrode 7. Further, the upper electrode 85 for a display electrode connected to the display electrode 7 is provided on the lower electrode 2. Still further, the second data electrode 83 is provided on the anode oxide electrode 5, and the upper electrode 84 for a data electrode connected to the second data electrode 83 is provided.

Further, the connecting electrode 8 made of the transparent conductive film is provided on the anode oxide electrode 5 made of tantalum for applying the signal from the external circuit to the nonlinear resistor. In the connecting electrode 8, tantalum of the anode oxide electrode 5 has a frame shape. The transparent conductive film covers the frame-shaped tantalum. With the provision of this shape, the matching accuracy is improved since the position can be clearly identified by frame-shaped tantalum compared with that of the transparent conductive film in the case of connecting the external circuit and the connecting electrode 8. The connecting state between the external circuit and the input part can be verified through a transparent conductive film pad part by providing the transparent conductive film inside and outside frame-shaped tantalum.

Particularly, the matching accuracy is improved by providing tantalum in the frame shape since it is inferior using only the transparent conductive film in the case of a so-called chip-on-glass (COG) method for directly connecting the integrated circuit (IC) and the input part onto the connecting electrode 8 by way of a medium such as a conductive paste, etc.

The island-shaped lower electrode 2, the nonlinear resistor layer 3 and the upper electrode 84 for a data electrode constitute the first nonlinear resistor (TFD element) 86. Further, the island-shaped lower electrode 2, the nonlinear resistor layer 3 and the upper electrode 85 for a display electrode constitute the second nonlinear resistor (TFD element) 87.

The upper electrode 85 for a display electrode, the upper electrode 84 for a data electrode and the display electrode 7 are all made of the transparent conductive film, e.g., indium tin oxide (ITO) film.

Further, the anode oxide electrode 5 has a structure that it is separated into the overlapping portion 122 where the anode oxide electrode 5 and the display electrode 7 made of the transparent conductive film overlap, and the first data electrode 82 made of tantalum at the lower part of the second data electrode 83. The etching removal part 121 between the first data electrode 82 and the display electrode 7 is removed so as to be separated from the display electrode 7.

Accordingly, the width of the anode oxide electrode 5 becomes W2 as the first data electrode 82.

Accordingly, the anode oxide electrode 5 is widened as the width W1 which is larger than the width (W2) of the first data electrode 82 at the time of anodic oxidation treatment, and it is widened toward the lower part of the display electrode 7. Further, the adjoining display electrodes 7 are connected to each other by the anode oxide electrode 5.

The line connecting part 76 for connecting the first data electrode 82 and the island-shaped lower electrode 2 is subject to the etching treatment upon completion of the provision of the second data electrode 83 and the display electrode 7, thereby forming the isolated island-shaped lower electrode 2, and at the same the etching removal part 121 between the first data electrode 82 and the display electrode 7 is subject to the etching treatment so as to form the isolated display electrode 7 and the first data electrode 82.

With the employment of this structure, since the anode oxide electrode 5 is enlarged in width and it traverses up and down and right and left at the time of anodic oxidation treatment, the anode oxide film can be formed uniformly in a short time.

Other functions and effects are the same as those of the eleventh embodiment.

[Thirteenth Embodiment]

A liquid crystal display device according to a thirteenth embodiment of the invention will be described next with reference to FIGS. 37 and 38.

Figure 38:
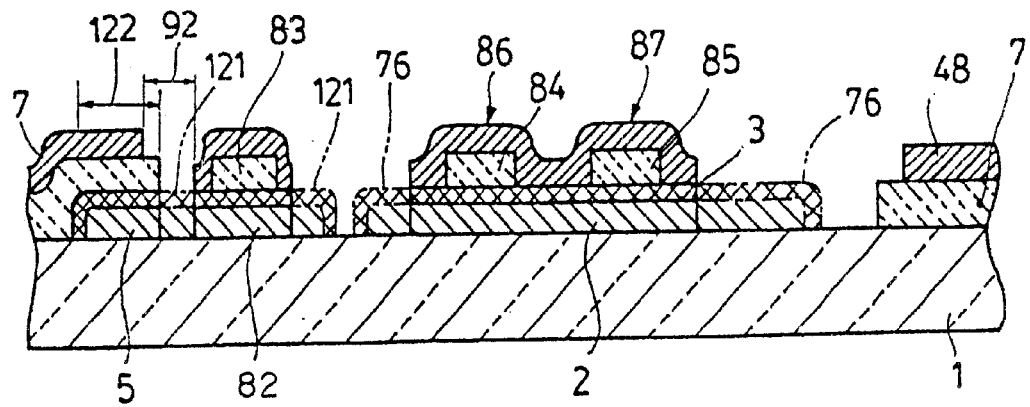
FIG. 38 is a cross sectional view taken along the line 38—38 in FIG. 37.
Figure 37:
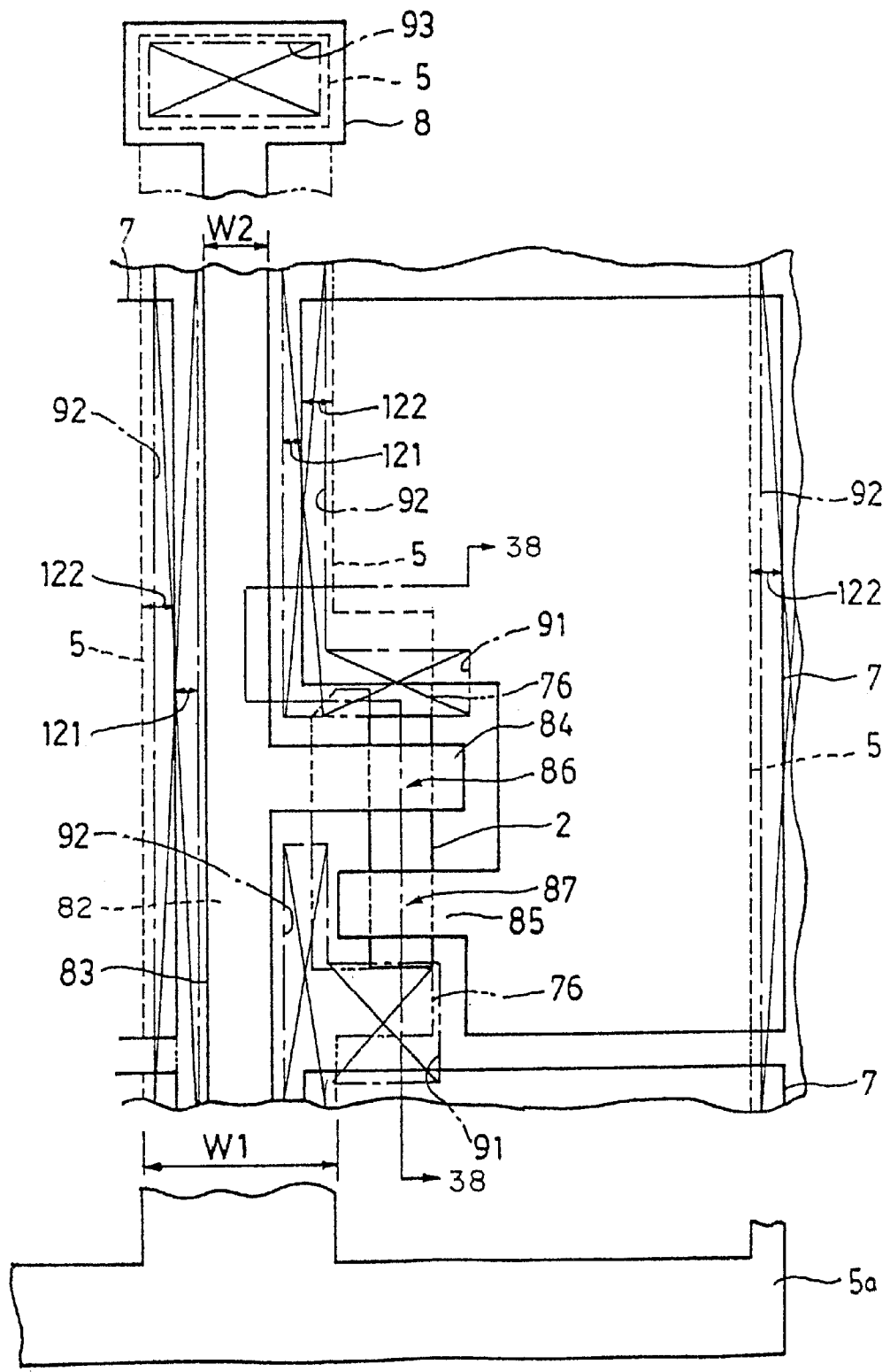
FIG. 37 is a plan view showing a region of a part of a first substrate forming a TFD element of a liquid crystal display device according to a thirteenth embodiment of the invention.

FIG. 37 is a plan view showing a region of a part of the first substrate for forming a TFD element of the liquid crystal display device according to the thirteenth embodiment, and FIG. 38 is a cross-sectional view taken along the line 38—38 in FIG. 37.

The structure of the TFD element of the thirteenth embodiment will be described with reference to these figures.

In this embodiment, in addition to the steps in the eleventh embodiment, the insulating film 48 is formed and the opening 91 is defined in the insulating film 48, and the line connecting part 76 for connecting the island-shaped lower electrode 2 and the first data electrode 82 is subject to the etching treatment so as to be removed utilizing the opening 91.

Further, the opening 91 of the insulating film 48 is defined between the first data electrode 82 or the second data electrode 83 and the display electrodes 7 or between the display electrode 7 and the display electrode 7 so as to remove a part of the anode oxide electrode 5, namely, the etching removal part 121 so that the first data electrode 82 and the display electrode 7 are separated from each other.

The anode oxide electrode 5, the island-shaped lower electrode 2 and the line connecting part 76 for connecting the anode oxide electrode 5 and the lower electrode 2 (as shown by imaginary lines) are made of tantalum (Ta) film as metal film and disposed on the first substrate 1.

The anode oxide electrode 5 has the width W1 which is larger than the width W2 of the first data electrode 82 at a part other than the periphery of the island-shaped lower electrode 2.

The anode oxide electrodes 5 are connected to each other in plural numbers by the runner parts 5a at one end thereof, and the other ends of the anode oxide electrode 5 are covered with the connecting electrode 8 for applying the signal from the external circuit to the nonlinear resistor.

The anode oxide electrode 5 is used as an electrode when the nonlinear resistor layer 3 is formed on the surface of the lower electrode 2 by the anodic oxidation treatment.

The anode oxide electrode 5 is provided between the first data electrode 82 and the display electrode 7 as shown in FIG. 31. The etching removal part 121 is removed in the final structure.

Further, the first data electrode 82 and the line connecting part 76 connected to the island-shaped lower electrode 2 are also removed in the final structure. That is, FIG. 37 and FIG.

38 show an intermediary stage of the manufacturing steps by imaginary lines so as to make the explanation easy.

Further, the nonlinear resistor layer 3 made of tantalum oxide ($Ta_2O_5$) film, which is formed by subjecting the tantalum film to the anodic oxidation treatment, is provided on the surfaces of the anode oxide electrode 5 and the island-shaped lower electrode 2 by way of the line connecting part 76.

In case that the anodic oxidation treatment is performed, the line connecting parts 76 are provided vertically in two directions of the lower electrode 2, the anode oxide film can be formed on the surface of the lower electrode 2 without any trouble, since the anode oxide electrode 5 is connected to the other line connecting part 76, for example, even if one line connecting part 76 is broken.

Further, the transparent conductive film is provided on the overlapping portion 122 of the anode oxide electrode 5 and the first substrate 1, thereby forming the display electrode 7. Further, the upper electrode 85 for a display electrode connected to the display electrode 7 is provided on the lower electrode 2. Still further, the second data electrode 83 is provided on the anode oxide electrode 5, and the upper electrode 84 for a data electrode connected to the second data electrode 83 is further provided.

Further, the connecting electrode 8 made of the transparent conductive film is provided on the anode oxide electrode 5 made of tantalum for applying the signal from the external circuit to the nonlinear resistor. In the connecting electrode 8, tantalum has a frame shape. The transparent conductive film covers frame-shaped tantalum and has a square shape. With the provision of this shape, the matching accuracy is improved since the position can be clearly identified by the frame-shaped tantalum compared with that of the transparent conductive film in the case of connecting the external circuit and the connecting electrode 8.

Further, the connecting state between the external circuit and the input part can be verified through a transparent conductive film by providing the transparent conductive film inside and outside frame-shaped tantalum.

The island-shaped lower electrode 2, the nonlinear resistor layer 3 and the upper electrode 84 for a data electrode constitute the first nonlinear resistor (TFD element) 86. Further, the island-shaped lower electrode 2, the nonlinear resistor layer 3 and the upper electrode 85 for a display electrode constitute the second nonlinear resistor (TFD element) 87.

The upper electrode 85 for a display electrode, the upper electrode 84 for a data electrode and the display electrode 7 are made of the transparent conductive film, e.g., indium tin oxide (ITO) film.

The insulating film 48 is formed on the entire surface for preventing the nonlinear resistor (TFD) from being deteriorated or broken by an external force when the nonlinear resistor (TFD) is processed to be adapted for the liquid crystal display device, or for preventing electric short circuit between the second data electrode 83 and the opposed electrode (not shown) constituting the liquid crystal display device, or between the display electrode 7 and the opposed electrode (not shown).

The insulating film 48 is made of tantalum oxide ($Ta_2O_5$) film by the sputtering technique.

The line connection opening 91 (shown by one-dotted chain line) for removing the line connecting part 76 is defined in the insulating film 48. Further, the separating opening 92 is also defined in the etching removal part 121 between the anode oxide electrode 6 and the overlapping portion 122 of the display electrode 7.

Further, in the connecting electrode 8, the connection opening 93 of the insulating film 48 is provided on the connecting electrode 8 made of the transparent conductive film, and the insulating film 48 remains on the other part.

In the connecting electrode 8, when the insulating film 48 remains on a region other than the connecting electrode 8 connected to the external circuit as set forth above, the insulating film 48 covers substantially the entire wiring, so that the adjoining input part and the lines are prevented from being short-circuited owing to dust, etc.

The line connecting part 76 has a side which is the same as that of the line connection opening 91 of the insulating film 48 and those of the display electrode 7, while the island-shaped lower electrode 2 has a side which is the same as that of the line connection opening 91 extending from the anode oxide electrode 5. The etching removal part 121 has a side which is the same as that of the separating openings 92 of the insulating film 48 and those of the display electrode 7, wherein the anode oxide electrode 5 becomes the first data electrode 82 by the etching removal part 121, thereby constituting the independent display electrodes 7.

Accordingly, the width of the anode oxide electrode 5 becomes the width W2 as the first data electrode 82.

Accordingly, when the anodic oxidation treatment is performed, the width of the anode oxide electrode 5 is denoted by W1 and is made larger than the width W2 of the first data electrode 81, and it is widened toward the lower part of the display electrode 7. Further, the adjoining display electrodes 7 are also connected to each other by the anode oxide electrode 5.

Finally, the second data electrode 83 and the display electrode 7 are provided, further the line connecting part 76 for connecting the first data electrode 82 and the island-shaped lower electrode 2 is subject to the etching treatment upon completion of the provision of the insulating film 48 so as to form the isolated island-shaped lower electrode 2, then at the same time the etching removal part 121 between the first data electrode 82 and the display electrode 7 is subject to the etching treatment, thereby forming the isolated display electrode 7 and the first data electrode 81.

With the employment of this structure, the anode oxide electrode is enlarged in width at the time of anodic oxidation treatment so that the anode oxide film can be formed uniformly in a short time.

Further, since the width (W1) of the anode oxide electrode is enlarged like the case in FIG. 26, it is possible to prevent breakage of the first data electrode 82 utilizing a part of the anode oxide electrode 5 between the display electrode 7 and the first data electrode 82 if there is a breakage within the width (W2) of the first data electrode 82.

Further, according to this embodiment, the island-shaped lower electrode 2 is required to be separated from the first data electrode 82, and further it is necessary to perform an electrical connection with an external circuit by defining the opening in the insulating film 48 in the connecting electrode 8. Accordingly, at the same time when processing the insulating film 48, the removal of the line connecting part 76 and the processing of the first data electrode 82 from the anode oxide electrode 5 can be performed, which does not lead to the increase of the number of steps at all.

Further, when the insulating film 48 is provided on the second data electrode 83 or the display electrode 7, there does not occur electrical short circuit with the opposed electrode which is used when utilizing as the liquid crystal display device.

Still further, although two upper electrodes are provided in this embodiment, two or more upper electrodes may be provided.

[Fourteenth Embodiment]

A liquid crystal display device according to a fourteenth embodiment of the invention will be described next with reference to FIGS. 39 and 40.

The fourteenth embodiment relates to the structure of a TFT element.

Figure 39:
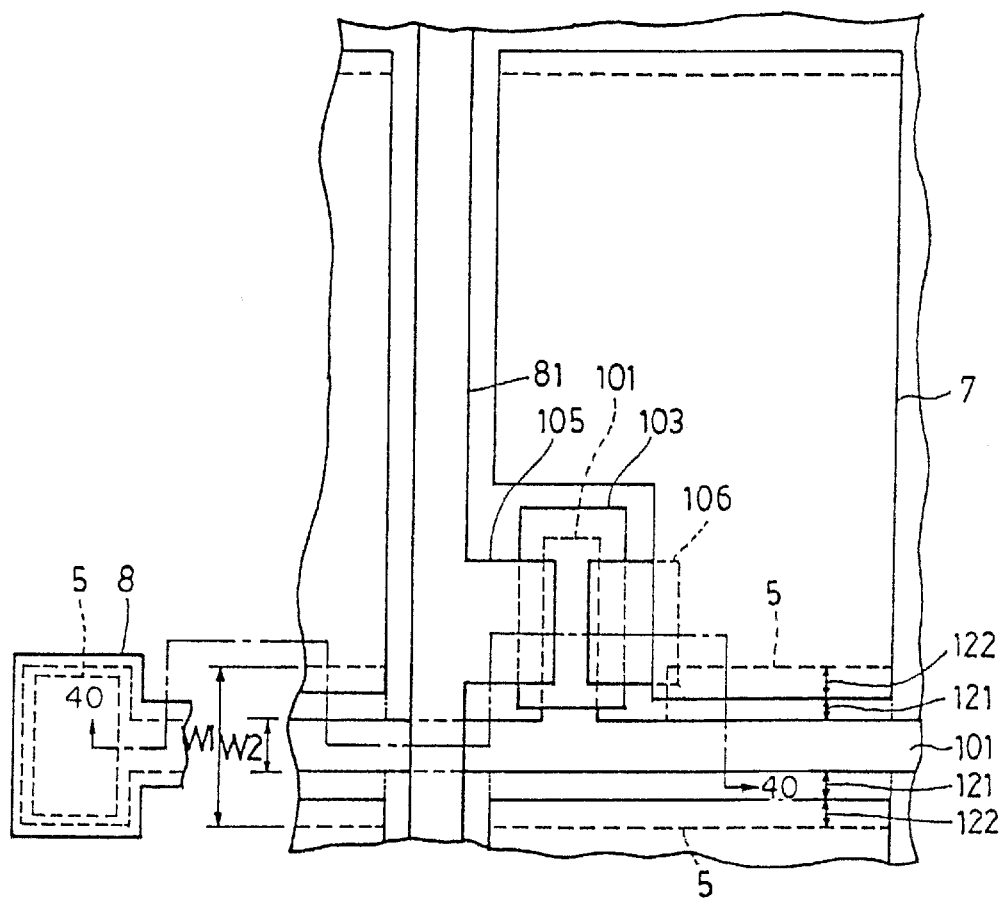
FIG. 39 is a plan view showing a region of a part of a first substrate forming a TFT element of a liquid crystal display device according to a fourteenth embodiment of the invention.
Figure 40:
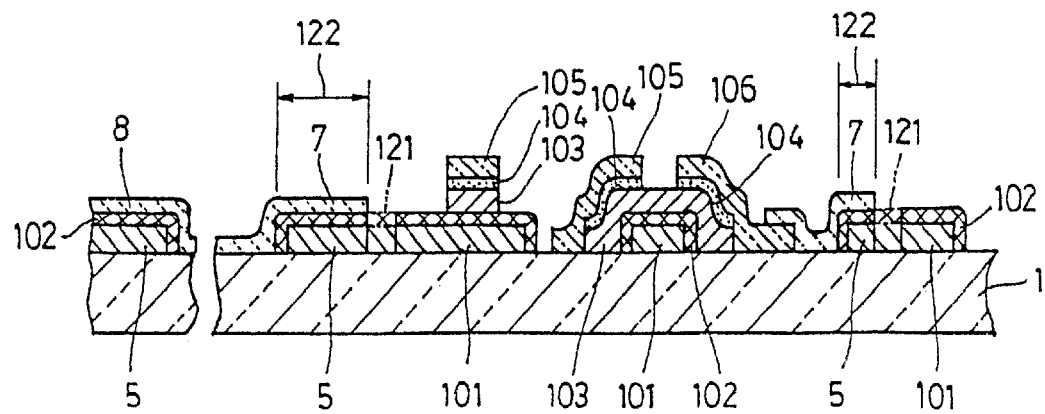
FIG. 40 is a cross sectional view taken along the line 40—40 in FIG. 39.

FIG. 39 is a plan view showing a region of a part of the first substrate for forming the TFT element of the liquid crystal display device according to the fourteenth embodiment, and FIG. 40 is a cross-sectional view taken along the line 40—40 in FIG. 39.

The anode oxide electrode 5 and the gate electrode 101 forming a part of the anode oxide electrode 5 are made of tantalum (Ta) film as metal film and disposed on the first substrate 1 serving as an active substrate forming the TFT element. The anode oxide electrode 5 comprises the gate electrode 101, the etching removal part 121 and the overlapping portion 122.

The width of the anode oxide electrode 5 is denoted by W1 and is large at a part other than the periphery of the gate electrode 101.

The anode oxide electrodes 5 are connected to each other in plural numbers by the anode oxide electrode parts, not shown, at one end thereof. The anode oxide electrodes 5 are covered with the connecting electrode 8 for applying a signal from an external circuit to the TFT element at the other end thereof. The anode oxide electrode 5 is used as an electrode for forming the gate insulating film 102 on the surface of the gate electrode 101 by the anodic oxidation treatment.

A part of the anode oxide electrode 5 is provided between the gate electrode 101 and the display electrode 7 as shown in FIG. 39. The etching removal part 121 which is a region other than the display electrode 7 is removed in the final structure.

That is, these figures show an intermediary stage of the manufacturing steps by an imaginary line so as to make the explanation easy.

Further, the gate insulating film 102 made of the tantalum oxide ($Ta_2O_5$) film, which is formed by subjecting the tantalum film to the anodic oxidation treatment, is provided on the surfaces of the anode oxide electrode 5 and the gate electrode 101.

A semiconductor layer 103 made of amorphous silicon (a-Si) is provided at the periphery of the gate electrode 101. Further, a semiconductor layer 104 containing phosphorus (P) as an impurity ion is provided on the semiconductor layer 103.

A source electrode 105 and a drain electrode 106 are provided on the semiconductor layer 104 containing the impurity ion. The source electrode 105 and the drain electrode 106 are made of molybdenum (Mo). The semiconductor layer 104 containing the impurity ions is provided on an overlapping part where the source electrode 105, the drain electrode 106 and the semiconductor layer 103 overlap. Further, the source electrode 105 is connected to the data electrode 82 which is connected to the external circuit.

At the part where the data electrode 82 and the gate electrode 101 overlap, the gate electrode 101 comprises the metal film (tantalum) 2 and the anode oxide film (tantalum oxide) 3, and the semiconductor layer 103, the semiconductor layer 104 containing the impurity ions and the metal film (molybdenum) of the source electrode 105 are provided thereon.

In such a manner, the electric short circuit can be more effectively prevented by providing a multiple-layered insulating film or the semiconductor layer 103 between the metal film of the gate electrode 101 and the metal film of the source electrode 105.

Further, the display electrode 7 is provided on the overlapping portion 122 of the anode oxide electrode 5 and the first substrate 1.

The connecting electrode 8 made of the transparent conductive film is provided on the anode oxide electrode 5 made of tantalum film for applying a signal from the external circuit to the nonlinear resistor. In the connecting electrode 8, tantalum has a frame shape. Further, the transparent conductive film covers frame-shaped tantalum, and has a square shape.

With the provision of this shape, the matching accuracy is improved since the position can be clearly identified by frame-shaped tantalum compared with that of the transparent conductive film in the case of connecting the external circuit and the connecting electrode 8. Further, the connecting state between the external circuit and the connecting electrode 8 can be verified through a transparent conductive film by providing the transparent conductive film inside and outside frame-shaped tantalum.

The display electrode 7 and the connecting electrode 8 are made of the transparent conductive film, e.g., indium tin oxide (ITO) film.

Further, the etching removal part 121 between the display electrode 7 and the gate electrode 101 in the anode oxide electrode 5 is subject to the etching treatment so as to be removed, and the anode oxide electrode 5 becomes the gate electrode 101 and is separated from the overlapping portion 122 at the lower part of the display electrode 7.

Accordingly, the width of the anode oxide electrode 5 becomes W2 as the gate electrode 101.

Consequently, at the time of the anodic oxidation treatment, the width of the anode oxide electrode 5 denoted by W1 is larger than the width (W2) of the gate electrode 101, and it is enlarged toward the lower part of the display electrode 7. Further, the adjoining display electrodes 7 are connected to each other by the anode oxide electrode 5.

Finally, the gate electrode 101 and the overlapping portion 122 at the lower part of the display electrode 7 are separated from each other upon completion of the provision of the display electrode 7. Further the isolated display electrodes 7 are formed.

With the employment of this structure, the anode oxide electrode is enlarged in width at the time of anodic oxidation treatment, so that the anode oxide film can be formed uniformly in a short time.

Further, since the width (W1) of the anode oxide electrode 5 is enlarged, it is possible to prevent breakage of the gate electrode 101 utilizing a part of the anode oxide electrode 5 between the display electrode 7 and the gate electrode 101 if there is a breakage within the width (W2) of the gate electrode 101.

A method of fabricating an active substrate of the liquid crystal display device according to the fourteenth embodiment will be described with reference to FIGS. 41 through 44.

FIGS. 41 through 44 are cross-sectional views showing the steps of fabricating the active substrate of the liquid crystal display device in the order of fabricating steps according to the fourteenth embodiment.

Figure 41:
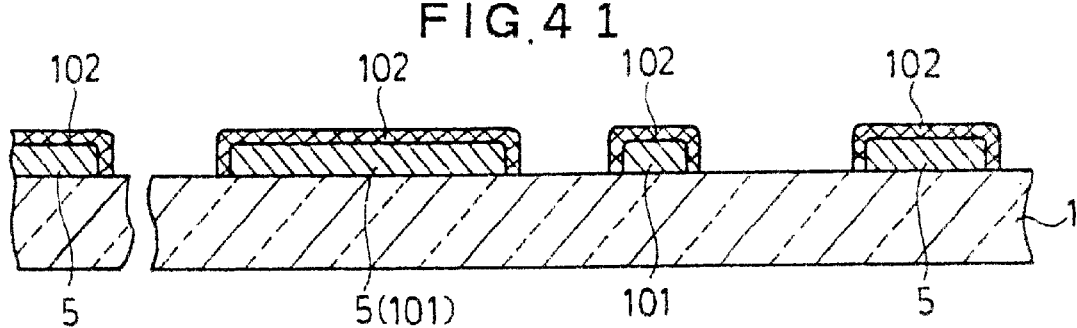
FIGS. 41 through 44 are cross sectional views showing a method of fabricating an active substrate of the liquid crystal display device according to the fourteenth embodiment of the invention in the order of fabricating steps thereof.

First of all, a tantalum (Ta) film as a metal film is formed on the entire surface of the first substrate 1 forming the active substrate made of glass shown in FIG. 41 in a film thickness of 200 nm by a sputtering technique.

Thereafter, forming a photosensitive resin (not shown) on the entire surface of the tantalum film by a spin coating method, and subjecting the tantalum film to an exposing and developing treatment using a given photomask to thereby permit the photosensitive resin to be subject to patterning, thereafter patterning the anode oxide electrode 5 and the gate electrode 101 connected to the anode oxide electrode 5 by a photoetching treatment for etching the tantalum film employing the patterned photosensitive resin as an etching mask.

The etching of the tantalum film is performed using a RIE system.

As an etching condition, a mixture gas of sulfur hexafluoride ($SF_6$) and oxygen ($O_2$) is employed as an etching gas. The flow rate of the sulfur hexafluoride ranges from 100 to 200 sccm, and the flow rate of the oxygen ranges from 10 to 40 sccm at a pressure ranging from 4 to $12\times10^{-2}$ torr with power ranging from 0.2 to 0.5 kW/cm$^2$.

Thereafter, the tantalum film is subject to the anodic oxidation treatment by applying a voltage ranging from 60 to 70V thereto while permitting the anode oxide electrode 5 to be an anode using aqueous solution of citric acid ranging from 0.1 to 1.0 wt % or aqueous solution of ammonium borate or aqueous solution of phosphoric acid as the anode oxidation liquid.

As a result, the insulating film (not shown) made of the tantalum oxide ($Ta_2O_5$) film is formed on the side walls and upper surfaces of the gate electrode 101 and the anode oxide electrode 5 in the film thickness ranging from 120 to 130 nm.

Successively, an amorphous silicon (a-Si) film as the semiconductor layer 103 is formed on the entire surface in a thickness of 70 nm using a plasma CVD technique. Thereafter, the semiconductor layer 104 (n-a-Si) containing phosphorus (P) as an impurity ion is formed on the entire surface in a thickness of 20 nm using the plasma CVD technique.

Figure 42:
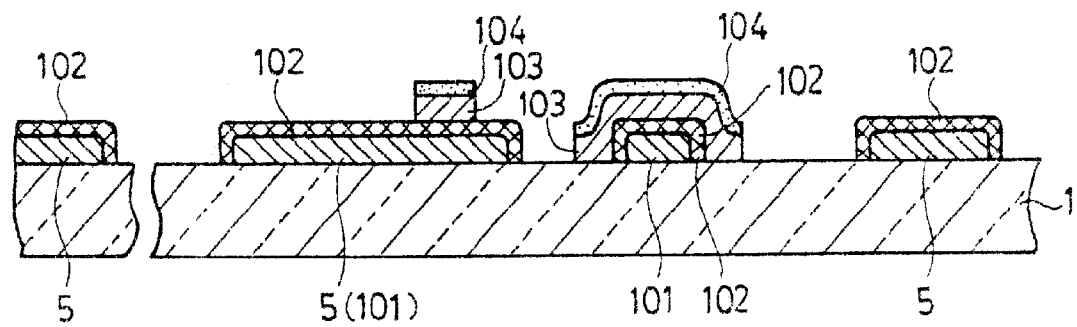

Thereafter, as shown in FIG. 42, the semiconductor layers 103 and 104 are subject to the etching treatment so as to pattern the periphery of the gate electrode 101 and the part of the data electrode 81.

The etching of the amorphous silicon film is performed using the RIE system.

As etching condition, a mixture gas of carbon tetrafluoride ($CF_4$) and oxygen ($O_2$) is employed as an etching gas. The flow rate of the carbon tetrafluoride ranges from 100 to 200 sccm, and the flow rate of the oxygen ranges from 10 to 40 sccm at a pressure ranging from 4 to $12\times10^{-2}$ torr with power ranging from 0.2 to 0.5 kW/cm$^2$.

Figure 43:
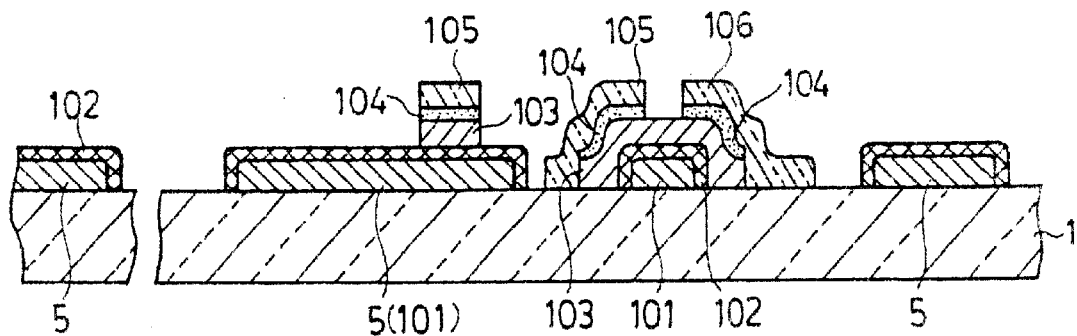

Thereafter, as shown in FIG. 43, a molybdenum (Mo) film is formed on the entire surface in a thickness of 200 nm using the sputtering technique. Then, a photosensitive resin (not shown) is formed on the molybdenum film.

Thereafter, the molybdenum film is subject to the etching treatment so as to pattern the source electrode 105, the drain electrode 106 and the data electrode 81 connected to the source electrode 105 at the same time.

The etching treatment of the molybdenum film is performed by a wet etching using an etchant comprising phosphoric acid ($H_3PO_4$) and nitric acid ($HNO_3$) and acetic acid ($CH_3COOH$). The liquid temperature of the etchant is set to range from 25° C. to 26° C.

Further, the semiconductor layer 104 containing the impurity ions is subject to the etching treatment using the photosensitive resin as an etching mask. The etching is performed using the RIE system, and it is the etching condition that the semiconductor layer 103 serving as a base substrate is not deteriorated.

A mixture gas of carbon tetrafluoride ($CF_4$) and oxygen ($O_2$) is employed as an etching gas. The flow rate of carbon tetrafluoride ($CF_4$) ranges from 80 to 120 sccm, and the flow rate of oxygen ranges from 10 to 15 sccm at a pressure ranging from 10 to $12\times10^{-2}$ torr with power ranging from 0.05 to 0.1 kW/cm$^2$.

Thereafter, an indium tin oxide (ITO) film as the transparent conductive film is formed on the entire surface in a film thickness of 100 nm using the sputtering technique. Then, a photosensitive resin (not shown) is formed oil the indium tin oxide (ITO) film.

Thereafter, the indium tin oxide film is subject to the etching treatment so as to be connected to the drain electrode 106 and the display electrode 7 is patterned on the overlapping portion 122 as a part of the anode oxide electrode 5. Further, the connecting electrode 8 and the input part (not shown) connected to the first data electrode 81 are patterned on the anode oxide electrode 5 connected to the gate electrode 101.

The etching of the indium tin oxide film is performed by wet etching using an etchant of the aqueous solution of hydrogen bromine (HBr). The liquid temperature of the etchant at this time is set to be 25° C. to 30° C.

Figure 44:
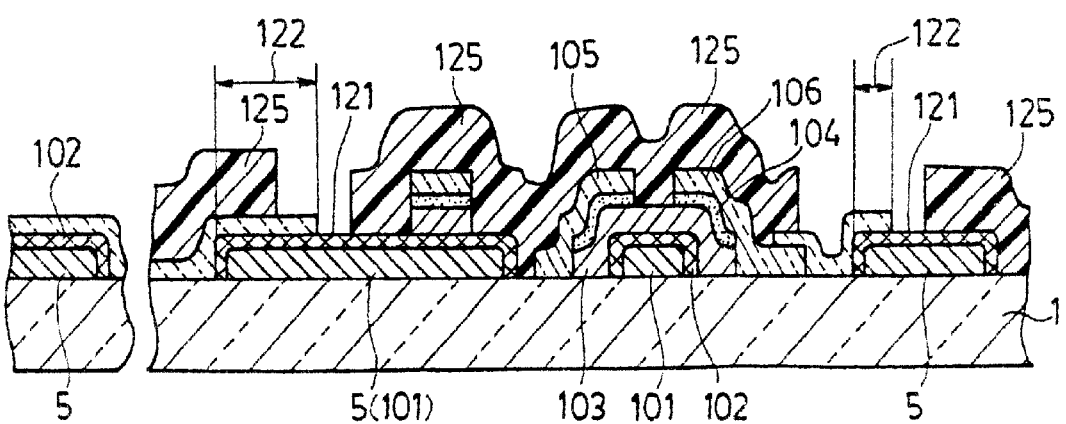

Then, as shown in FIG. 44, the photosensitive resin 125 for covering the first data electrode 81 and the periphery of the gate electrode 101 is formed to remove the etching removal part 121 between the overlapping portion 122 of the display electrode 7 in the anode oxide electrode 5 and the gate electrode 101, or the etching removal part 121 between the display electrode 7 and the display electrode 7 by the etching treatment.

Since the etching removal part 121 in the anode oxide electrode 5 is exposed from the photosensitive resin 125 and the display electrode 7 made of the indium tin oxide film, the etching removal part 121 is removed by the etching treatment using the photosensitive resin 125 and the display electrode 7 as an etching mask by the RIE system.

As etching condition, a mixture gas of sulfur hexafluoride ($SF_6$) and oxygen ($O_2$) is employed as an etching gas. The flow rate of sulfur hexafluoride ranges from 100 to 200 sccm, and the flow rate of oxygen ranges from 10 to 40 sccm at a pressure ranging from 4 to $12\times10^{-2}$ torr with power ranging from 0.2 to 0.5 kW/cm$^2$.

Under the etching condition set forth above, the indium tin oxide film is barely etched, and only the tantalum film 2 and the tantalum oxide film which is the gate insulating film 102 are etched.

With the above steps, the anode oxide electrode 5 can be separated into the gate electrode 101 and the overlapping portion 122 at the lower part of the display electrode 7 as shown in FIGS. 39 and 40 of this embodiment.

With the employment of the manufacturing steps, the anode oxide electrode is enlarged in width (W1) at the time of anodic oxidation treatment, so that the anode oxide film can be formed uniformly in a short time.

Further, since the width W1 of the anode oxide electrode 5 is enlarged, it is possible to prevent the breakage of the gate electrode 101 utilizing a part of the anode oxide electrode 5 between the display electrode 7 and the gate electrode 101 if there is a breakage within the width W2 of the gate electrode 101.

[Modification of the Tenth to Fourteenth Embodiments]

Although the indium tin oxide (ITO) film is employed as the transparent conductive film in the aforementioned each embodiment, an oxide compound such as indium oxide ($In_2O_3$), tin oxide ($SnO_2$), or zinc oxide (ZnO) may be employed.

Although in each embodiment, tantalum is used as a material of the anode oxide electrode 5, aluminum or tantalum or aluminum to which carbon, silicone, niobium, nitrogen or phosphorous is added may be used.

Further, in the tenth to thirteenth embodiment, there has been explained the case where the transparent conductive film which is the same as the display electrode is employed as the upper electrode, however the upper electrode may be made of a material which is different from that of the display electrode.

As the material of the upper electrode, chromium, titanium, tungsten, titanium siliside, tungsten siliside or chromium film containing nitrogen may be used.

Industrial Utilization

In the liquid crystal display device which is widely used in various electronic devices, particularly, in the liquid crystal display device employing nonlinear resistors such as the TFD or TFT which can be microprocessed and are effective in the reduction of cost as a switching element, the nonlinear resistor layer can be formed uniformly in a short time by subjecting the electrode to an anodic oxidation treatment, thereby preventing breakage of the electrode subsequently and facilitating the inspection.

It is possible to effectively utilize a remaining portion of the anode oxide electrode after it is used in the manner that the remaining portion is formed as the connecting electrode with the external circuit, it is utilized for the frame as the shading portion, and it is utilized for repairing the electrode when there occurs a defect.

Accordingly, it is possible to realize an improvement of the yield when the liquid crystal display device is manufactured, improvement of the display quality, spreading for various purposes, and reduction of the cost, thereby enhancing the industrial usability.

What is claimed is:

1. A liquid crystal display device comprising first and second substrates opposing each other at a certain gap, a first electrode and a second electrode disposed on the first substrate, a nonlinear resistor disposed in a region wherein the first and second electrodes overlap, and a liquid crystal filled between the first and second substrates, characterized in that:

said first electrode comprises a lower electrode constituting the nonlinear resistor, a plurality of signal electrodes for applying an external signal to the nonlinear resistor, a first anode oxide electrode connected to the signal electrodes for forming a nonlinear resistor layer by subjecting the lower electrode to an anodic oxidation treatment, a second anode oxide electrode independent of the first anode oxide electrode, and an auxiliary electrode connected to the second anode oxide electrode, and the plurality of signal electrodes are connected to each other by the first anode oxide electrode when the lower electrode is subject to the anodic oxidation treatment;

wherein said second electrode is provided with upper electrodes disposed on the nonlinear resistor layer, a display electrode connected to the upper electrodes, and a connecting electrode for covering a part of the first and second anode oxide electrodes;

wherein said nonlinear resistor is structured by said lower electrode, the nonlinear resistor layer formed by the anodic oxidation treatment of the lower electrode, and said upper electrodes;

wherein the first anode oxide electrode is separated at portions thereof where the signal electrodes are connected to each other upon completion of the anodic oxidation treatment, thereby separating the signal electrodes from each other to permit them to be independent of each other;

wherein the second anode oxide electrode is separated at portions thereof where the auxiliary electrodes are connected to each other upon completion of the anodic oxidation treatment, thereby separating the signal electrodes from each other to permit them to be independent of each other; and wherein the nonlinear resistor layer provided on the second anode oxide electrode by the anodic oxidation treatment is larger in thickness than the nonlinear resistor layer provided on the first anode oxide electrode.

2. A liquid crystal display device according to claim 1, wherein an insulating film is provided on the first substrate, the nonlinear resistor layer on the first anode oxide electrode, the nonlinear resistor layer on the second anode oxide electrode, the signal electrode, the auxiliary electrode, and the display electrode;

wherein openings are defined at a position corresponding to a part of the first and the second anode oxide electrodes; and wherein the first and the second anode oxide electrodes are separated at sides which are the same as those of the openings of said insulating film.

3. A liquid crystal display device comprising first and second substrates opposing each other at a certain gap, a first electrode and a second electrode disposed on the first substrate, a nonlinear resistor disposed in a region where the first and second electrodes overlap, and a liquid crystal filled between the first and second substrates, characterized in that:

said first electrode comprises a lower electrode constituting the nonlinear resistor, a plurality of first signal electrodes for applying an external signal to the nonlinear resistor, a first anode oxide electrode connected to the first signal electrode for forming a nonlinear resistor layer by subjecting the lower electrode to an anodic oxidation treatment, a second anode oxide electrode independent of the first anode oxide electrode, and an auxiliary electrode connected to the second anode oxide electrode, and the plurality of first signal electrodes are connected to each other by the first anode oxide electrode when the lower electrode is subject to the anodic oxidation treatment;

wherein said second electrode is provided with two upper electrodes disposed on the nonlinear resistor layer, a display electrode connected to the upper electrodes, a second signal electrode for covering the first signal electrode, and a connecting electrode for covering a part of the first anode oxide electrode;

wherein one of said two upper electrodes is connected to the second signal electrode, while the other thereof is connected to the display electrode;

wherein said two nonlinear resistors are structured by said lower electrode, the nonlinear resistor layer formed by subjecting the lower electrode to the anodic oxidation treatment, and said two upper electrodes;

wherein the first anode oxide electrode is separated at portions thereof where the first signal electrodes are connected to each other upon completion of the anodic oxidation treatment, thereby separating the first signal electrodes from each other to permit them to be independent of each other, wherein the second anode oxide electrode is separated at portions thereof where the auxiliary electrodes are connected to each other upon completion of the anodic oxidation treatment, thereby separating the auxiliary electrodes from each other to permit them to be independent of each other; and wherein the nonlinear resistor layer provided on the second anode oxide electrode by the anodic oxidation treatment is thicker in thickness than the nonlinear resistor layer provided on the first anode oxide electrode.

4. A liquid crystal display device according to claim 3, wherein an insulating film is provided on the first substrate, the nonlinear resistor layer on the first anode oxide electrode, the nonlinear resistor layer on the second anode oxide electrode, the second signal electrode, the auxiliary electrode, and the display electrode;

wherein openings are defined at a position corresponding to a part of the first and the second anode oxide electrodes; and wherein the first and the second anode oxide electrodes are respectively separated at sides which are the same as those of the openings of said insulating film.

5. A liquid crystal display device comprising first and second substrates opposing each other at a certain gap, a first electrode and a second electrode disposed on the first substrate, a nonlinear resistor disposed in a region where the first and second electrodes overlap, and a liquid crystal filled between the first and second substrates, characterized in that:

said first electrode is provided with anode oxide electrodes formed of a metal film, a plurality of signal electrodes connected to the anode oxide electrodes, and a plurality of lower electrodes connected to the signal electrodes;

wherein said second electrode is provided with upper electrodes disposed on the nonlinear resistor layer formed by subjecting the lower electrodes to the anodic oxidation treatment, formed by subjecting the lower electrodes to the anodic oxidation treatment, and a display electrode connected to the upper electrode;

wherein said nonlinear resistors are structured by said lower electrode, the nonlinear resistor layer, and the upper electrodes;

wherein the anode oxide electrode is provided with an etching removal part between the signal electrode and the display electrode, and an overlapping part overlapping at the lower part of the display electrode, and the nonlinear resistor layer is formed on the entire surfaces of the anode oxide electrode, the signal electrodes, and the lower electrode by the anodic oxidation treatment; and wherein the part where the plurality of signal electrodes of the anode oxidation electrodes are removed upon completion of the anodic oxidation treatment, thereby separating the signal electrodes to permit them to be independent of each other, so that the overlapping part of the anode oxide electrodes is separated and remains at each of the display electrode.

6. A liquid crystal display device comprising first and second substrates opposing each other at a certain gap, a first electrode and a second electrode disposed on the first substrate, a nonlinear resistor disposed in a region where the first and second electrodes overlap, and a liquid crystal filled between the first and second substrates, characterized in that:

said first electrode is provided with signal electrodes formed of a metal film, an anode oxide electrode connected to the plurality of signal electrode, and an island-shaped lower electrode, and a line connecting part which connects the lower electrode to the anode oxide electrodes;

wherein said second electrode is provided with two upper electrodes disposed on the nonlinear resistor layer formed by subjecting the lower electrodes to an anodic oxidation treatment, and a display electrode formed of a transparent conductive film;

wherein the two upper electrodes cross the lower electrodes, while one of them is connected to the signal electrode, and the other is connected to the display electrode;

wherein said two nonlinear resistors are structured by said lower electrode, the nonlinear resistor layer, and said two upper electrodes;

where the anode oxide electrode is provided with an etching removal part between the signal electrode and the display electrode, and an overlapping part overlapping at the lower part of the display electrode, and the nonlinear resistor layer is formed on the entire surfaces of the anode oxide electrode, the signal electrodes, and the lower electrode by the anodic oxidation treatment; and wherein the part where the plurality of signal electrodes of the anode oxidation electrode are connected to each other, the line connecting part, and the etching removal part are removed upon completion of the anodic oxidation treatment, thereby separating the signal electrodes and the respective lower electrodes to permit them to be independent of each other, so that the overlapping part of the anode oxide electrodes is separated and remains at each of the display electrodes.

7. A liquid crystal display device according to claim 6 wherein the overlapping part overlapping with the display electrodes constituting a part of the anode oxide electrode is provided approximately on the entire surface of the display electrodes except the portion constituting the nonlinear resistor.

8. A liquid crystal display device according to claim 6, wherein a plurality of line connecting parts for connecting the island-shaped lower electrodes to the anode oxide electrodes are provided at each of the lower electrode; and wherein the line connecting parts are removed upon completion of the anodic oxidation treatment of the lower electrode.

9. A liquid crystal display device according to claim 6, wherein the signal electrodes comprise first signal electrodes connected to the anode oxide electrode, and second signal electrodes which are made of a transparent conductive film provided on the first signal electrode and connected to one of the two upper electrodes.

10. A liquid crystal display device according to claim 6, wherein a protection insulating film is provided approximately on the entire surface of the first substrate, the insulating film is provided with openings at a part connecting the plurality of the signal electrodes of the anode oxide electrodes, the line connection portion, and a portion corresponding to the etching removal portion, and the parts of the anode oxidation electrodes exposed in the openings are removed by etching.

* * * * *